US009686958B2

(12) United States Patent
Sellner et al.

(10) Patent No.: US 9,686,958 B2
(45) Date of Patent: Jun. 27, 2017

(54) METHODS FOR PREPARING A DAIRY ANIMAL FOR MILKING

(71) Applicant: GEA Farm Technologies, Inc., Naperville, IL (US)

(72) Inventors: Duane F. Sellner, Winona, MN (US); Kevin L. Torgerson, Holmen, WI (US)

(73) Assignee: GEA Farm Technologies, Inc., Naperville, IL (US)

( * ) Notice: Subject to any disclaimer, the term of this patent is extended or adjusted under 35 U.S.C. 154(b) by 0 days.

(21) Appl. No.: 15/148,363

(22) Filed: May 6, 2016

(65) Prior Publication Data

US 2016/0249581 A1    Sep. 1, 2016

Related U.S. Application Data

(60) Division of application No. 13/281,171, filed on Oct. 25, 2011, now abandoned, which is a
(Continued)

(51) Int. Cl.
*A01J 7/04* (2006.01)
*A01J 5/007* (2006.01)
(Continued)

(52) U.S. Cl.
CPC ............ *A01J 5/0075* (2013.01); *A01J 5/007* (2013.01); *A01J 5/01* (2013.01); *A01J 5/06* (2013.01);
(Continued)

(58) Field of Classification Search
CPC ...................................... A01J 7/02; A01J 7/04
(Continued)

(56) References Cited

U.S. PATENT DOCUMENTS 1,365,665 A    1/1921    Davies
2,012,031 A    8/1935    Woodruff
(Continued)

FOREIGN PATENT DOCUMENTS

AU    641229    9/1993
DE    2622794    12/1977
(Continued)

OTHER PUBLICATIONS

Grade A pasteurized milk ordinance, 2003 Revision des US Department Health and Human Services, Public Health Service food and Drug Administration.
(Continued)

*Primary Examiner* — David Parsley
*Assistant Examiner* — Danielle Clerkley
(74) *Attorney, Agent, or Firm* — Smith Law Office; Jeffry W. Smith

(57) ABSTRACT

The present invention relates to preparing dairy animal teats for being milked, and more particularly to teat preparation, rinsing, and milking that all take place in a milking machine teat cup liner. Such a method includes: applying a teat sanitizer to the teat; injecting air into the liner to force the teat sanitizer toward a waste milk line connected to the liner; pulsating the liner at a first pulsation rate; drawing a rinsing milk from the teat; directing the teat sanitizer, the air, and the rinsing fluid to the waste milk line; pulsating the liner at a second pulsation rate to draw additional milk from the teat; and directing the additional milk to a good milk line.

23 Claims, 36 Drawing Sheets

Related U.S. Application Data continuation-in-part of application No. 12/932,276, filed on Feb. 22, 2011, now Pat. No. 8,925,483.

(60) Provisional application No. 61/338,630, filed on Feb. 22, 2010.

(51) Int. Cl.

| | | |
|---|---|---|
| *A01J 7/02* | (2006.01) | |
| *A01J 5/16* | (2006.01) | |
| *A01J 11/00* | (2006.01) | |
| *A01J 5/01* | (2006.01) | |
| *A01J 5/06* | (2006.01) | |

(52) U.S. Cl.
CPC ............. *A01J 5/16* (2013.01); *A01J 7/022* (2013.01); *A01J 7/025* (2013.01); *A01J 7/04* (2013.01); *A01J 11/00* (2013.01)

(58) Field of Classification Search
USPC .................. 119/14.01, 14.08, 14.18, 14.02
See application file for complete search history.

(56) References Cited

U.S. PATENT DOCUMENTS

| | | |
|---|---|---|
| 2,532,088 A | 11/1950 | Cordis |
| 2,747,544 A | 5/1956 | Thomas |
| 3,014,455 A | 12/1961 | Olander |
| 3,099,246 A | 7/1963 | Beskow |
| 3,461,845 A | 8/1969 | Peterson |
| 3,474,760 A | 10/1969 | Hoffman et al. |
| 3,482,547 A | 12/1969 | Maier |
| 3,630,081 A | 12/1971 | Nelson |
| 3,648,696 A | 3/1972 | Keith |
| 3,696,790 A | 10/1972 | Albright |
| 3,713,423 A | 1/1973 | Sparr, Sr. |
| 3,726,253 A | 4/1973 | Duncan |
| 3,762,371 A | 10/1973 | Quayle et al. |
| 3,789,798 A | 2/1974 | Reisgies et al. |
| 3,861,335 A | 1/1975 | Przewalski |
| 3,861,355 A | 1/1975 | Johnson et al. |
| 3,957,018 A | 5/1976 | Barrett |
| 3,971,512 A | 7/1976 | Duncan |
| 3,973,520 A | 8/1976 | Flocchini |
| 4,034,714 A | 7/1977 | Umbaugh et al. |
| 4,149,489 A | 4/1979 | Umbaugh et al. |
| 4,168,677 A | 9/1979 | Brown |
| 4,175,514 A | 11/1979 | Souza et al. |
| 4,177,760 A | 12/1979 | Slater |
| 4,222,346 A | 9/1980 | Reisgies |
| 4,253,421 A | 3/1981 | Slater et al. |
| 4,295,490 A | 10/1981 | Boudreau |
| 4,305,346 A | 12/1981 | Sparr, Sr. |
| 4,332,215 A | 6/1982 | Larson |
| 4,333,421 A | 6/1982 | Schluckbier |
| 4,372,345 A | 2/1983 | Mehus |
| 4,378,757 A | 4/1983 | Hamann |
| 4,393,811 A | 7/1983 | Bodmin |
| 4,395,971 A | 8/1983 | Happel et al. |
| 4,403,569 A | 9/1983 | Bennett |
| 4,459,938 A | 7/1984 | Noorlander |
| 4,462,425 A | 7/1984 | Mehus |
| 4,485,762 A | 12/1984 | Sutton et al. |
| 4,498,419 A | 2/1985 | Flocchini |
| 4,516,530 A | 5/1985 | Reisgies et al. |
| 4,572,105 A | 2/1986 | Chowdhury et al. |
| 4,586,462 A | 5/1986 | Icking |
| 4,593,649 A | 6/1986 | Britten |
| 4,903,639 A | 2/1990 | Kessel |
| 4,907,535 A | 3/1990 | Matsuzawa et al. |
| 4,924,809 A | 5/1990 | Verbrugge |
| 4,936,254 A | 6/1990 | Marshall |
| 5,052,341 A | 10/1991 | Woolford et al. |
| 5,101,770 A | 4/1992 | Stevenson |
| 5,134,967 A | 8/1992 | Marshall |
| 5,161,482 A | 11/1992 | Griffin |
| 5,167,201 A | 12/1992 | Peles |
| 5,178,095 A | 1/1993 | Mein |
| 5,218,924 A | 6/1993 | Thompson et al. |
| 5,255,628 A | 10/1993 | Kristoffer |
| 5,379,722 A | 1/1995 | Larson |
| 5,386,799 A | 2/1995 | Dietrich |
| 5,390,627 A | 2/1995 | van der Berg et al. |
| 5,403,005 A | 4/1995 | Avila-Valdez |
| 5,493,995 A | 2/1996 | Chowdhury |
| 5,568,788 A | 10/1996 | van den Berg et al. |
| 5,572,947 A | 11/1996 | Larson et al. |
| 5,673,650 A | 10/1997 | Mottram et al. |
| 5,697,325 A | 12/1997 | Gehm et al. |
| 5,722,343 A | 3/1998 | Aurik |
| 5,769,025 A | 6/1998 | van der Lely et al. |
| 5,778,820 A | 7/1998 | van der Lely |
| 5,850,845 A | 12/1998 | Pereira et al. |
| 5,881,669 A | 3/1999 | van den Berg et al. |
| 5,896,828 A | 4/1999 | Kronschnabel |
| 5,909,716 A | 6/1999 | van der Lely |
| 5,934,220 A | 8/1999 | Hall et al. |
| 5,957,081 A | 9/1999 | van der Lely et al. |
| 5,960,736 A | 10/1999 | Ludington |
| 5,992,347 A | 11/1999 | Innings et al. |
| 6,009,833 A | 1/2000 | van der Lely |
| 6,089,242 A | 7/2000 | Buck |
| 6,098,570 A | 8/2000 | Aurik et al. |
| 6,170,434 B1 * | 1/2001 | van der Lely .......... A01J 5/007 119/14.02 |
| 6,202,593 B1 | 3/2001 | Maier et al. |
| 6,234,110 B1 | 5/2001 | Xavier |
| 6,244,215 B1 | 6/2001 | Oosterling |
| 6,267,077 B1 | 7/2001 | van den Berg et al. |
| 6,276,297 B1 | 8/2001 | van den Berg et al. |
| 6,308,655 B1 | 10/2001 | Oosterling |
| 6,318,299 B1 | 11/2001 | Birk |
| 6,321,682 B1 | 11/2001 | Eriksson et al. |
| 6,367,416 B1 | 4/2002 | van der Lely |
| 6,371,046 B1 | 4/2002 | Petterson |
| 6,435,132 B1 | 8/2002 | Milbrath et al. |
| 6,546,893 B1 | 4/2003 | Happel et al. |
| 6,550,420 B1 | 4/2003 | Bjork |
| 6,561,126 B2 | 5/2003 | Forsen et al. |
| 6,584,930 B2 | 7/2003 | Buecker |
| 6,591,784 B1 | 7/2003 | Eriksson |
| 6,598,560 B1 | 7/2003 | van den Berg |
| 6,619,227 B1 | 9/2003 | Berger et al. |
| 6,626,130 B1 | 9/2003 | Eriksson |
| 6,644,240 B1 | 11/2003 | Dietrich |
| 6,752,102 B2 | 6/2004 | Dahl et al. |
| 6,755,153 B1 | 6/2004 | Chowdhury |
| 6,935,270 B2 | 8/2005 | Wipperfurth et al. |
| 6,997,136 B1 | 2/2006 | Coates |
| 7,036,981 B2 | 5/2006 | Veenstra et al. |
| 7,128,020 B2 | 10/2006 | Björk et al. |
| 7,143,718 B2 | 12/2006 | Bosma et al. |
| 7,174,848 B2 | 2/2007 | Brown et al. |
| 7,178,480 B2 | 2/2007 | Dahl et al. |
| 7,263,948 B2 | 9/2007 | Ericsson et al. |
| 7,281,493 B2 | 10/2007 | Dietrich |
| 7,290,497 B2 | 11/2007 | Rottier et al. |
| 7,350,478 B2 | 4/2008 | Fernandez |
| 7,377,232 B2 | 5/2008 | Holmgren et al. |
| 7,401,573 B2 | 7/2008 | Torgerson |
| 7,412,943 B2 | 8/2008 | Ericsson et al. |
| 7,536,975 B2 | 5/2009 | Denes et al. |
| 7,575,022 B2 | 8/2009 | Higgins |
| 7,578,260 B2 | 8/2009 | Shin |
| 7,707,966 B2 | 5/2010 | Torgerson et al. |
| 7,765,951 B2 | 8/2010 | Dietrich |
| 7,793,614 B2 | 9/2010 | Ericsson et al. |
| 7,926,449 B2 | 4/2011 | Stellnert et al. |
| 7,963,249 B2 | 6/2011 | Duke |
| 8,025,029 B2 | 9/2011 | Torgerson et al. |
| 8,033,247 B2 | 10/2011 | Torgerson et al. |
| 8,117,989 B2 | 2/2012 | Torgerson et al. |
| 8,210,123 B2 | 7/2012 | Duke |

(56) References Cited

U.S. PATENT DOCUMENTS

| | | | |
|---|---|---|---|
| 8,240,272 B2 | 8/2012 | Duke | |
| 8,336,502 B2 * | 12/2012 | Wilmert | A01J 7/04 119/14.18 |
| 8,342,125 B2 | 1/2013 | Torgerson et al. | |
| 8,590,486 B2 | 11/2013 | Torgerson et al. | |
| 8,770,146 B2 | 7/2014 | Buck | |
| 9,016,238 B2 | 4/2015 | Duke | |
| 9,049,835 B2 | 6/2015 | Duke | |
| 2002/0185071 A1 | 12/2002 | Guo | |
| 2003/0226520 A1 | 12/2003 | Dietrich | |
| 2004/0089242 A1 | 5/2004 | Verstege | |
| 2005/0274327 A1 | 12/2005 | Johnsson et al. | |
| 2006/0016399 A1 | 1/2006 | Torgerson | |
| 2006/0037542 A1 | 2/2006 | Denes et al. | |
| 2006/0112887 A1 | 6/2006 | Brown et al. | |
| 2007/0070803 A1 | 3/2007 | Urquhart | |
| 2007/0157887 A1 | 7/2007 | Fernandez | |
| 2007/0186860 A1 | 8/2007 | Dietrich | |
| 2007/0215053 A1 | 9/2007 | Duke | |
| 2007/0277737 A1 | 12/2007 | Maier et al. | |
| 2008/0022932 A1 | 1/2008 | Rottier et al. | |
| 2008/0202433 A1 | 8/2008 | Duke | |
| 2008/0276871 A1 | 11/2008 | Auburger et al. | |
| 2008/0314322 A1 | 12/2008 | Stellnert et al. | |
| 2009/0050061 A1 | 2/2009 | Duke | |
| 2009/0064937 A1 | 3/2009 | Rottier et al. | |
| 2009/0151641 A1 | 6/2009 | Schulze Wartenhorst et al. | |
| 2009/0165724 A1 | 7/2009 | Mader et al. | |
| 2009/0320760 A1 | 12/2009 | Torgerson et al. | |
| 2010/0132626 A1 | 6/2010 | Torgerson et al. | |
| 2010/0154900 A1 | 6/2010 | Torgerson et al. | |
| 2010/0236487 A1 | 9/2010 | Stellnert et al. | |
| 2010/0326360 A1 | 12/2010 | Duke et al. | |
| 2011/0220028 A1 | 9/2011 | Duke | |
| 2011/0220160 A1 | 9/2011 | Bosma | |
| 2011/0232575 A1 | 9/2011 | Duke | |
| 2012/0111275 A1 | 5/2012 | Torgerson et al. | |
| 2012/0118237 A1 | 5/2012 | Torgerson et al. | |
| 2012/0118238 A1 | 5/2012 | Torgerson et al. | |
| 2012/0272911 A1 | 11/2012 | Duke | |
| 2013/0199449 A1 | 8/2013 | Daniel | |
| 2014/0283751 A1 | 9/2014 | Buck et al. | |
| 2015/0201577 A1 | 7/2015 | Duke | |

FOREIGN PATENT DOCUMENTS

| | | |
|---|---|---|
| DE | 3540058 | 5/1987 |
| DE | 261300 | 10/1988 |
| DE | 4006785 | 9/1990 |
| DE | 1582939 | 6/2003 |
| DE | 10160161 | 6/2003 |
| EP | 0277396 | 8/1988 |
| EP | 0313109 | 4/1989 |
| EP | 0319523 | 6/1989 |
| EP | 0459817 | 12/1991 |
| EP | 0479397 | 9/1992 |
| EP | 0332235 | 12/1992 |
| EP | 0527509 | 5/1994 |
| EP | 0630557 | 12/1994 |
| EP | 0728412 | 8/1996 |
| EP | 0801893 | 10/1997 |
| EP | 0543463 | 3/2001 |
| EP | 1219167 | 7/2002 |
| EP | 1222853 | 7/2002 |
| EP | 1089615 | 3/2003 |
| EP | 0945057 | 7/2003 |
| EP | 1520469 | 4/2005 |
| EP | 1543720 | 6/2005 |
| EP | 1737291 | 11/2005 |
| EP | 1790217 | 5/2007 |
| EP | 1795069 | 6/2007 |
| EP | 1679956 | 12/2008 |
| EP | 2113169 | 11/2009 |
| EP | 1933616 | 1/2011 |
| EP | 2277373 | 1/2011 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002-345955 | 12/2002 |
| JP | 2002-345958 | 12/2002 |
| JP | 2002354958 | 12/2002 |
| JP | 2005-192404 | 7/2005 |
| NL | 1016237 | 3/2002 |
| NL | 1021950 | 5/2004 |
| SU | 1676538 | 9/1991 |
| WO | 93/13651 | 7/1993 |
| WO | 98/28969 | 7/1998 |
| WO | 99/27775 | 12/1998 |
| WO | 99/46978 | 9/1999 |
| WO | 99/66767 | 12/1999 |
| WO | 99/66787 | 12/1999 |
| WO | 01/17337 | 3/2001 |
| WO | 01/17338 | 3/2001 |
| WO | 02/07506 | 1/2002 |
| WO | 02/23976 | 3/2002 |
| WO | 03/030630 | 4/2003 |
| WO | 03/077645 | 9/2003 |
| WO | 03/098998 | 12/2003 |
| WO | 2004/030445 | 4/2004 |
| WO | 2004/032608 | 4/2004 |
| WO | 2005/022986 | 3/2005 |
| WO | 2005/043986 | 5/2005 |
| WO | 2005/072516 | 8/2005 |
| WO | 2005/102035 | 11/2005 |
| WO | 2006/029797 | 3/2006 |
| WO | 2006/110079 | 10/2006 |
| WO | 2006/117019 | 11/2006 |
| WO | 2006/135917 | 12/2006 |
| WO | 2007/031783 | 3/2007 |
| WO | 2007/129884 | 11/2007 |
| WO | 2007/129888 | 11/2007 |
| WO | 2008/102567 | 8/2008 |
| WO | 2008/138862 | 11/2008 |
| WO | 2009/158000 | 12/2009 |
| WO | 2010/053577 | 5/2010 |
| WO | 2011/028292 | 3/2011 |
| WO | 2011/028293 | 3/2011 |
| WO | 2011/028294 | 3/2011 |
| WO | 2014/016588 | 1/2014 |
| WO | 2015/118336 | 2/2015 |
| WO | 2015/145116 | 10/2015 |
| WO | 2015/150807 | 10/2015 |

OTHER PUBLICATIONS

3-A® Accepted Practices for Permanently Installed Product and Solution Pipelines and Cleaning Systems Used in Milk . . . , No. 605-04, (Section N), 3pp.

Akam, D.N., The Development of Equipment for the Mechanization of Manual Operations . . . 17th Annual Mtg. Nat'l Mastitis Counsel, Inc., pp. 417-426, Feb. 21-23, 1978.

Grindal et al., "Automatic application of teat disinfectant through the milking machine cluster" Journal of Dairy Research, 56:579-585 (1989).

International Search Report and Written Opinion from PCT/US2011/00322, dated Dec. 20, 2011.

Letter to Alex Ferguson from Jeffry W. Smith dated Dec. 22, 2006, 2pp.

Neijenhuis et al. Health of dairy cows milked by an automatic milking system, Oct. 2003, 23 pages.

Office Action for U.S. Appl. No. 10/576,744 dated Jun. 3, 2010, 8pp.

Office Action for U.S. Appl. No. 11/652,372 dated Feb. 11, 2008, 14pp.

Office Action for U.S. Appl. No. 11/662,454 dated Aug. 16, 2010, 20pp.

(56) References Cited

OTHER PUBLICATIONS

Office Action for U.S. Appl. No. 11/904,769 dated Feb. 20, 2008, 9pp.
Office Action for U.S. Appl. No. 12/712,787 dated Jun. 27, 2011.
PCT/GB04/004343—Written Opinion of ISA & IPRP rec'd Feb. 3, 2005, 5pp.
Wildbrett et al., "Über Reinigung und Desinfektion von Tanks" Materials and Corrosion 12(12):759-764. Nov. 1961.
PCT/US06/023075—ISR & Written Opinion rec'd Oct. 16, 2006.
PCT/US09/006026—IPRP, Written Opinion of ISA & ISR rec'd Mar. 6, 2010, 9pp.
PCT/US09/03770—IPRP and Written Opinion rec'd Jan. 13, 2011, and ISR rec'd Oct. 7, 2009.
Preliminary Amendment for U.S. Appl. No. 10/576,744, filed Apr. 21, 2006, 16pp.
Preliminary Amendment for U.S. Appl. No. 10/576,744, filed Aug. 7, 2008, 10pp.
Sheam et al., "Reduction of bacterial contamination of teatcup liners by an entrained wash system," Institute for Animal Health, Veterinary Record (1994),134,450, 1p.
Thompson, et al. "The End-Of-Milking Sequence and its Mechanization" 1976 Winter Mtg., Dec. 14-17, 1976, Animal Physiology and Genetics Inst., Beltsville, MD, 15pp.
U.S. Appl. No. 60/578,997, filed Jun. 12, 2004, Kevin L. Torgerson.
Notice of Opposition and Opposition brief for EP Patent 1737291, Filed on Aug. 26, 2014 by GEA Farm Technologies GmbH, 74 pages.
Proprietor response filed Feb. 2, 2015, Opposition of EP Patent 1737291, 53 pages.
European Search Report issued Sep. 24, 2015 for EP Application No. 15171008.4, 6 pages.
Reply filed on Dec. 16, 2015 by GEA Farm Technologies GmbH in the Opposition of EP Patent No. 1737291, 75 pages.
U.S. Appl. No. 60/566,313, filed Apr. 29, 2004, J.R.J. Duke.
U.S. Appl. No. 60/566,314, filed Apr. 29, 2004, J.R.J. Duke.

* cited by examiner

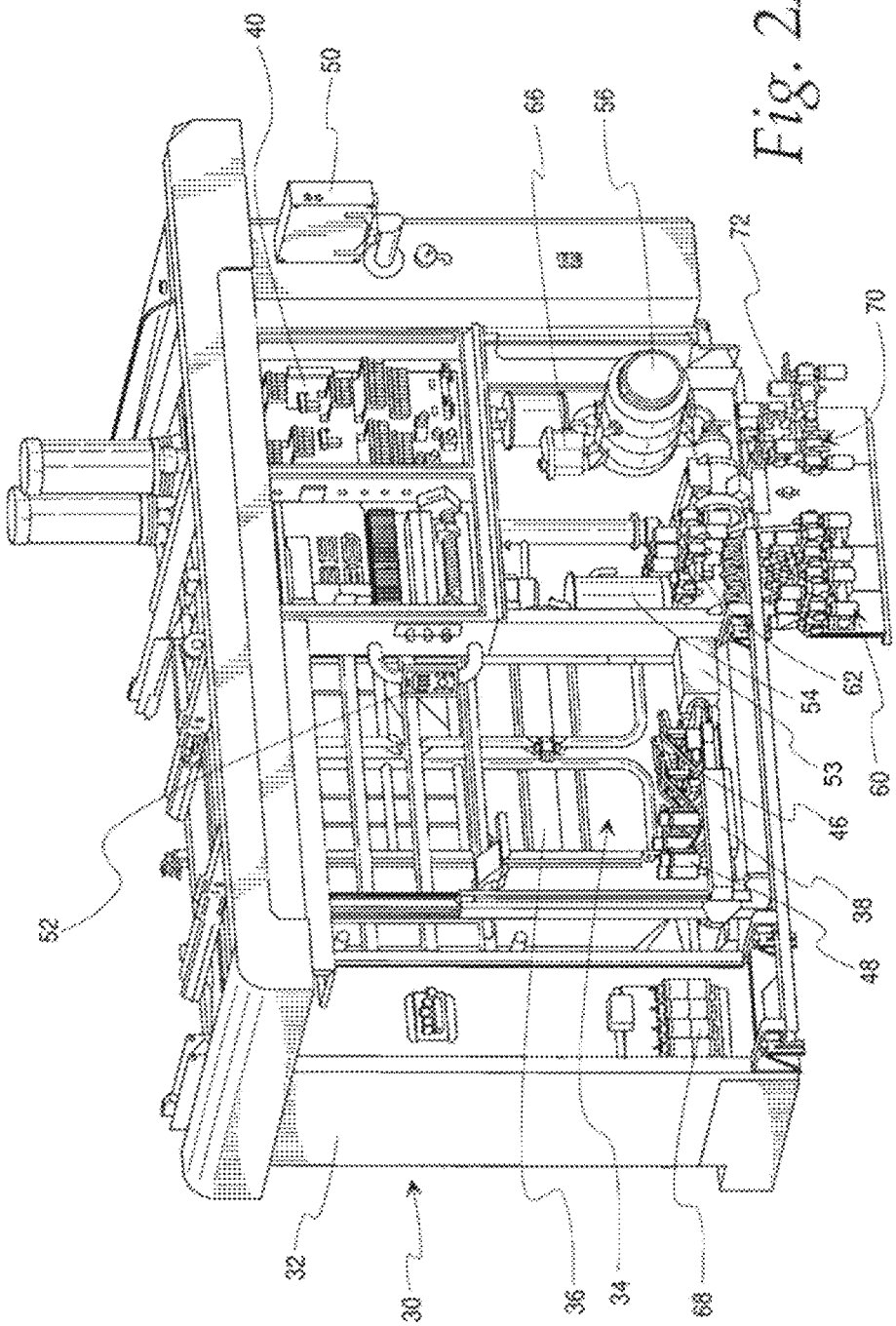

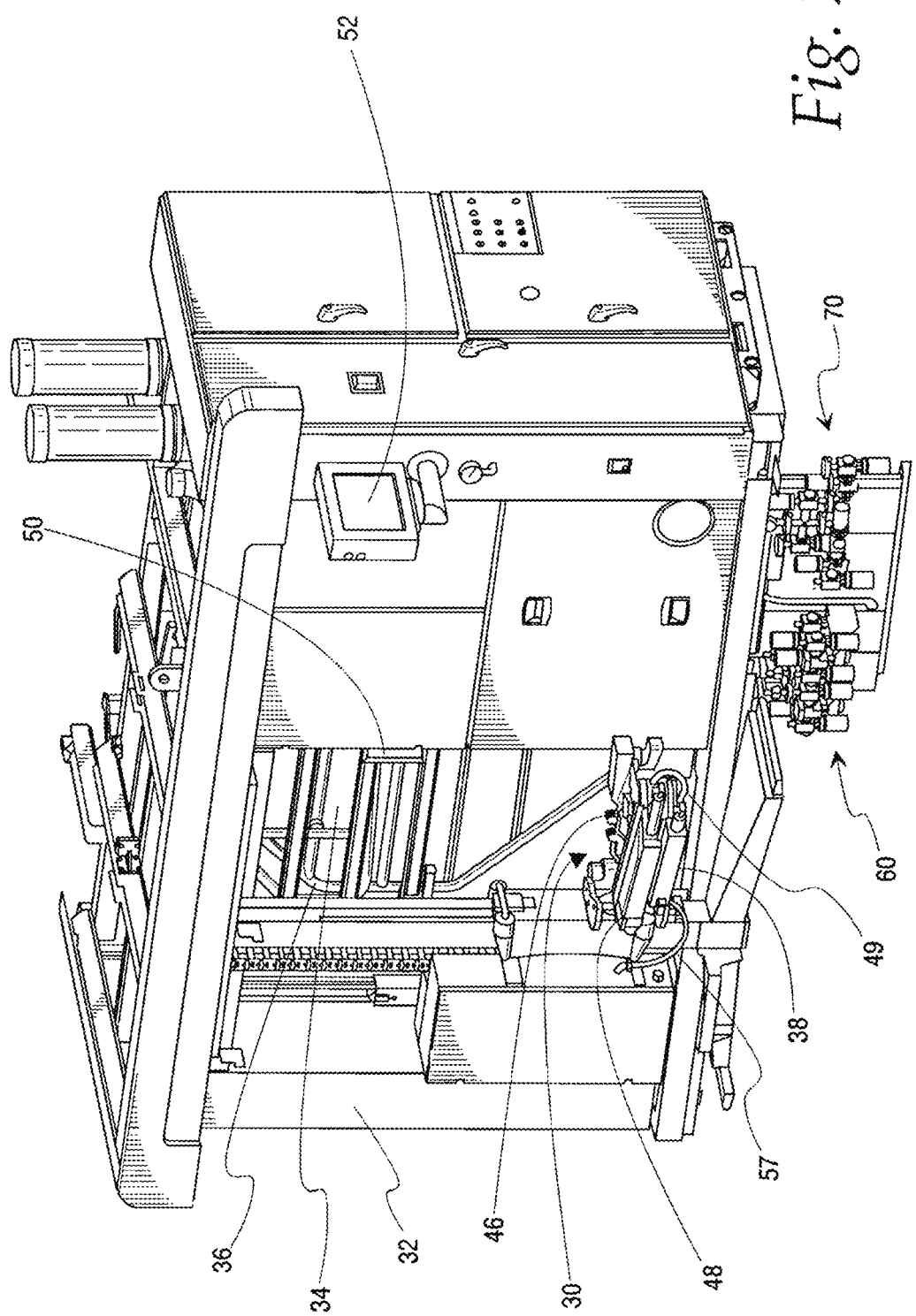

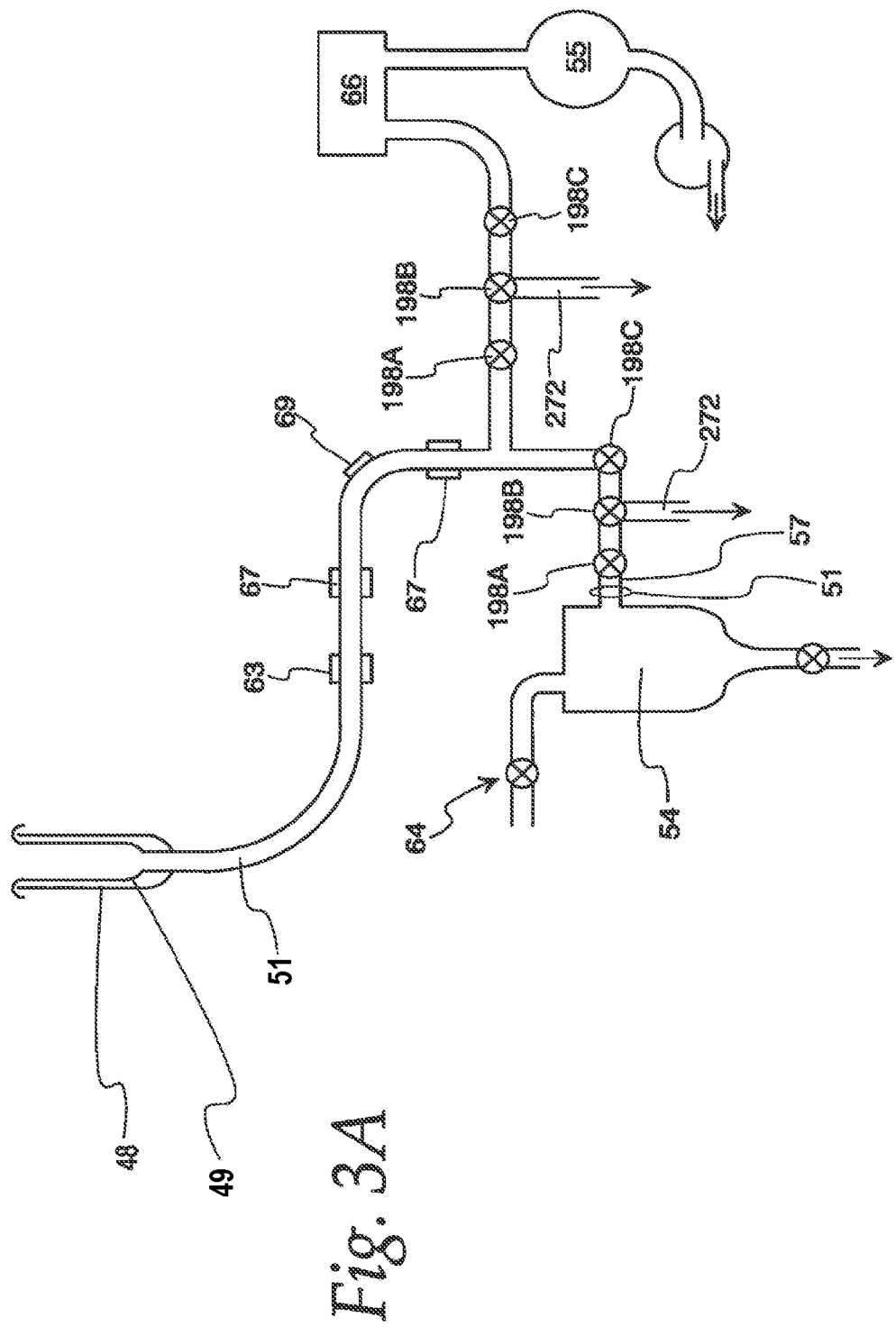

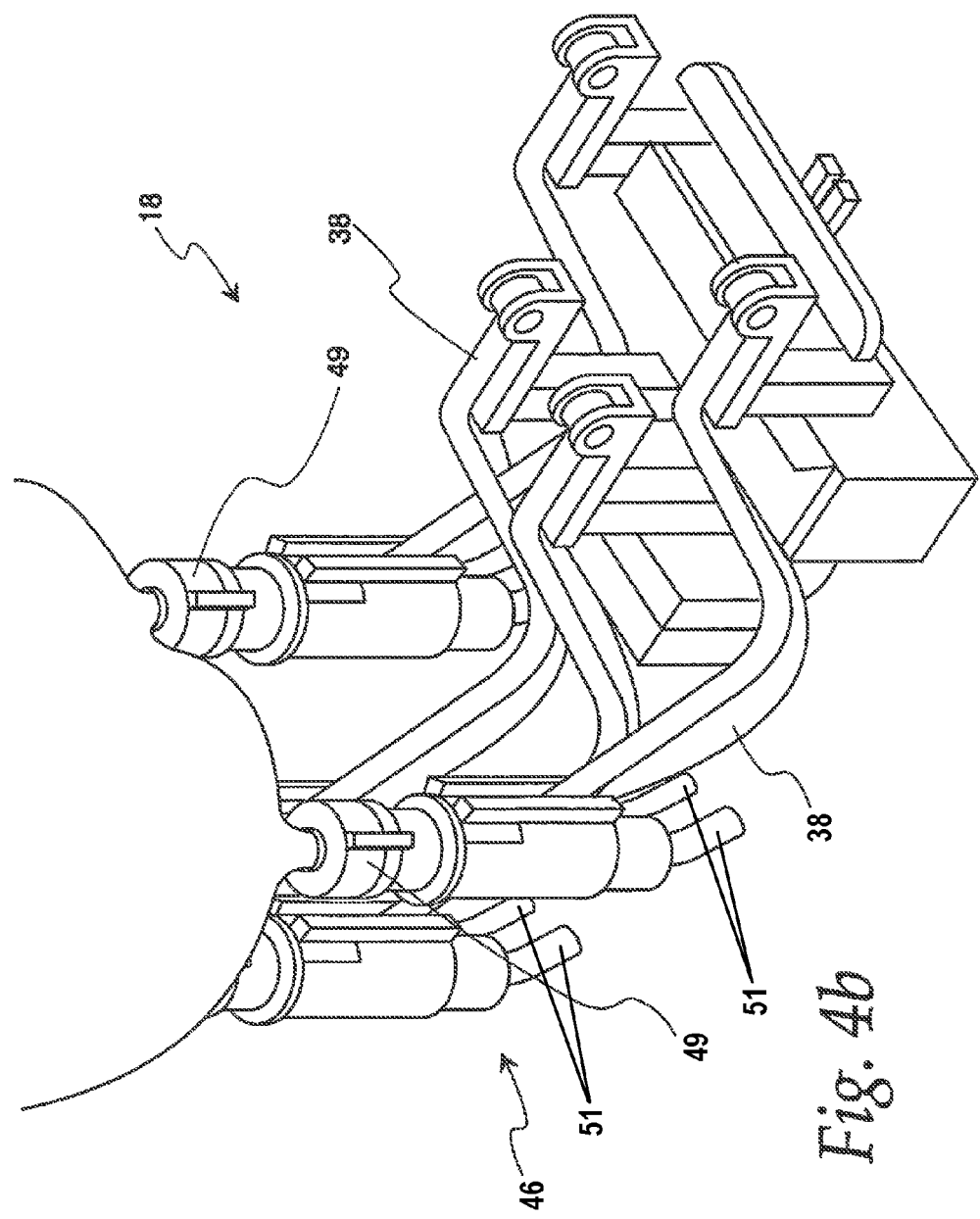

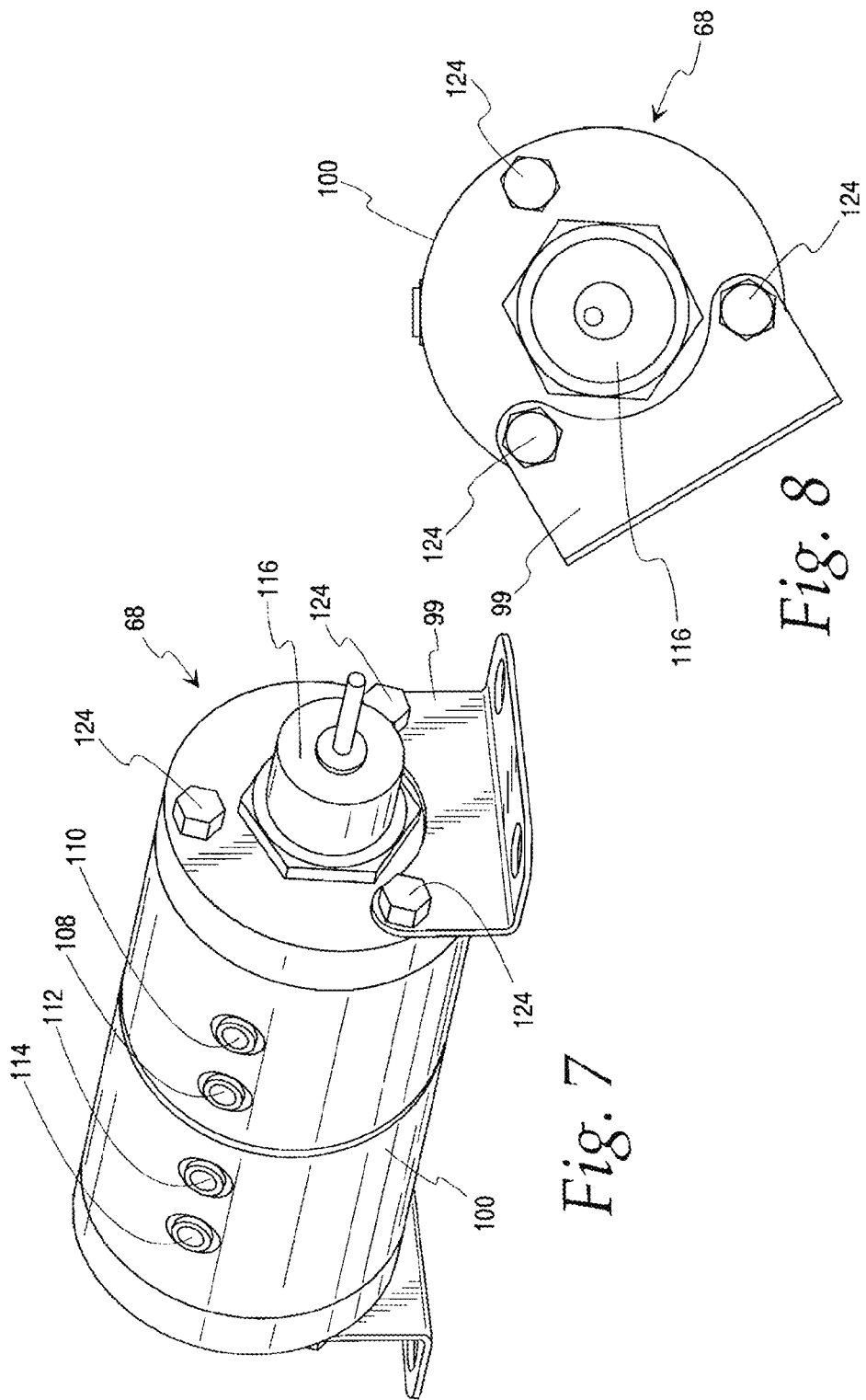

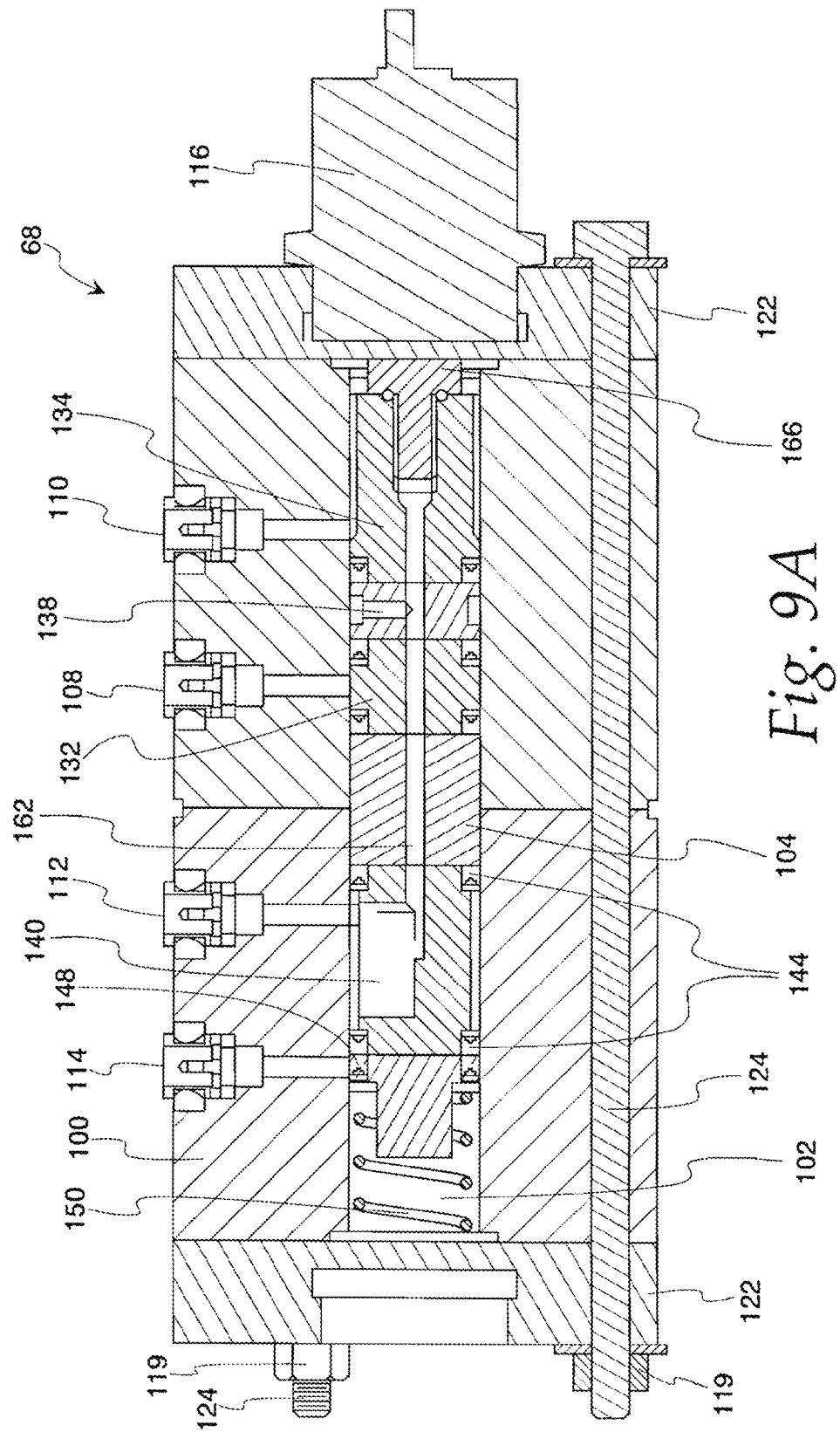

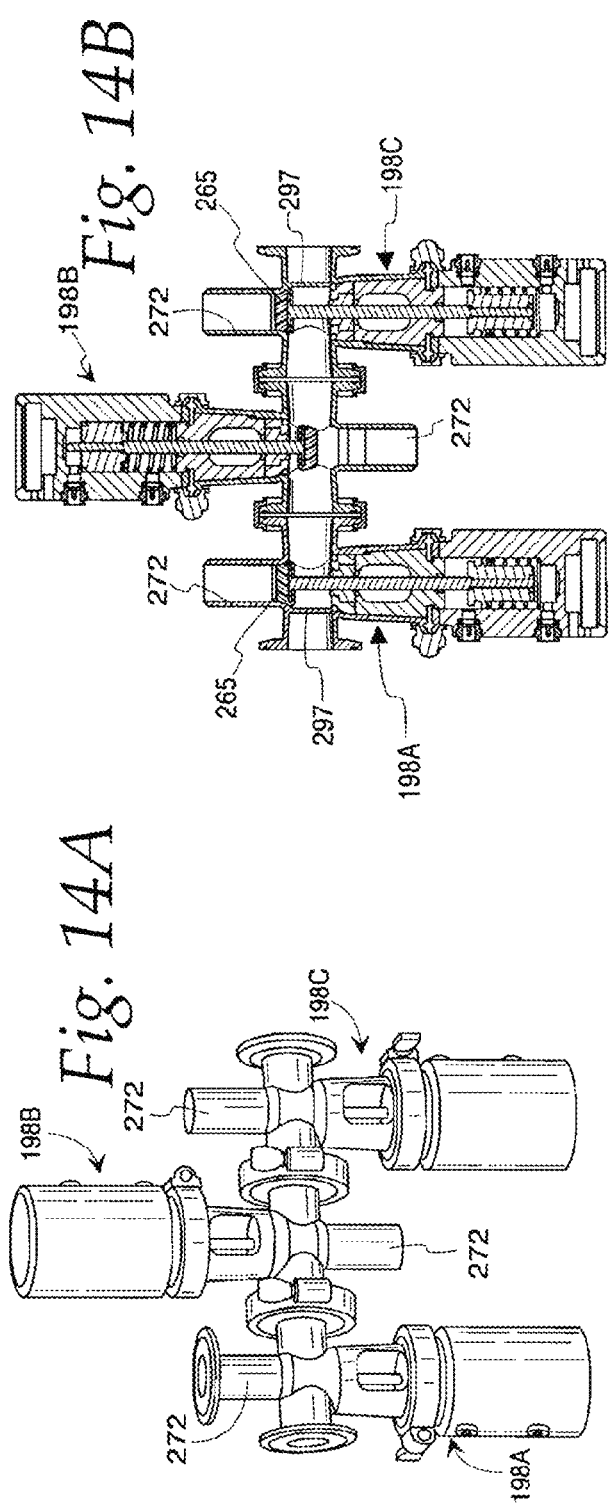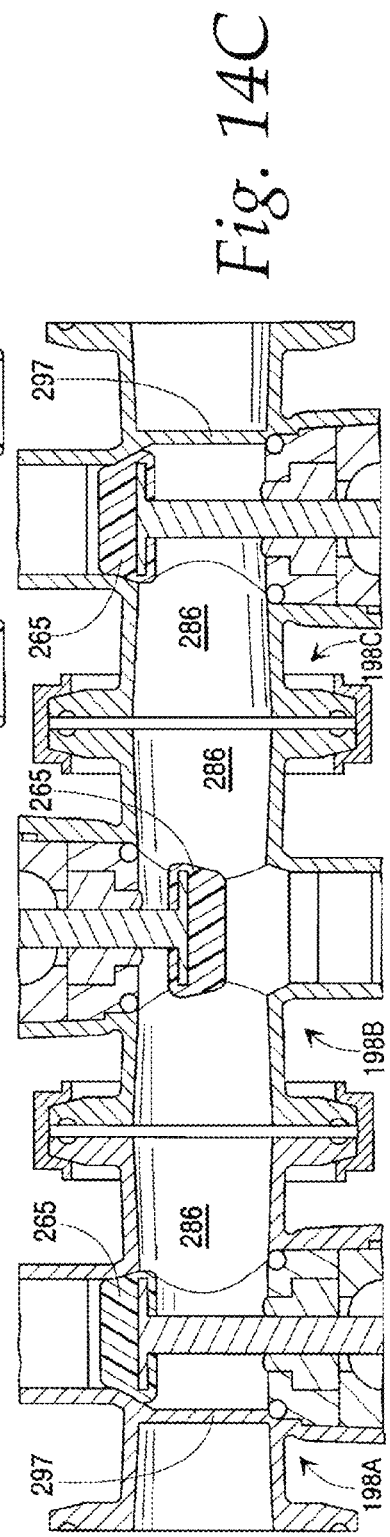

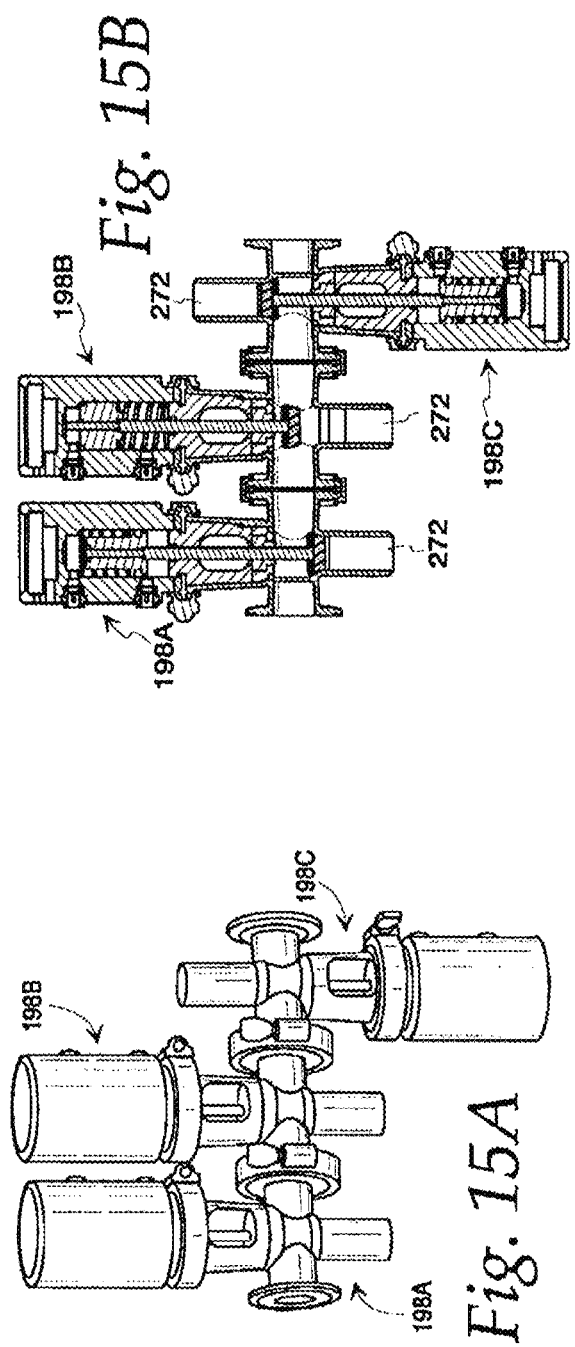
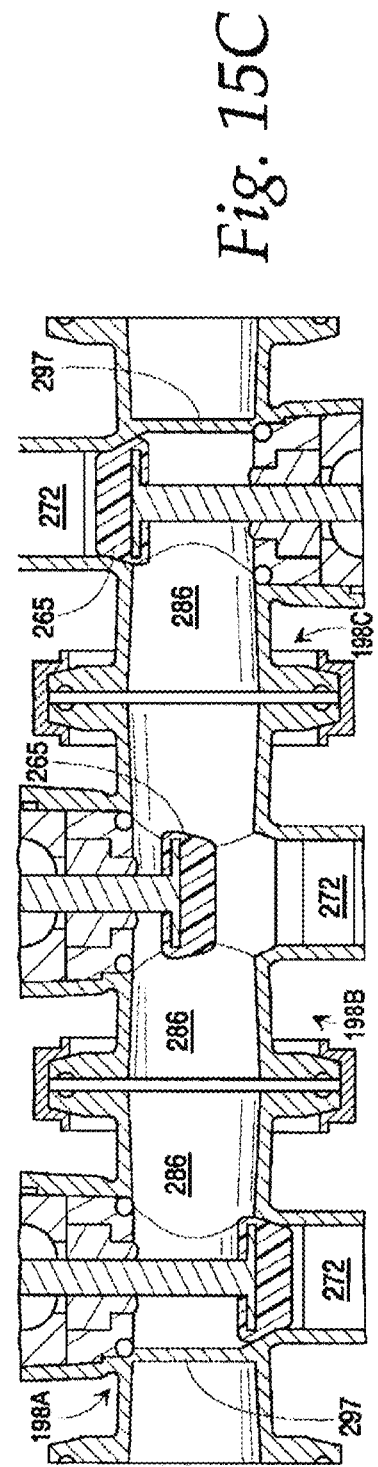
Fig. 15A
Fig. 15B
Fig. 15C

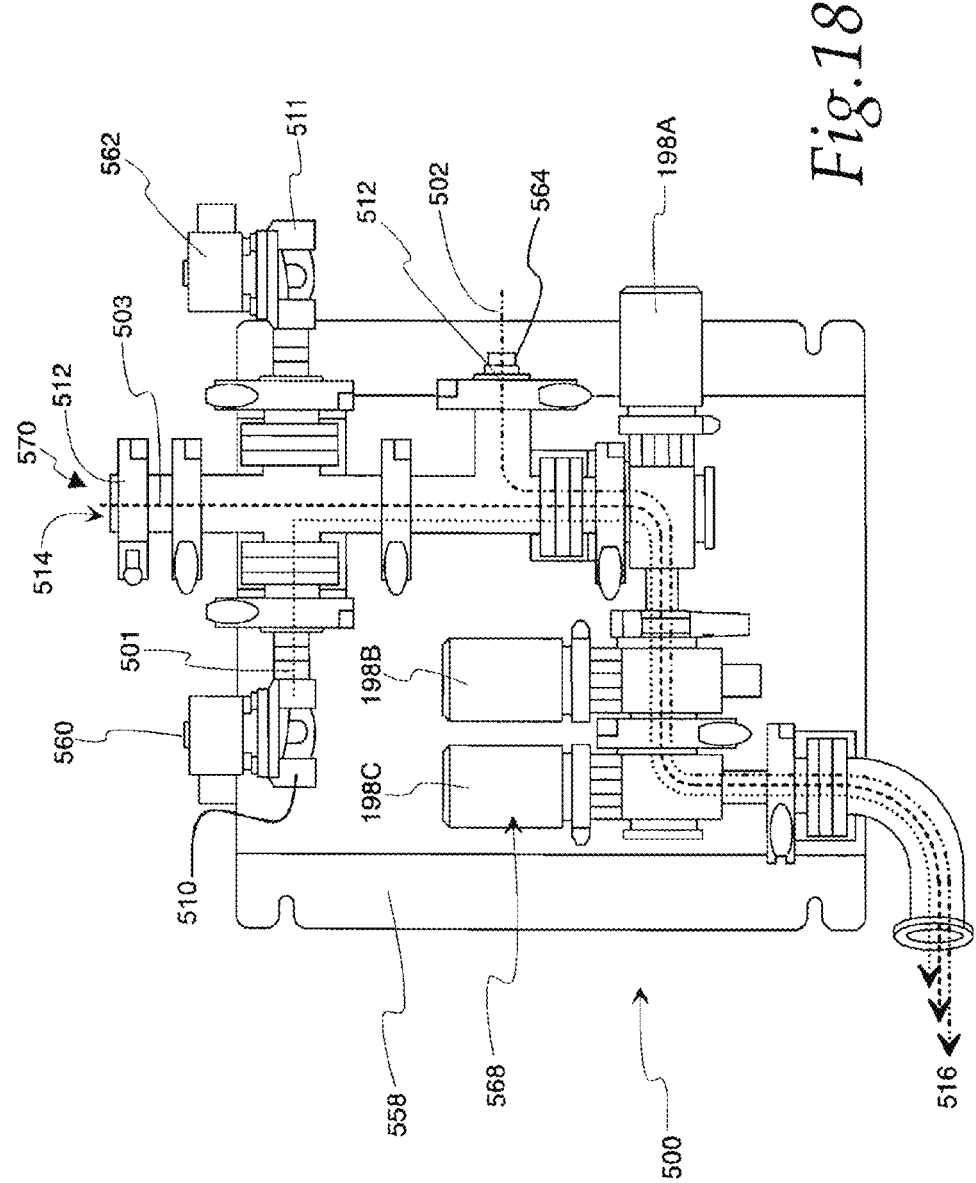

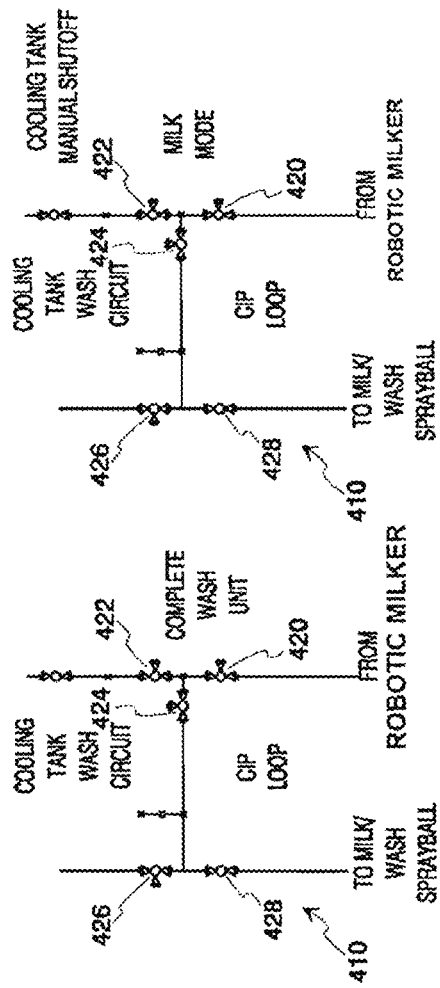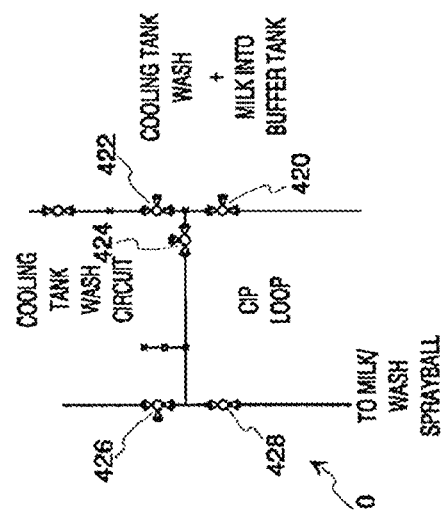

| DATE | FAT | PROTEIN | LACTOSE | FAT FREE DRY MATTER | SCC | BACTERIA | FREEZING POINT °CELCIUS -0,521°C = -0,542 °HORTVET | UREA |
|---|---|---|---|---|---|---|---|---|
| 02.03.2009 | 3,85 | 3,26 | 4,78 | 8,76 | | | | 263 |
| 10.03.2009 | 3,75 | 3,31 | 4,72 | 8,75 | 274 | 10 | -0,522 | 275 |
| 14.03.2009 | 3,78 | 3,26 | 4,78 | 8,76 | | | -0,521 | 302 |
| 22.03.2009 | 3,83 | 3,28 | 4,78 | 8,78 | 138 | 10 | | 299 |

*Fig. 22A*

| DATE | FAT | PROTEIN | LACTOSE | FAT FREE DRY MATTER | SCC | BACTERIA | FREEZING POINT °CELCIUS -0,520°C = -0,541 °HORTVET | UREA |
|---|---|---|---|---|---|---|---|---|
| 03.05.2009 | 3,71 | 3,14 | 4,85 | 8,71 | | | | 223 |
| 11.05.2009 | 3,69 | 3,05 | 4,79 | 8,56 | 129 | 10 | -0,520 | 205 |
| 17.05.2009 | 3,68 | 3,10 | 4,83 | 8,65 | | | -0,522 | 262 |
| 25.05.2009 | 3,66 | 3,06 | 4,82 | 8,60 | 156 | 10 | | 241 |

*Fig. 22B*

METHODS FOR PREPARING A DAIRY ANIMAL FOR MILKING

This application is a divisional of U.S. application Ser. No. 13/281,171 filed Oct. 25, 2011, which is a continuation in part of U.S. application Ser. No. 12/932,276 filed Feb. 22, 2011, which claims the benefit of Provisional Application No. 61/338,630 filed Feb. 22, 2010, the disclosure of which is incorporated by reference herein.

FIELD AND BACKGROUND OF THE INVENTION

The present invention relates to preparing dairy animal teats for being milked, and more particularly to teat preparation, rinsing, and milking that all take place in a milking machine teat cup liner.

Other aspects of the invention include an apparatus and methods for milking dairy animals and collecting milk, and more particularly to a dairy harvesting facility with apparatus and methods for protecting milk collecting lines and systems from various types of cleaning fluids and contaminated milk.

Dairy animal teat preparation is usually necessary before milking to prevent dirt and debris from entering milk lines and contaminating milk. Teat preparation also stimulates teats to release oxytocin and to "let down" milk in advance of milking. Stimulation increases milk pressure in the udder so that milking is efficient and reasonably fast.

Teat preparation can also include a step of applying a teat sanitizer to a teat and rinsing the teat and liner to minimize the possibility of teat sanitizer entering the milk line. Teat preparation in prior systems takes place before a milker teat cup and liner are placed on the teat. To expedite milking in robotic milking machines, for example, teat preparation can take place in a teat cup liner, but teat sanitizers and dirt must be rinsed from the liner before milking so as not to contaminate milk.

Once teat stimulation begins there can be a release of "foremilk" that is not very high in fat and contains a higher percentage of water. "Good milk" usually comes after the foremilk, and it flows out at various rates depending on milk pressure in the udder. Also, milk does not flow continuously during milking, it flows in intermittent "slugs" as a result of a pulsating pressure being applied by the teat cup liner.

Pulsation in the milking process is applied by alternating vacuum and atmospheric pressure in a chamber that is between a teat cup and the teat cup liner. A constant vacuum is applied inside the liner from the milk lines to draw milk from the teat through the hoses and other milk collecting components. This constant vacuum also secures the teat cup on the teat. The pulsation on the outside of the liner opposes the constant vacuum on the inside of the liner and results in the liner alternating between applying pressure and applying little or no pressure on a teat.

Normal pulsation rates are set to match dairy animal physiology so that milk is drawn from a teat at a reasonable rate and replenished by milk being let down from the udder while maintaining cow comfort. Applying pulsation at a relatively high rate causes the liner to apply pressure so quickly that little or no milk is let down from the udder between pulses. Thus, faster pulsation does not always result in faster milking.

The preparation process is further complicated because not all dairy animals are at the same stage of milking readiness when they enter a milking stall. Animals are sometimes referred to as "easy-let-down cows" or "slow-let-down cows." As the names suggest, easy-let-down cows enter a milking stall with relatively high milk pressure in their udders, so that once the foremilk is stripped, they are ready to be milked at a standard pulsation rate. On the other hand, slow-let-down cows have relatively low milk pressure in their udders and they require stimulation for up to 90 seconds, but even longer times may be desirable. The stimulation causes the cow to generate or release oxytocin that in turn causes the milk to be "let down" toward the teats, raise milk pressure, and facilitate milking.

Also, an individual cow can be an easy-let-down cow at some times, and a slow-let-down cow at others. Lactation cycles, milking frequency, ambient conditions, and animal health are a few of the factors affecting the readiness of a cow to be milked.

Teat preparation, therefore, is not a simple matter because cleaning, stimulation, rinsing, and stripping foremilk must all be accomplished in a short time and without risk of contaminating the milk lines to a central storage tank while accommodating the conditions of individual cows.

Of course, cows have four teats and each teat (and udder quarter) can respond somewhat independently of the others. All of the factors described above for easy-let-down cows versus slow-let-down cows can apply to each individual teat.

Further complications result when the cows are to be milked by a robotic milking machine that automatically attaches (or attempts to attach) teat cups with their teat cup liners to an animal's teats. The teat cups are not all attached simultaneously. They are usually attached one at a time, and preferably in short succession. Nonetheless, sometimes attachment attempts fail and must be retried automatically or with the aid of a dairy operator. Preparing all four teats to provide optimum milking is, thus, even further complicated given the staggered starts on the teats.

The process is further complicated when it is all done after a dairy animal's teat is attached to a milking machine teat cup and teat cup liner because sanitizers, rinses, and foremilk must not be allowed into the dairy's milk lines.

Thus, there is a need for an automated preparation process or protocol for a teat that is already in the teat cup liner with a reduced risk of contaminating the dairy milk lines.

In dairy milking systems, sanitary conditions must be maintained to the extent possible. Dirt can enter a dairy milk system through the teat cup and liner that are attached to an animal to extract milk. Vacuum is used to milk the animal and draw milk into the hoses, lines and storage tank system in the dairy. Any dirt on the animal's teats can be drawn into the system by this vacuum.

To minimize dirt in the dairy milking system, a dairy animal is prepared for milking by an operator who typically washes or otherwise cleans the animal's teats. Cleaning before milking minimizes the chance that dirt and debris will enter the milk system in the dairy while the animal is milked, and also permits the operator to extract ("strip") foremilk from the teats and massage the teats so they are better prepared for milking.

In dairies time is of the essence, so preparing the animals must be done quickly and thoroughly. At least one and sometimes two or three operators will be stationed at a milking parlor entrance to prepare and then attach a milker unit to each animal.

Milker units have teat cups and teat cup liners that cooperate with vacuum in the milking system to milk the cows. A teat cup and liner receives nearly all of the teat so any dirt on the teat could make it into the teat cup and liner and then the milk system. Logically, dirt should be removed before a teat is inserted into an inflation.

Between preparation of the animal for milking and attachment of the milker unit, it is possible that more dirt and debris could attach to the animal's teats because of the nature of a dairy environment. So even with good and efficient operators, some dirt can still make it into the milking system.

To reduce labor and improve cleaning and efficiency, there are automated teat cleaning systems that include teat cups similar in appearance to teat cups on a milker unit. Teat cups on a cleaning system wet the teats with water and/or sanitizer, and they may include brushes to aid in cleaning. Some even include pulsators that spray pulses of liquid toward the teat. After cleaning, the cleaning system cups are removed and then a milker unit is attached to the animal for milking. Attaching two separate units to the animals with the teats exposed for a brief interval in between, wastes valuable time and risks the teats becoming dirty again.

Another automated preparation system is combined with a milker unit so that only one machine is attached to an animal for preparation and milking. This saves time and ensures that the teats are not exposed to dirt between preparation and milking. This system is efficient and effective, but attaching a preparation system to a milking system may be a possible source of contamination because vacuum in the milking system could draw sanitizer, water or dirt from the cleaning system into the milking system.

Sanitizer and water used to clean teats must not be allowed to mix with milk that will be consumed by humans or calves. Moreover, dairy pipeline washing fluids and contaminated milk must not be allowed to enter milk lines that transport milk to centralized chillers and storage tanks unless the milk lines themselves are to be cleaned.

In apparatus that both clean and milk, a four-way valve separates the wash lines and the milk lines in an effort to prevent milk and milk line contamination. To further avoid contamination, a small amount of milk from the start of the milking process is diverted to a waste line to ensure that residual washing fluids are carried away before usable milk is directed to the dairy's milk lines.

Nonetheless, a four-way valve can be insufficient to prevent cleaning fluids and contaminated milk from entering the dairy milk collecting system because vacuum in the milk lines (used to draw milk to a central storage location) results in the milk line having a different pressure than the wash lines, and the wash lines are subjected to various pressures before and after a wash cycle. Differential pressure and vacuum applied on opposite sides of a four-way valve are likely to cause seepage and leaking of milk and/or cleaning fluids past seals in the four-way valve. Thus, the competing pressures in the various lines attached to the four-way valve could eventually cause valve failure and milk line contamination to some degree.

This problem is well known in dairies that use clean-in-place ("CIP") wash systems. CIP wash systems are connected to dairy milk collecting lines, which are at a position downstream to from milker units and their respective long milk tubes. Milk flows from the milk collecting lines to a dairy's central milk storage system.

To avoid contamination through valves as described above, the milk lines and CIP lines are required by FDA Regulations to be separated by a pair of spaced apart valves with a bleed vent in between the two valves. The bleed vent is open to atmospheric pressure so that pressure or vacuum in one line bleeds off without affecting the other line. This arrangement of valves and a vent is known as a "block-bleed-block" system.

When two valves are separated by a vent or "bleed" to atmosphere, there is no possibility that milk or washing fluids can be drawn past either valve because vacuum in the milk line is dissipated by the bleed vent and the two valves are physically separated, so there is no fluid communication between the two. In operation, a block-bleed-block system has one of the valves open to expose a desired pipe line to the milker unit, while the other valve is closed. Even if one valve fails, the spaced apart and vented relationship between the valves prevents cross contamination. Other teat dip applicators have been disclosed that include block-bleed-block features.

The block-bleed-block arrangement is not new to the dairy industry, but implementing a block-bleed-block system is not always possible, convenient or practical. In CIP systems, the valves and bleed vent are disposed in an easily accessible area and can be of any convenient size because they are positioned well away from the milker units and other working components of the milking system. Expense for building and maintaining these systems can be prohibitive, so when space does not permit a block-bleed-block arrangement, some milking systems are designed to segregate wash and milk lines in other ways.

One such alternative way to isolate milk and cleaning lines from one another is to manually disconnect a wash line and/or a milk line when not in use. Such a procedure is effective, but obviously requires an operator to be present between milking and washing operations. In robotic systems, the intent is to reduce operator involvement in all phases of the washing and milking operations. Requiring an operator to be involved is further complicated in robotic systems because milking machines are washed only when necessary, and not on a regular basis that would be conducive to operator scheduling. Involving an operator would likely slow down the milking process for the dairy as a whole, and would at least partially defeat the point of a robotic milking system.

Therefore, it is desirable to have an automated or robotic milking system that does not risk contamination of milk and milk lines or require operator involvement, and is practical to build, install, and maintain.

SUMMARY OF THE INVENTION

Among other things, the present invention properly prepares a dairy animal teat for milking while the teat is disposed in a milking machine teat cup liner, and protects dairy milk lines from contamination.

The invention can include a method having the steps of sealing off the liner from a good milk line; applying pulsation at a first frequency; applying a teat sanitizer to the teat while the teat is in a teat cup liner; allowing sanitizer to remain on the teat for a predetermined period of time; forcing air into the liner to at least partially dry the teat and force any remaining sanitizer toward a "bad" or waste milk line; drawing a rinsing milk from the teat (and/or supplying a rinsing fluid to rinse sanitizer toward a waste milk line); changing the pulsation rate to a second frequency; directing the rinsing milk and/or fluid to the waste milk line; sensing rinsing milk and/or fluid being directed to a waste line; closing the waste milk line and opening the good milk line; and drawing good milk into the good milk line.

Preferably, a double block valve arrangement with a vent between the blocks isolates the good milk line during teat preparation. Teat sanitizer can be applied to the entire teat surface through a passage in the milking liner. The sanitizer is preferably allowed to remain on the teat for a period of time that corresponds to optimum "kill times" for particular sanitizers. Air is forced through the passage or another opening to spread sanitizer over the teat and to purge at least some of the excess sanitizer out of the liner. Preferably, the teat sanitizer supply line is completely isolated from the milk line by a double block valve or valves. In such arrangements, the sealed valves or "blocks" are separated by a vent or "bleed" to reduce the chance of sanitizer leaking through a seal.

During preparation, the teat cup liner can be vented with air allowed in through the teat sanitizer valve. In this way, vented air can continue to be admitted to help dry the teat during the preparation process and possibly, even during milking.

In one embodiment, some "rinsing" milk is drawn from the teat and used to rinse teat sanitizer from the teat cup liner and into a waste milk line. In another embodiment, a rinsing fluid is introduced to the liner and/or a milk tube downstream from the teat cup and liner. Then, valves isolating the teat cup liner from the good milk line and the waste milk line are switched and good milk is allowed to flow to the good milk line.

One benefit of preparing and milking teats in a single teat cup is that dirt on the underside of the cow is not introduced into the milk collecting system following a teat sanitizing process that takes place before the milking teat cup and liner are attached to the dairy animal.

When the invention is being used in a robotic milking machine or other automated milking machine, a cow is identified by a controller as being acceptable for milking, a robot travels and removes a milking "cluster" (teat cups with corresponding liners) from a cleaning or "docking" station. The milking cluster is moved under the cow, the teats are located using any suitable means, and the teat cups are attached to teats. If one or more teats are not automatically located in a predetermined period of time, vacuum is shut off and the teat locating process is attempted again.

Vacuum with pulsation is applied to the liner when searching for a teat so that when a teat is located, vacuum attaches the cup and liner to the teat and then remains on throughout preparation process and milking. As described below, pulsation can be varied during the preparation process.

The controller can be accessed to determine an individual animal's milking and health record and the record can be displayed on a screen. Also, the individual animal's history of responses to the preparation process can be used to determine appropriate pulsation rates and durations during the preparation process.

When the teat location process begins, valves to and from the teat cup liner are positioned to divert all fluid flow to a waste milk or "bad milk" line of any suitable type that leads to any suitable receptacle for disposal or further analysis. The "first" pulsation rate used at the start of the preparation process is preferably not the same as the "second" pulsation rate used during normal milking. Preferably, the first pulsation rate is significantly higher than a "normal" milking pulsation rate so that the liner applies longer contact pressure against the teat. This higher pulsation rate can draw some of the foremilk from the teat, but preferably it only stimulates the teat to increase milk pressure in the udder.

Also, this first pulsation rate can be at the same or lower pulsation rate, can be used for any desired time or any variable period of time. Preferably, the first pulsation rate is relatively high and lasts up to about 90 seconds. Duration periods used herein are not intended to be exact, because different factors affect when the pulsation actually begins or stops acting on the teat. Approximate pulsation duration rates indicated throughout this specification are therefore appropriate.

In the present invention, some milk is drawn from the teat into the liner and into a first milk line joined to a downstream end of the liner. The first milk line leads to the waste milk line and to the good milk line. Rinsing milk or other rinsing fluid is directed to help rinse sanitizer and dirt from the liner. The milk that performs the rinsing process is referred to herein as "rinsing milk." Nonetheless, some "good milk" will likely be drawn into the waste milk line to adequately rinse sanitizer from the liner, the rinsing milk is not necessarily waste milk.

Indeed, it is desirable to avoid using good milk to rinse sanitizer from the teat liner. One method for doing so, is to introduce rinsing fluid and/or air into the liner to rinse sanitizer and thereby avoid using good milk for this purpose. Preferably, the rinsing fluid is introduced to the first milk tube downstream from the teat to prevent contamination of the teat and minimize wasting good milk.

The terms "rinsing milk" and "rinsing fluid" are used interchangeably herein and those terms as well as combinations thereof are sometimes referred generically "rinsing fluid." Rinsing milk can include the foremilk, and/or good milk, and it can also include sanitizing fluid, air or any other fluid or debris being rinsed from the liner. The rinsing milk used to rinse the liner preferably includes a minimal amount of good milk because sending good milk to the waste milk line reduces milk yields.

The rinsing fluid can be monitored in the milk cup liner, first milk line, waste milk line, waste milk receptacle, or any other suitable location. Preferably, there are one or more sensors in the first milk line to determine one or more factors, such as: whether any rinsing milk and/or rinsing fluid is flowing, the frequency of any "slugs" of rinsing milk passing into the waste milk line; or the mass, volume, flow rate, conductivity or any other property of rinsing milk that provides useful data regarding the preparation process and completeness of rinsing. Other types of data can also be collected that relate to cow health or other characteristics, if desired.

Each rinsing fluid sensor sends corresponding data to the controller to determine whether adequate rinsing has occurred. The adequacy of rinsing depends on a number of factors and can be accounted for in the controller using a suitable empirical formula or other factor such as a predetermined length of time of rinsing milk flow. Thus, it is possible, but not necessary to directly determine the quality of the rinsing milk because a volume of slug frequency generally corresponds to the amount of rinsing fluid that is known or predicted to be adequate for rinsing.

After rinsing, the waste milk line should be closed and the good milk line should be opened. The liner can be "vented" from the sanitizer valve as described above. Data from the rinsing fluid sensor might also be used to transition pulsation from the first pulsation rate to the second pulsation rate.

It is also possible to use a good milk line sensor to determine whether milk flowing in the good milk line is relatively free of sanitizer and rinsing fluid. This is not necessary, but can be useful if desired.

In any event, the transition from sending rinsing fluid to the waste milk line to drawing additional milk into the good milk line can be determined by the controller using predetermined criteria about the rinsing fluid, the length of time rinsing fluid is flowing into the waste milk line, arbitrary time standards or any other factor that ensures adequate rinsing while minimizing waste of good milk.

As stated above, two pulsation rates are preferably used. The second pulsation rate is preferably a normal milking pulsation rate, but other rates can be used in the invention. The transition from the first pulsation rate to the second pulsation rate does not necessarily correspond to the switch from draining rinsing fluid to collecting good milk. For example, a slow-let-down cow might not give any significant amount of foremilk or good milk while the first pulsation rate is being applied.

In such a case, milk might not be drawn from the teat until the second pulsation rate is started. The second pulsation rate is preferably a "normal" rate for milking cows and it may be required to begin drawing a sufficient quantity or flow rate of rinsing milk. As stated above, the rinsing milk and/or rinsing fluid is necessary to remove as much of the teat sanitizer as possible before good milk can be drawn into the good milk line. So in the case of a slow-let-down cow, the second pulsation rate (or pulsation frequency) might be used for a period of time before transitioning to good milk being collected in the good milk line.

On the other hand, an easy-let-down cow might not need as much stimulation at the first pulsation frequency and an adequate amount of rinsing milk will flow during stimulation. Once the sensor determines rinsing milk and/or data that shows adequate liner rinsing, the pulsation rate can be changed to the second (more normal) rate and the valves can be switched to close the waste milk line and open the good milk line.

In some cases, the first pulsation rate can be less than the second pulsation rate or be proceeded or followed by a third pulsation rate. Regardless, other factors can affect teat preparation, such as timing, venting, and others. It is also possible to have a third pulsation rate or a gradually changing pulsation rate leading to the second pulsation rate. A gap in applying pulsation is also possible.

Of course, the present invention ensures proper teat preparation, rinsing and milking of dairy animals, but other aspects of the present invention enable operators or inspectors to visually verify proper operation using transparent valves, milk lines, computer display screens, or combinations of these.

The present invention protects dairy milk lines and collection systems by providing: a dairy animal milking apparatus having a milking stall for receiving a dairy animal, a milker unit having a plurality of teat cups, each teat cup for receiving a respective teat of the dairy animal, a teat wash conduit in fluid communication with at least one teat cup, a teat wash valve assembly in communication with the teat wash conduit, and the teat wash valve assembly is movable between a teat wash position and a closed milking position, a box wash valve assembly in communication with the milker unit, and the box wash valve assembly is movable between a box wash position and a closed milking position, a clean-in-place conduit in fluid communication with the milker unit, a clean-in-place dispenser assembly in fluid communication with the milker unit and movable between a clean-in-place position and a closed milking position, a milk conduit in fluid communication with the milker unit, a good milk valve assembly in fluid communication with the milk conduit, and movable between an open position for passing good milk and a closed position, a calf milk valve assembly in fluid communication with the milker unit, and movable between an open position for passing calf milk and a closed position,
a bad milk valve assembly in fluid communication with the milker unit, and movable between an open position for passing bad milk and a closed position, and a controller for opening and closing the valve assembly to control; teat washing, box washing, clean-in-place washing, and milking; and for opening and closing valve assemblies to control the flows of good milk, calf milk, and bad milk. A milk factor can be used to activate the controller, and the milk factor can include a milking time factor, a milk quality factor, and a milking time factor and a milk quality factor.

The invention can further include a milking timer to clock a milking time, and in communication with the controller to transmit milking time data that can be used to open and close the good milk valve assembly, the calf milk valve assembly, and the bad milk valve assembly. The milk quality data can be used to generate the milk factor.

The invention can further include a milk quality sensor to obtain milk quality data on milk from the milker unit, and in communication with the controller to transmit milk quality data that can be used to open and close the good milk valve assembly, the calf milk valve
assembly, and the bad milk valve assembly.

The invention can further include a milking timer to clock milking time and in communication with the controller to transmit milk time data to the controller,
a milk quality sensor to obtain milk quality data on milk from the milker unit, and in communication with the controller to send milk quality data to the controller, and
the controller compares milk time data and milk quality data to open or close the good milk valve assembly, the calf milk valve assembly, and the bad milk valve assembly.

The teat cleaning valve assembly can include a first blocking seal, a second blocking seal spaced apart from the first blocking seal, and a bleed vent disposed between the first blocking seal and the second blocking seal.

The invention can also include a good milk receiver in fluid communication with the good milk conduit or a bad milk receiver in fluid communication with the bad milk conduit or both. The bad milk receiver can be in fluid communication with the bad milk conduit and the box wash conduit, and the good milk receiver in fluid communication with the good milk conduit and the box clean conduit.

The invention can also include a bulk tank in fluid communication with the good milk conduit and the clean-in-place conduit, a clean-in-place dispenser assembly in fluid communication with the bulk tank and the clean-in-place conduit,
a milk valve assembly in communication with the good milk conduit, a branch valve assembly in communication with and disposed between the good milk conduit and the clean-in-place conduit,
a milk wash tank valve assembly in fluid communication with the bulk tank and the branch valve assembly, and a bulk tank drain valve assembly in fluid communication with the bulk tank.

The invention can also include a proximity sensor disposed to collect teat wash valve assembly data and is in communication with the controller to transmit data to the controller.

The invention can also include a milk flow sensor in fluid communication with the milker unit and in communication with the controller to transmit milk flow data to the controller, and an air purge in fluid communication with the milk flow sensor to at least partially purge milk from the milk flow sensor. A milk quality sensor in fluid communication with the milker unit can be used, and it can include a milk collection chamber for receiving a milk sample for quality testing, and the milk collection chamber defines an inlet for receiving milk at a first flow rate and an outlet for discharging milk at a second flow rate that is less than the first flow rate.

The teat cleaning valve assembly of the invention can include a valve assembly block defining a chamber, a water inlet in communication with the chamber, an air inlet in communication with the chamber, a bleed vent in communication with the chamber, an outlet in communication with the chamber, and a spool disposed for movement at least partially in the chamber, and the spool comprises a plurality of lands and recesses for selectively opening and closing the water inlet, air inlet, bleed vent, and the outlet in relation to the spool's position in the chamber. The spool can be biased to close the outlet, and it can define a bore in communication with the bleed vent when the spool is in a bleed position and in communication with the outlet when the spool is in a cleaning position.

The clean-in-place conduit can be in fluid communication with the milk collection system and the milker unit teat cups when the milker unit is in a storage position. A clean-in-place manifold in fluid communication with the clean-in-place conduit can be used, so that the clean-in-place manifold is in fluid communication with at least one milker unit teat cup when the milker unit is in a storage position.

The present invention also overcomes the shortcomings of prior automated dairy animal preparation and milking systems by providing a milker unit having a plurality of inflations, and each inflation includes a teat cup and a flexible liner. The system includes a sanitizer source, and a sanitizer conduit between the source and the inflation. Sanitizer fluids, such as sanitizer, water, and/or air flow through the sanitizer conduit to the inflation where it cleans a teat disposed therein. Used sanitizer and any accompanying dirt flow down through the inflation, through a drain, and into an appropriate receptacle or disposal system. This is referred to herein as "preparation" or the "preparation stage." After preparation, the sanitizer conduit and waste collection system are sealed off from the inflation and normal milking operations can begin by opening a line to a milk collector.

Differential pressures in the inflation, and sanitizer conduit and related components can draw sanitizer fluids into the milking system. To prevent this, the present invention provides in the sanitation conduit a number of valves that are separated by a vent or drain. During the preparation stage, the valves are open to permit sanitizer, water and/or air to flow through the sanitizer conduit. Another valve closes the vent to prevent sanitizing fluids from flowing out of conduit.

During milking, the valves are closed and the vent is open. Both valves prevent sanitizer fluids from flowing into the inflation. Nonetheless, even the best valves can be subject to leakage over time due to wear and differential pressures on opposite sides of the valve, for example. In the present invention, vacuum or other pressure differentials cannot draw sanitizing fluids through the valves and into the inflation because the vent provides air at atmospheric pressure between the valves to obviate the effect of the vacuum.

The downstream valve may suffer from some leakage, but the vacuum or pressure differential from the inflation cannot draw any leakage through the upstream valve (closest to the sanitizer source) because the intermediate vent causes pressure in the sanitizer conduit to be essentially at atmospheric pressure regardless of influences from the milk system vacuum. As stated above, this arrangement is sometimes referred to as "block-bleed-block" because two valves block the conduit and the intermediate vent bleeds the conduit of vacuum and other pressure differentials. Thus, the milking system is protected from any valve leakage of sanitizer fluids.

The sanitizer conduit can communicate with the inflation through inlets in the shell or in the liner, so long as sanitizer fluids reach the teat and are able to wash away from the milking system. The sanitizing fluids can include sanitizer, water, air or any other suitable fluid. Sanitizer or water can be used first to rinse dirt off the animal's teats. Water can be used to rinse the teat of sanitizer, and air can be used to dry the teat and push through any sanitizer liquids that remain in the inflation.

Sanitation fluids can be fed to the inflation through a valve assembly that uses any appropriate type of valves for controlling fluid flow. The valve assembly can include valves and vents to perform the block-bleed-block function.

The system can also be used with any other automated systems such as robotic machines that attach preparation systems and milker units to cows, as well as, teat dip applicators and backflushing systems as disclosed in U.S. Patent Application Publication Nos. US 2010-0139723 A1, and US 2010-0154900 A1, and U.S. Pat. No. 8,025,029 which are incorporated herein by reference.

One possible functional overview of the present invention when used in a robotic system includes the following: Step 1) Robot Arm Cluster Retrieval; Step 2) Cup Attachment; Step 3) Teat Cleaning; Step 4) Teat Drying; Step 5) Overview of Data; and 6) Print or display of a Summary.

More specifically, the method includes: Step 1: Robot Arm Retrieves a Teat Cup Cluster from Storage Position, when a dairy animal enters the milking box an identification system recognizes a dairy animal as ready to milk; the robot travels to the milking box; a robot arm grasps a milking cluster (milking cups are attached to the milk rack, suspended above the floor); and milking cup attachment begins.

Step 2: Milk cup attachment occurs when a 3-D camera locates the teats and the milking cups and attaches the cups to each teat individually; a vacuum sensor detects a positive attachment; if the sensor is not activated within five seconds, for example the teat vacuum is shut off to that cup and the robot attempts a re-attachment; and pulsation is active throughout the attachment process.

Step 3: Teat cleaning with sanitization fluids is performed on each teat through an orifice in the milking cup; water is applied through the orifice in the cup after the sanitizing solution to rinse the teat and milk line (for example, fluid flows at approximately three liters/min through the orifice); filtered air is admitted through the orifice to flush the line of cleaning solution and debris; pulsation and teat end vacuum are active throughout the cleaning process (strips the foremilk and removes debris from teats); all cleaning solution and any stripped foremilk is directed into a pre-milk (waste) jar; block-bleed-block valve configuration separates the pre-milk jar from a good milk receiver.

Step 4: Teat drying occurs after the teat preparation cycle is finished. A programmable drying time begins and the remaining teat cleaning solution and foremilk continue to be diverted into the waste jar. The teats are allowed to dry by means of the applied vacuum and airflow with teat preparation complete, milking begins and programmable stimulation is available for each individual dairy animal.

System advantages for the preparation procedures of the present invention include: teat cups remain closed throughout cleaning and milking, reducing possibility of contamination (no cross-contamination of teats, nothing can splash onto teats after cleaning, nothing can fall into milking cups after cleaning—no debris from cow's udder or belly, fly free, and no dirty air, no teat is milked unless it is cleaned first); cleaning cycle removes debris and bacteria from teats and milk line—a block-bleed-block valve configuration separates cleaning cycle solutions from the milk line; unique cluster keeps milking cups suspended minimizing risk of floor contact; all fluid flows down and away from the cow; the default path of milk flow is always to the drain before diverting good milk to the receiver; barn layout creates a clear division of two areas; special needs cows can easily be housed and milked separately; easily able to attach cows manually; and multi-box system allows shortest milk transfer system possible.

Other advantages and details are described below.

BRIEF DESCRIPTION OF THE DRAWINGS

FIG. 2A is a perspective view of the milking apparatus of the present invention incorporated into a robotic milking machine;

FIG. 2B is a partial perspective view of the milking apparatus of FIG. 2A from the opposite perspective;

FIG. 3A is a schematic view of a dairy animal preparation and milking system in accordance with the present invention;

FIG. 4B is a partial perspective view of dairy animal preparation and milking system in accordance with the present invention.

FIG. 7 is a perspective view of a teat preparation valve assembly;

FIG. 8 is an end view of the teat preparation valve assembly;

FIG. 9A is a cross-sectional view of the teat preparation valve assembly in a milking position taken along line 9-9 in FIG. 8;

FIG. 14A is a perspective view of a bad milk valve assembly in accordance with the present invention;

FIG. 14B is a cross-sectional view of three valves to form a bad milk valve assembly in a closed position in accordance with the present invention;

FIG. 14C is a partial cross-sectional view of three valves to form a bad milk valve assembly in an open position in accordance with the present invention;

FIG. 15A is a perspective view of a good milk valve assembly in accordance with the present invention;

FIG. 15B is a cross-sectional view of three valves to form a good milk valve assembly in a closed position in accordance with the present invention;

FIG. 15C is a partial cross-sectional view of three valves to form a good milk valve assembly in an open position in accordance with the present invention;

FIG. 18 is a front view of a clean-in-place valve arrangement of FIG. 17;

FIG. 19A, B, C are front view schematics of the clean-in-place valve assembly in accordance with the present invention;

FIG. 22A is a milk quality chart indicating performance of at least one embodiment of the present invention;

FIG. 22B is a milk quality chart indicating performance of at least one embodiment of the present invention;

DETAILED DESCRIPTION OF THE INVENTION

To the extent reasonable and practical, the same identification numeral will be used to identify the same or similar feature in each of the figures.

Figure 1:
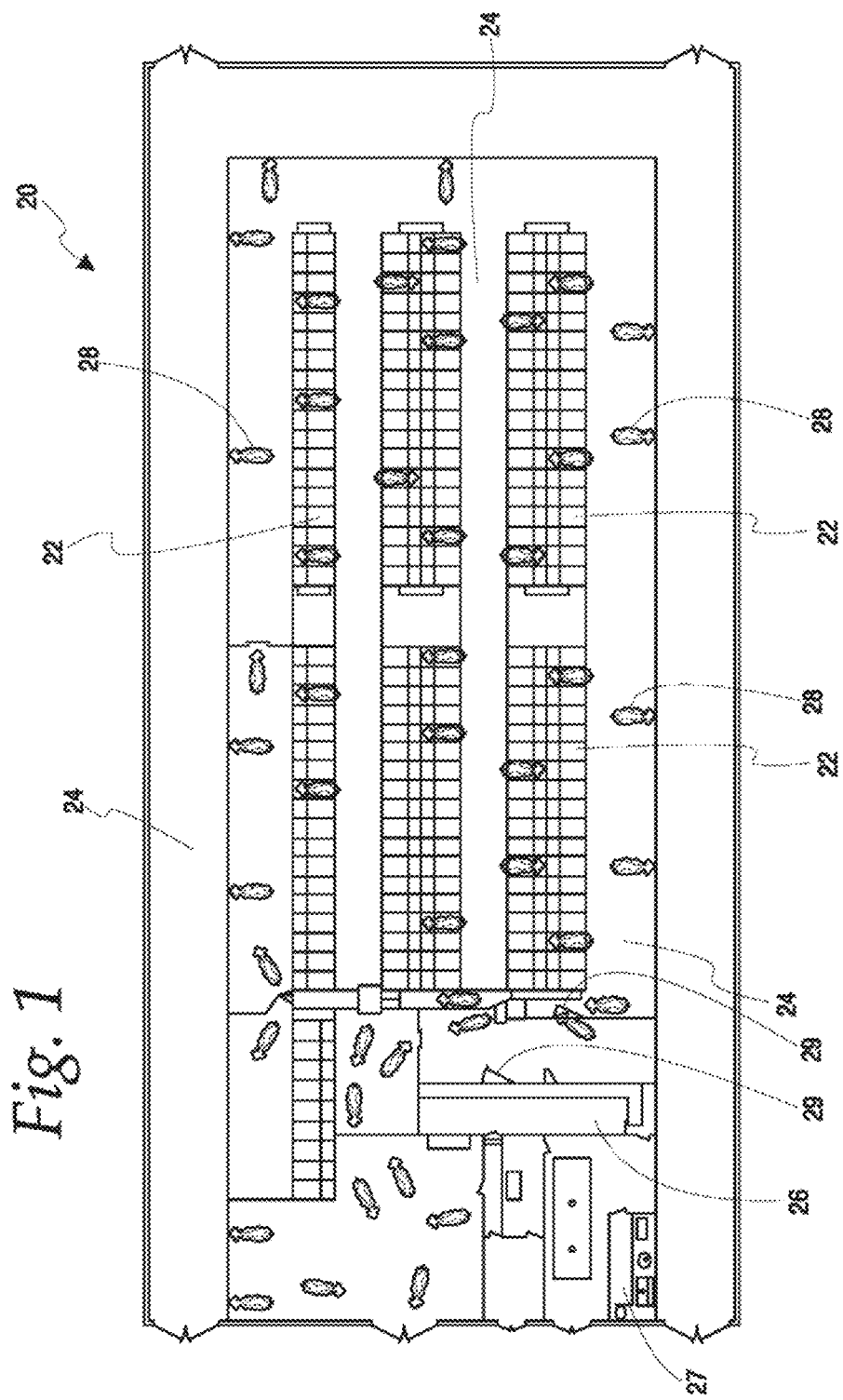
FIG. 1 is a schematic view of a dairy milking parlor in which there is a robotic milker with a milking machine in accordance with the present invention.

Illustrated generally in FIG. 1 is a dairy harvesting facility 20 having stalls 22, alleys 24, and milking stalls 26. Dairy animals 27 move through the dairy harvesting facility 20 to feed, rest, and be milked in the milking stalls 26. Control gates 29 can be used to sort cows or to prevent them from entering a particular area. Preferably, an animal identification system is used to identify cows for sorting and correlating to milk, illness, and other purposes.

The milking stalls 26 can be of any shape or arrangement, and be stationary or rotatable. Animals can be allowed to enter the milking stalls at will or be controlled by gates 29 that are selective based on the animal's history of milking or health considerations. Animals can also be moved into the milking stalls 26 by an operator.

In a preferred embodiment of the invention, the milking stall 26 is equipped with a robot 30 (FIGS. 2A and 2B) that attaches the preparation and milking system of the present invention to an animal. Nonetheless, the present invention could be used in any dairy harvesting facility 20 regardless of how the system is attached to dairy animals.

In either case, a controller 40 is used to initiate the preparation process and fire each valve in an appropriate sequence. The controller 40 can also receive data from related sensors and monitors. Data can be stored, printed, displayed or otherwise utilized to improve and monitor preparation procedures.

In a robotic application, once an animal is identified in the box as being an animal acceptable for milking, the robotic milking machine 30 travels to the box and removes the milking machine cluster 46 from its cleaning station. The milker unit cluster 46 is moved under the dairy animal with robotic support arms 38 that can include tubes for vacuum to operate as indicated below, teats are located and all teat cups 48 are attached to teats. Vacuum with pulsation is applied for a predetermined time when searching for a teat. If a teat is located, vacuum and pulsation remain on throughout prep process. If teat is not located, vacuum is shut off and teat location is attempted again.

Illustrated in FIGS. 2A and 2B is the robotic milking machine 30 having a housing 32, a milking stall 34, a control gate 36, a robotic support arms 38, a controller 40, a milker unit 46, a key pad 50, a display screen 52, a preparation fluid receiver 54, a good milk receiver 56, a bad milk valve assembly 60, a good milk valve assembly 62, a box wash valve assembly 66, a calf milk valve assembly 70, a final milker machine valve assembly 72.

The milker unit 46, milk collecting system, box washing system, and clean-in-place milk collecting and wash system can perform several synchronized functions, including: dairy animal teat preparation before milking; dairy animal milking; teat dip application, milk and cleaning fluid disposal; milk collection; milking apparatus cleaning; and dairy milk collection system cleaning. Not all of these functions are required to support one another, and various individual functions and combinations of functions are within the scope of the invention because they share similar safety features.

Robotic Milking Machine Functions

Generally, the robotic milker 30 operates without an attendant, so a dairy animal such as a cow, enters the milking stall 34 on its own, is automatically secured by the control gate 36, fitted with the milker unit 46 by the robotic arm 38, prepared for milking by cleaning fluids flowing through the teat preparation valve 68 that includes a valve set 70 for metering sanitizing solution and at least a portion of the milker unit 46, and then milked by the milker unit 46. A preferred robotic milking system is available from GEA Farm Technologies GmbH of Bönen, Germany under the brand name MIone.

Figure 3B:
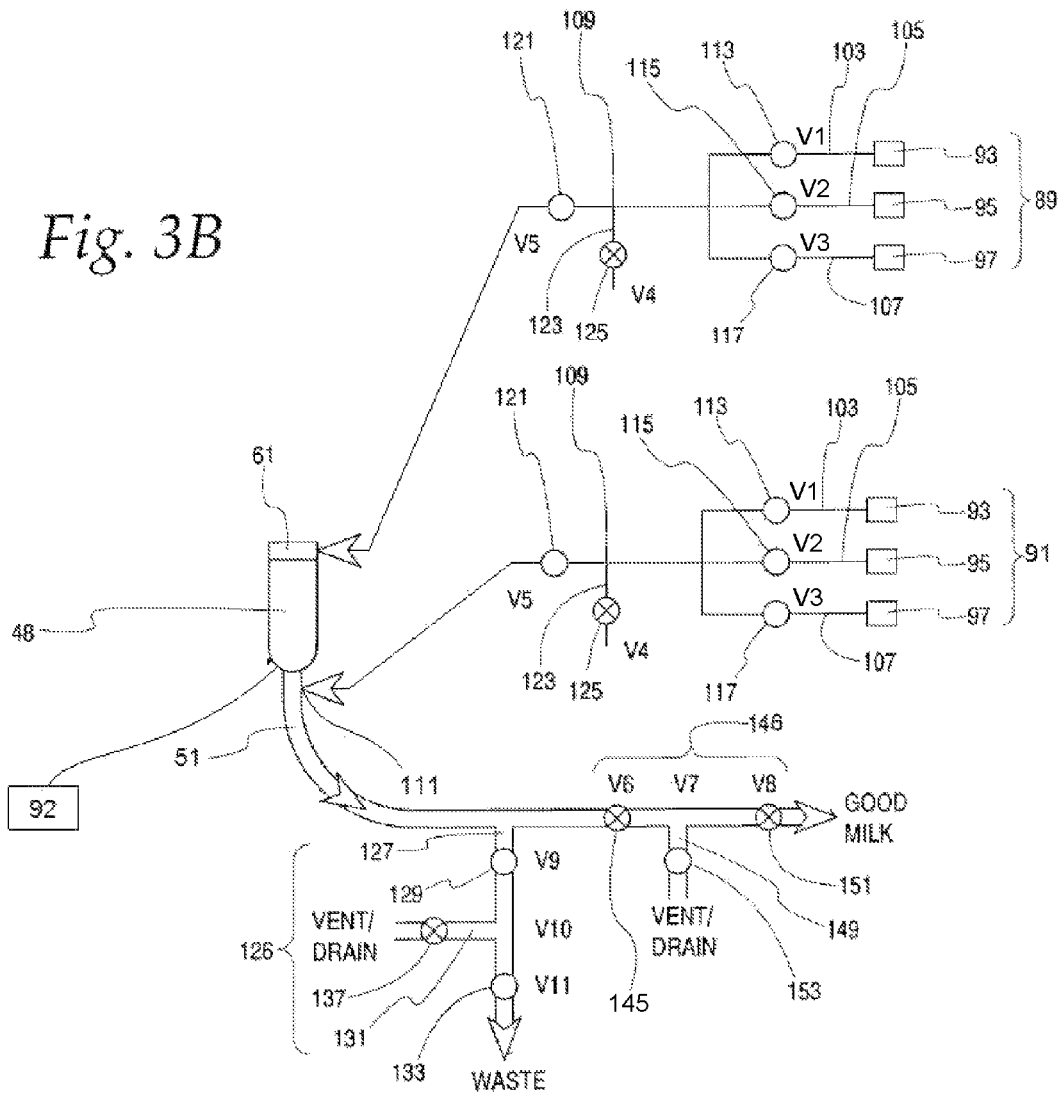
FIG. 3B is a schematic view of a dairy animal preparation and milking system in accordance with the present invention.
Figure 4A:
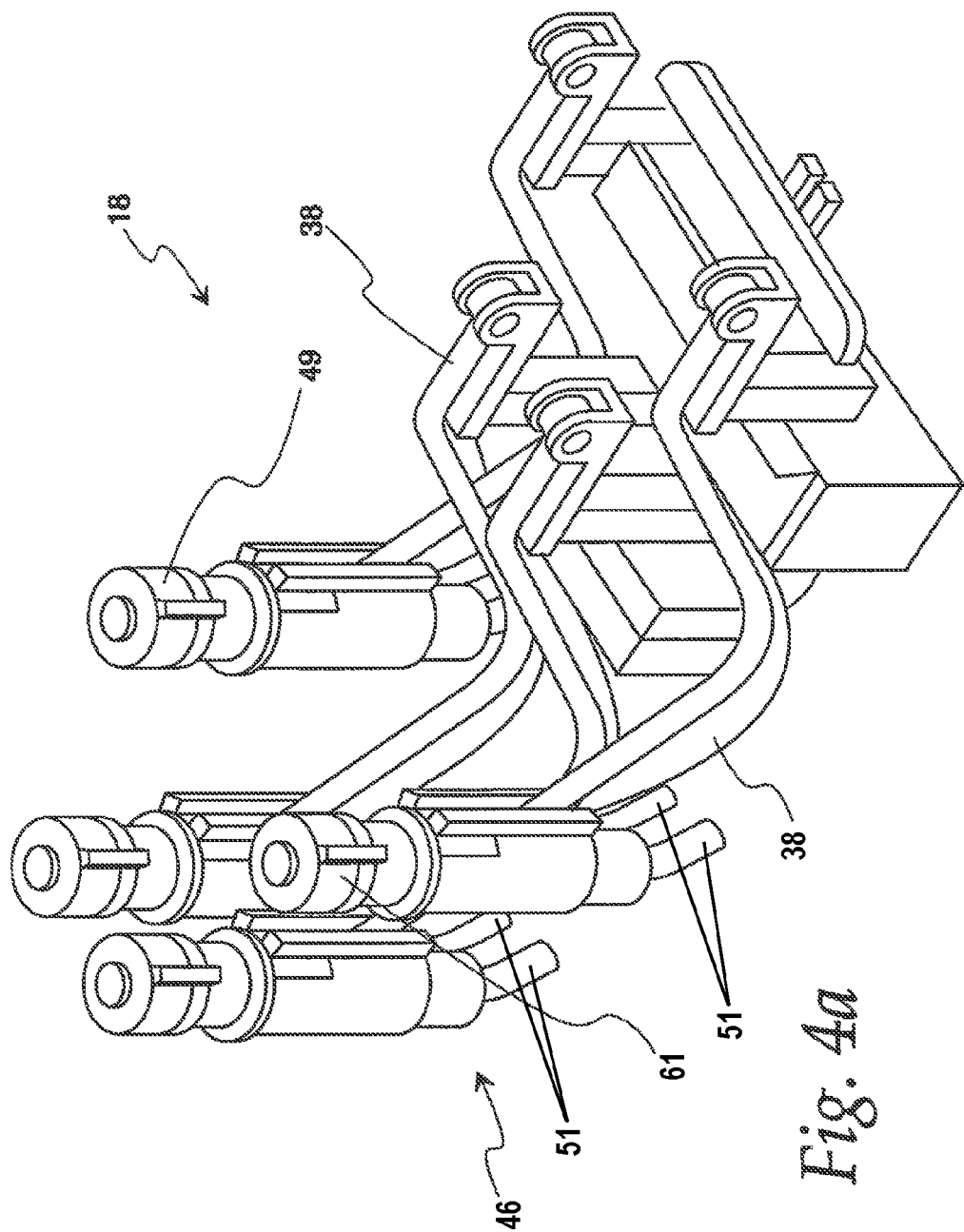
FIG. 4A is a partial perspective view of a milker unit in accordance with the present invention.
Figure 4C:
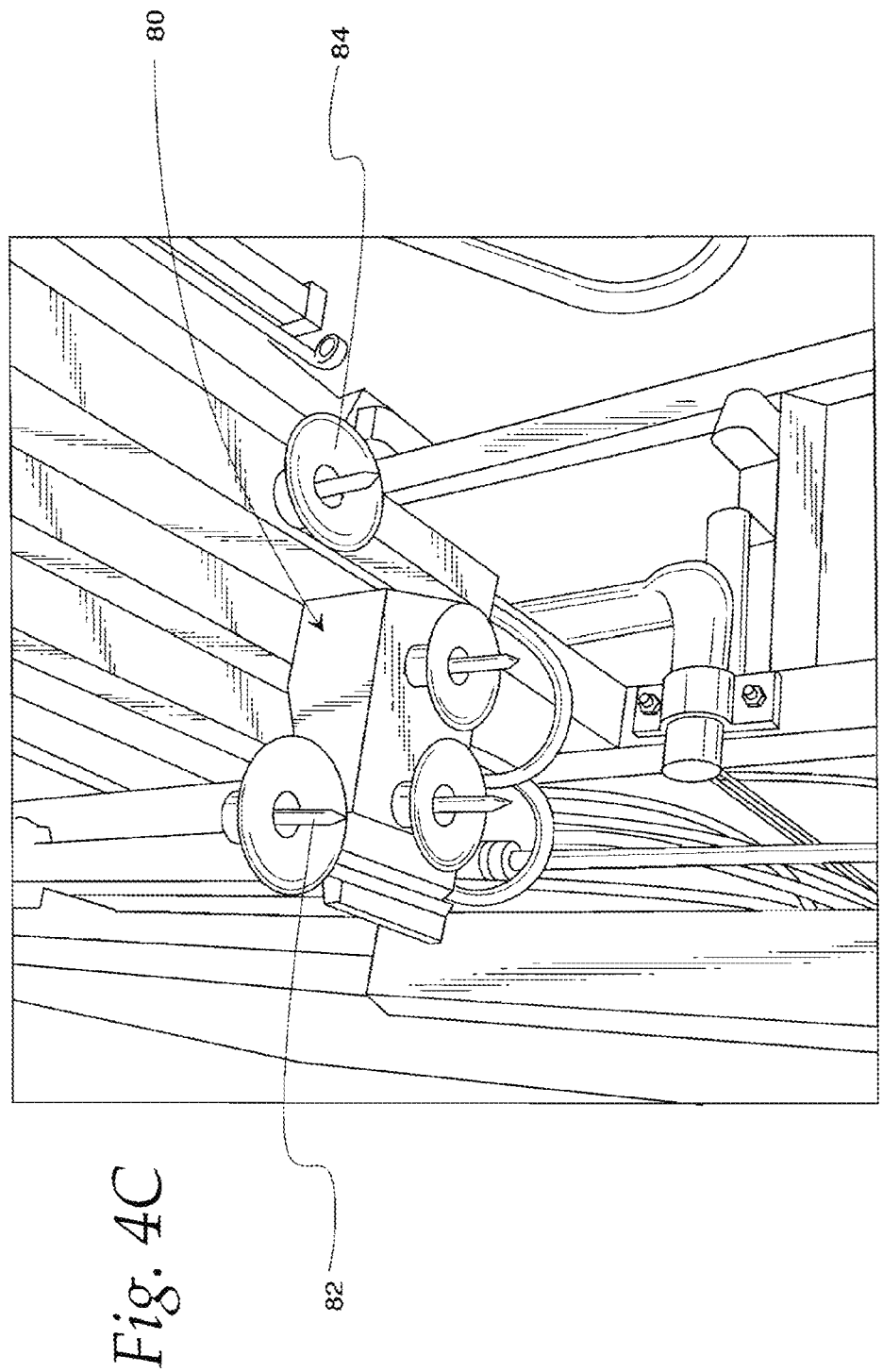
FIG. 4C is a partial perspective view of dairy animal preparation and milking system in accordance with the present invention.

The milker unit 46 is depicted in FIG. 4A-4C and includes teat cups 48, liners 49, a milk manifold 53, and a milk tube 51 through which fluids flow downstream. The milk tube 51 is sometimes referred to herein as a "first milk tube." As milk flows through the milker unit 46, flow rate, quantity, and quality can be determined by appropriate sensors such as a milk sensor such as a blood sensor 63 or a somatic cell sensor 67, a kick-off sensor 69, a milk flow sensor 71, a milk meter 64 (See FIG. 3A) that transmit corresponding data to the controller 40. The data transmitted from the sensors can be used to determine a milk factor that can be used to control the operations described herein. The robotic arm 38 can serve any number of milking stalls, but only one milking stall 34 is illustrated and up to five stalls is preferred. The robotic arm can be controlled by suitable hydraulic or pneumatic forces.

In a preferred embodiment, animal preparation and milking are both performed when the teats are in the milking machine teat cups 48. Accordingly, the present invention includes fail safe precautions to prevent cleaning fluids or contaminated milk from entering the dairy's main milk handling and storage system where it could contaminate a larger quantity of milk and/or require cleaning of the milk lines, milk chiller, storage containers, valves, and all other milk collecting system components. Strict sanitation requirements (3-A Sanitary Standards) are met by the present invention in a number of ways, including material and part selection, part construction, and the valve systems described below.

Animal Preparation and Milking Operation

Initially, when a dairy animal enters the milking stall 34, a sensor observes the positions of its teats, relays corresponding data to the controller 40, and the controller 40 directs the robotic arm 38 to remove the milker unit 46 from a milker unit docking station 80 (see FIG. 5) and position the milker unit teat cups 48 under the animal teats where vacuum in the milker unit 46 secures the teat cups 48 to the animal teats. Shortly thereafter, the controller 40 initiates a teat preparation phase by activating the teat preparation valve 68. Cleaning fluids, water, and air are then directed through the sanitizer valve assembly 73 to meter the fluids through conduits to nozzles in the teat cups or teat cup liners to wash and rinse the teats. (Nozzles are not illustrated, but see U.S. Publication 2009/0320760 A1 for an example of a suitable nozzle arrangement.)

Figure 5:
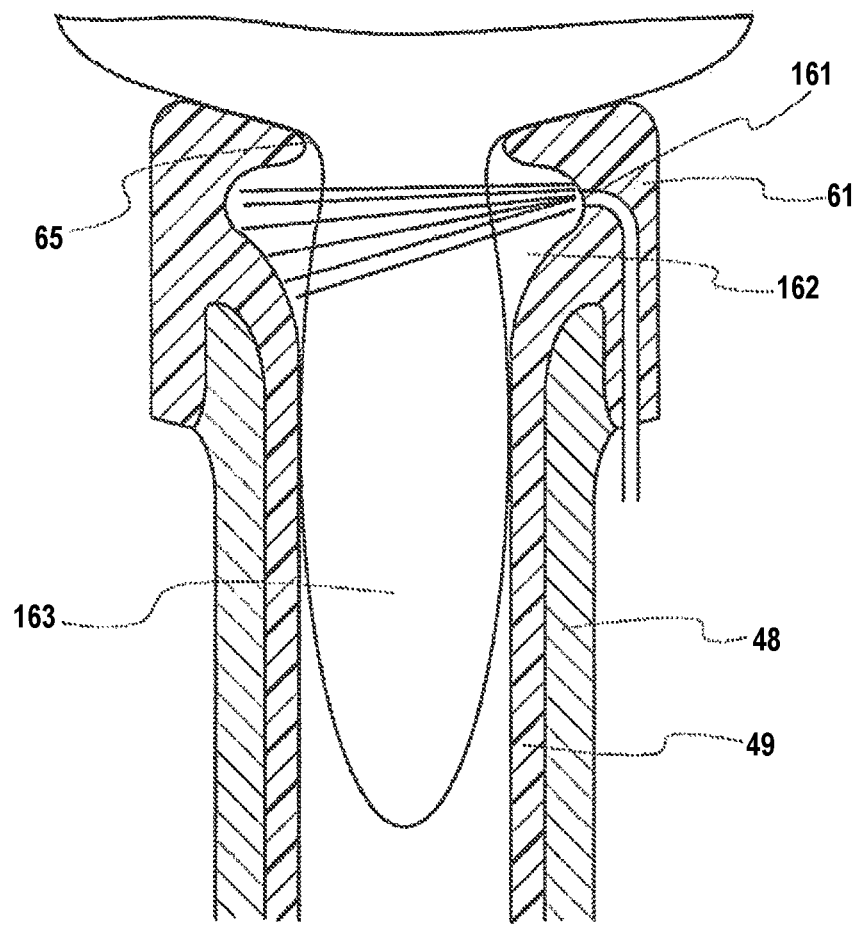
FIG. 5 is a partial cross sectional view of an inflation in accordance with the present invention.

In the milking stalls 22, the robotic system 30 moves a milker unit 46 from a cleaning position (FIGS. 4A and 4C) and a milking position (FIG. 4B). As seen in FIG. 5, the milker unit 46 includes a number of teat cups 48 and liners 49 inserted within the teat cup 48. The liner 49, includes a dome 61 that defines an opening 65 through which dairy animal teats are inserted.

Each liner 49 is joined to an upstream end of a milk tube 51 that is connected to the valve assemblies described below.

Vacuum tubes are joined to the teat cup 48 to apply alternating vacuum and venting to a space between the teat cup 48 and the liner 49 and thereby apply a milking action to the dairy animal's 27 teats. Vacuum is also applied through the liner 49 and the liner 49 to secure the inflation to the animal and to draw milk through these components, the long milk tube, and the milk lines, referred to collectively herein as the "dairy system" or "milk system," in some places below.

Prior to a milking operation, a dairy animal's 27 teats must be cleaned to prevent dirt from entering the inflation and being drawn by vacuum into the rest of the dairy system. Traditionally, this was done by an operator, who manually wiped the teats with a towel and/or disinfectant. Automated systems have been used to clean the teats automatically with sanitizer, water, and air, for example.

In a robotic system available from GEA Farm Technologies GmbH of Bönen, Germany, the automated preparation system uses the milker unit 46 liner 49 to provide a vessel in which the sanitizing fluids are applied and drained the present invention adds significant safeguards that prevent sanitizing fluids from entering the dairy's milk system. A schematic of some of the components of a preferred embodiment of the preparation system 80 are depicted in schematic FIGS. 3A-3C.

Figure 3C:
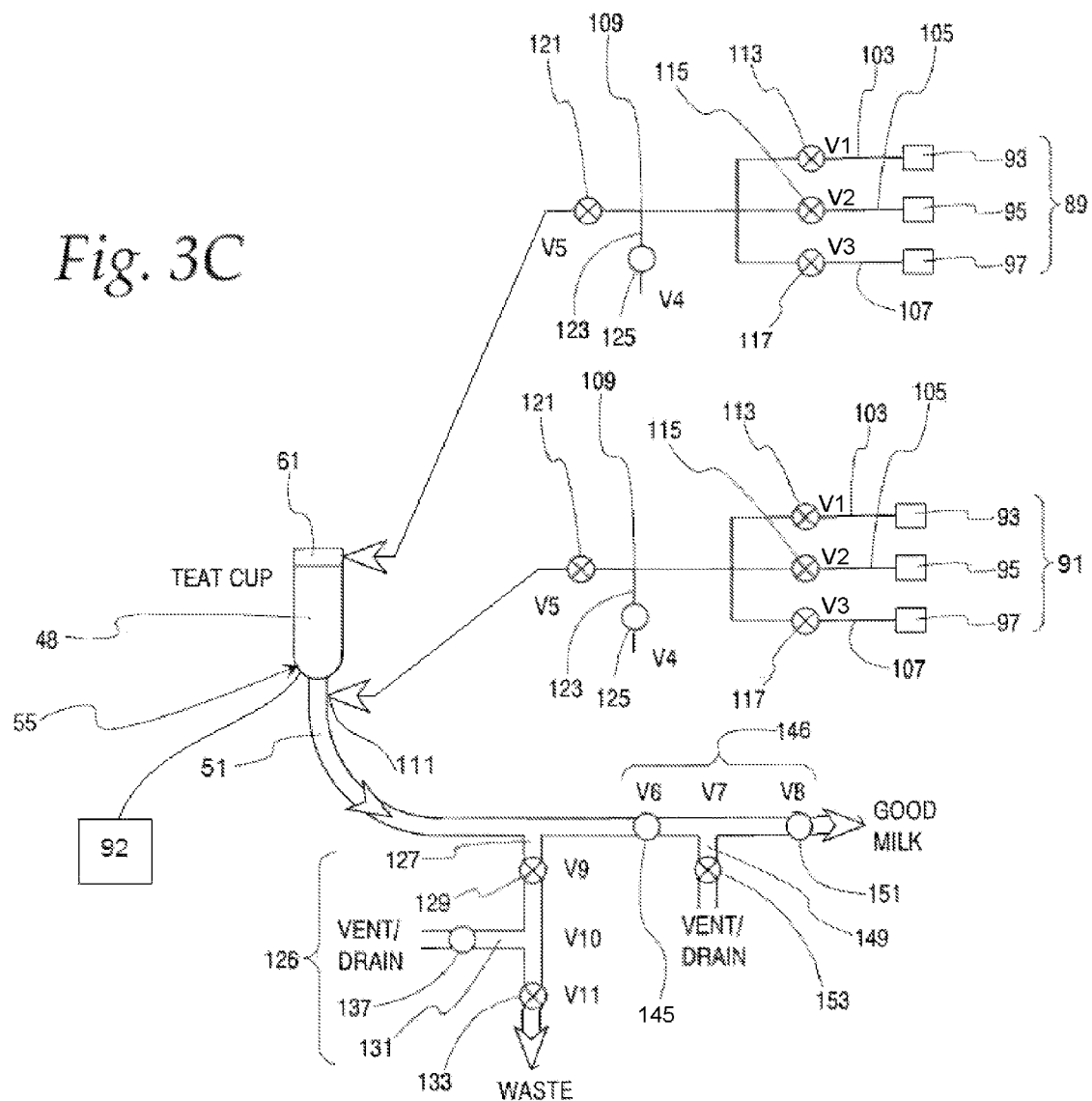
FIG. 3C is a schematic view of a dairy animal preparation and milking system in accordance with the present invention.
Figure 3D:
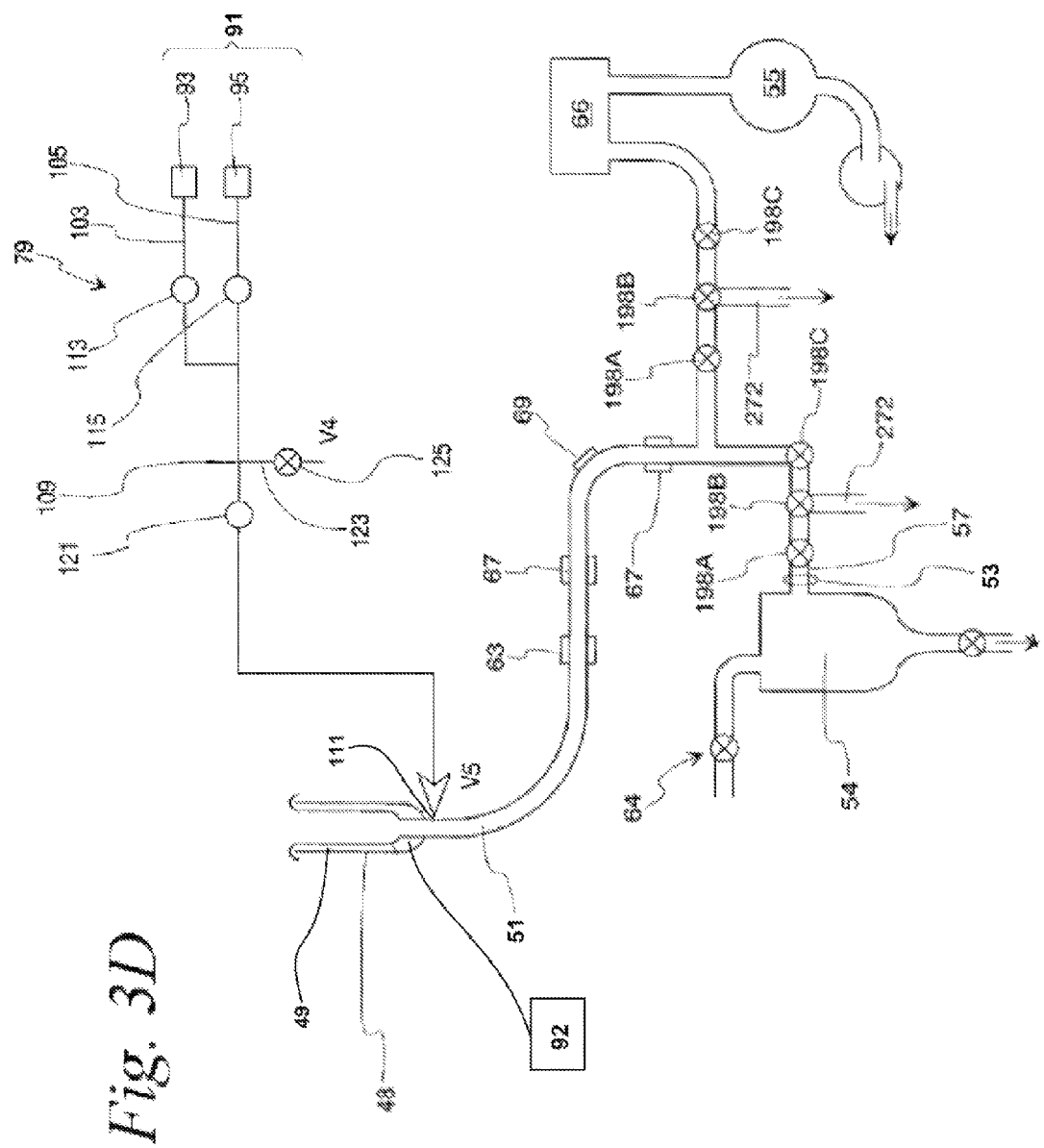
FIG. 3D is a schematic view of a dairy animal preparation and milking system having a rinsing fluid valve in accordance with the present invention.

In FIGS. 3B through 3D, each teat cup 48 has a liner 49. The milk tube 51 is illustrated with exaggerated length to show various connections to other components, described below. In practice, robotic systems will have milk tubes 51 of a variety of lengths, but the short milk tube could be a standard length. This is especially desirable when sanitizer is used on the teat because sanitizer must be rinsed from the liner 49 and the milk tube 51.

FIGS. 3B through 3C further illustrate components of a preparation system in accordance with the present invention. The preparation system includes at its upstream end, a first sanitizer source valve 89 that can include chemical sanitizers, water, air, heat exchangers, pulsators, or other components that can clean animal teats. In the illustrated embodiment, there is a first source 93, a second source 95, and a third source 97. Preferably, generally these represent sources of chemical sanitizer, water, and air ("sanitizer fluids"), and other fluids can be used within the definition of "sanitizer fluids."

A second sanitizer source valve 91 can be used (but is not necessary) when it is desirable to add rinsing fluid to the milk tube 51 after teat preparation and before switching over to milking. The components of the second sanitizer source valve 91 can be essentially the same as those in the first sanitizer source valve 89. (See FIGS. 9A and 9B for an example of sanitizer source valve.)

The sanitizer sources 93, 95, 97 are stored in tanks or are available from any appropriate piping system, air compressor, pump, or device that can feed these sanitizer fluids, preferably under pressure, to the inflation, as described below.

The sanitizer source 93 is in communication with a conduit 103 and a valve 113, the water source 95 is in communication with a conduit 105 and a valve 115, and the air source 97 is in communication with a conduit 107 and a valve 117.

The three conduits 103, 105, 107 communicate with a main sanitizer line 109. Although illustrated as separate conduits, the conduits 103, 105, 107, 109 could be replaced by or be a portion of a valve block, as described below, for example. The sanitizer line 109 includes a downstream source valve 121 and a vent 123 that can be opened or closed by a vent or drain valve 125.

The first sanitizer source valve 89 is preferably in fluid communication with an upper portion of the teat cup liner 49, as illustrated.

The optional second sanitizer source valve 91 is preferably connected to the system at a location downstream from the teat and more preferably connected to the first milk tube 51. The second sanitizer source valve 91 might only be used to provide a rinsing fluid to rinse the first milk line 51 of sanitizer and other elements prior to switching over to collecting good milk through the good milk line. To simplify construction and maintenance, the second sanitizer source valve 91 is constructed like the first sanitizer source valve 89, even though not all of the sources 93 to 97 are used. This option is described in more detail below.

Downstream from the liner 49 and in communication with the liner 49 directly or via the milk tube 51 is a waste drain system 126 that includes a conduit 127, a first waste valve 129, a waste vent 131, and a second waste valve 133. The vent 131 can be a vent or a drain and is preferably in communication with atmospheric pressure. Preferably the vent 131 includes a vent valve 137 to prevent waste from draining out of the vent 131, but it may not be necessary in all cases to include the valve 137.

Further downstream, is a milk system shut-off assembly 146 that includes an upstream milk valve 145, a vent 149, and a downstream milk valve 151. As above, the vent 151 can be any vent or drain in communication with atmospheric pressure. The milk system shut-off assembly 146 vent 149 preferably includes a milk vent valve 154, but this is not absolutely necessary.

In the milking position, the first sanitizer source valve 89 (and the second sanitizer source valve 91, when used) is closed off from the liner 49 by source valves 113, 115, 117 being closed and downstream source valve 121 being closed. The sanitizer vent 123 is open to atmospheric pressure because sanitizer vent valve 125 is opened, as well. This combination of valve closings and vent openings provides a block-bleed-block function to prevent milking vacuum from drawing sanitizer fluids into the milking system.

Also, when in the milking position, waste valves 129, 133 are closed and vent valve 131 is open. This provides a similar block-bleed-block function to prevent anything in the waste drain system 126 from entering or being drawn back into the milk system.

Also when in the milking position, the milk shut-off assembly 146 has its first and second milk valves 151, 153 open and its milk vent and valve 149, 153 closed to prevent the milk system vacuum from drawing in atmospheric pressure.

In the teat preparation positions (FIG. 3B), the sanitizer supply system has its valves 113, 115, 117 open and its downstream sanitizer valve 121 open. The sanitizer vent 123 is closed to prevent sanitizer fluids from flowing out of the vent 123.

Similarly, the waste system 126 has its first and second waste valves 129, 133 open and its waste line vent 135 closed.

To form a block-bleed-block arrangement for the milking system, the milk shut-off assembly 146 has its first and second milk valves 151, 153 closed and milk line vent 149 and vent valve 153 open to atmosphere to prevent milk system vacuum or sanitizer pressure from drawing fluids through the milk shut-off assembly 146. The following Chart A is a useful summary of valve and vent positions for milking and preparation processes.

Chart A

| | | | 93 Teat Sanitizer | 95 Potable Water | 97 Clean air | 125 Vent/drain | 121 Block | 147 Block | 149, 153 Vent/Drain | 151 Block | 129 Block | 137, 131 Vent/drain | 133 Block |
|---|---|---|---|---|---|---|---|---|---|---|---|---|---|
| Step 1 | Cow | Sanitize | O | C | C | C | O | C | O | C | O | C | O |
| Step 2 | Prep | Rinse | C | O | C | C | O | C | O | C | O | C | O |
| Step 3 | | Purge | C | C | O | C | O | C | O | C | O | C | O |
| Step 4 | Milk | | C | C | C | O | C | O | C | O | C | O | C |
| | CIP | | C | C | C | O | C | O | C | O | C | O | C |
| | CIP | | C | C | C | O | C | C | O | C | O | C | O |
| Default | | | nc | nc | nc | no | nc | nc | no | nc | no | no | nc |

O = open
C = closed

The first sanitizer source valve 89 and the second sanitizer source valve 91 can be operated simultaneously with all of the valves operating in unison. Preferably, however, the second sanitizer source valve 91 is operated in sequence by providing a rinsing fluid to the first milk line 51 after air forces most of the sanitizer from the liner 49 and into the milk line 51. Thus, the rinsing fluid will rinse the milk line 51 of sanitizer and other debris that will be removed through the waste milk line 127. Water, air, and other rinsing fluids can be used to perform this step, but typically, only water is necessary.

FIG. 5 illustrates a cross-sectional view of teat preparation taking place in a liner 49 inserted at least partially in a teat cup or "shell." The liner 49 includes an upper dome 61 that fits over the top of the teat cup 48 in a conventional manner. The liner dome 61 preferably defines an orifice 161 through which sanitizer fluids, including air, flow on their way to a dairy animal teat 163.

Preferably, the teat preparation valve 68 controls flow of sanitizers, air, and water. Generally, sanitizer is provided first, followed by air to force sanitizer through the delivery system, and then water can be used to rinse the delivery system and the animal teat. Water can be added through the liner orifice 161, but water or other sanitizing fluid can be introduced at other locations, including the first milk line 51 downstream from the liner 49 from the second sanitizer source valve 91. (See FIGS. 3B, 3C, and 3D, for an example.) Cleaning fluids as well as dirt and debris cleaned from the animal are flushed through the milker unit 46 and through a milk tube 51, before the dairy animal can be milked. In one preferred embodiment, a small quantity of milk from the early stage of milking may need to be sacrificed to ensure that the cleaning fluids and dirt are safely out of the milker unit 46 and milk line 51 before substantially unadulterated milk is collected, as explained in detail below.

Generally, it is preferred that milk from the animal flows for a predetermined period of time following the sensing of an initial flow of milk from a corresponding teat by a conductivity sensor when a threshold level of milk/fluid initial flow sensor is noticed. Milk can then be directed by the bad (waste) milk valve assembly 60 to a drain or other waste milk receptacle. Alternatively or in addition, a milk quality sensor 63 and 67, for example, (FIG. 3A) can be used to monitor milk flowing from the dairy animal or individual dairy animal teats and transmit milk quality data to the controller 40 for determining whether to control the waste milk valve assembly 60 and direct milk to the drain or to control the good milk valve assembly 62 and direct milk to the good milk receiver 56.

In the illustrated valve and line schematic embodiment (FIG. 3B) first sanitizer source valve 89 includes valves V6, V8, V10 that are closed, and valves V7, V9, V11 are open. Preferably, all preparation processes and switching from "bad milk" to "good milk" are done on individual teats, but data from other teats can be used, as described below. Optionally, the second sanitizer source valve 91, like the first sanitizer source valve 89, is provided to direct a rinsing fluid to the first milk line 51 via a rinsing fluid connection 111. Rinsing fluid can include sanitizer, water, air, or any other suitable rinse.

Figure 23:
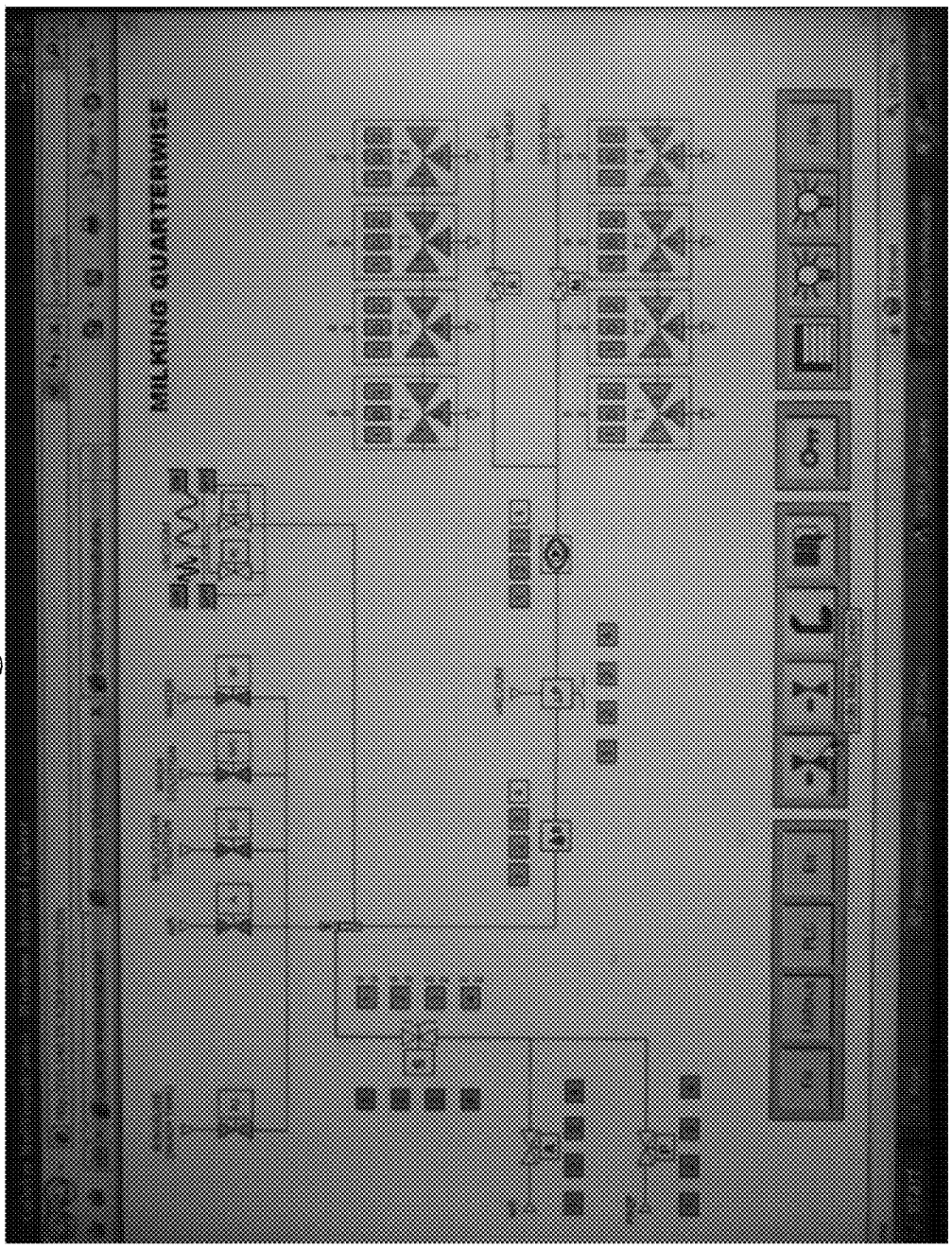
FIG. 23 is a screen shot of a valve and sanitizing operation verification chart.

In the present invention, it is useful to verify that the system is operating as designed, so that there is no contamination of milk or good milk lines. There are a number of ways to verify acceptable operating conditions. One way, is to view a controller display of valve positions for the valves in the good milk lines and the waste lines. A preferred "screen shot" is illustrated in FIG. 23, provides verification of proper valve function and position, which can be visually monitored because each valve is represented on a screen. Alternatively or in addition, all valves can be transparent and/or have LED indication position sensing, such as LED being on indicates valve is in safe position for milking into good milk tank.

The screen of FIG. 23 also shows the robot system controller 40 and access box monitoring screen to observe valve status and position sensor status in real-time.

The screen depicted in FIG. 23, shows all valves, block-bleed-block sensors, blood and conductivity sensors and their respective status. Preferably, valves can also be operated by an operator by pressing a symbol near the bottom and then selecting any valve for manual operation or sensor function.

In FIG. 3B, valves V1, V2, and V3, through which the teat preparation sanitizer flows, are enabled by closing valve V4 and opening valve V5. Valves 6, 7, and 8 provide the double block protection from good milk and are position confirmed on the screen as colors, shapes, symbols, icons, or other visible or other type of sensory indicator. In a preferred embodiment preparation solution at 35 psi is dispensed for 120 milliseconds to deliver 5-8 ml of sanitizer into the delivery hose. Verification of this step on a controller screen shows valve function and position monitored in the same manner as above.

Figure 25:
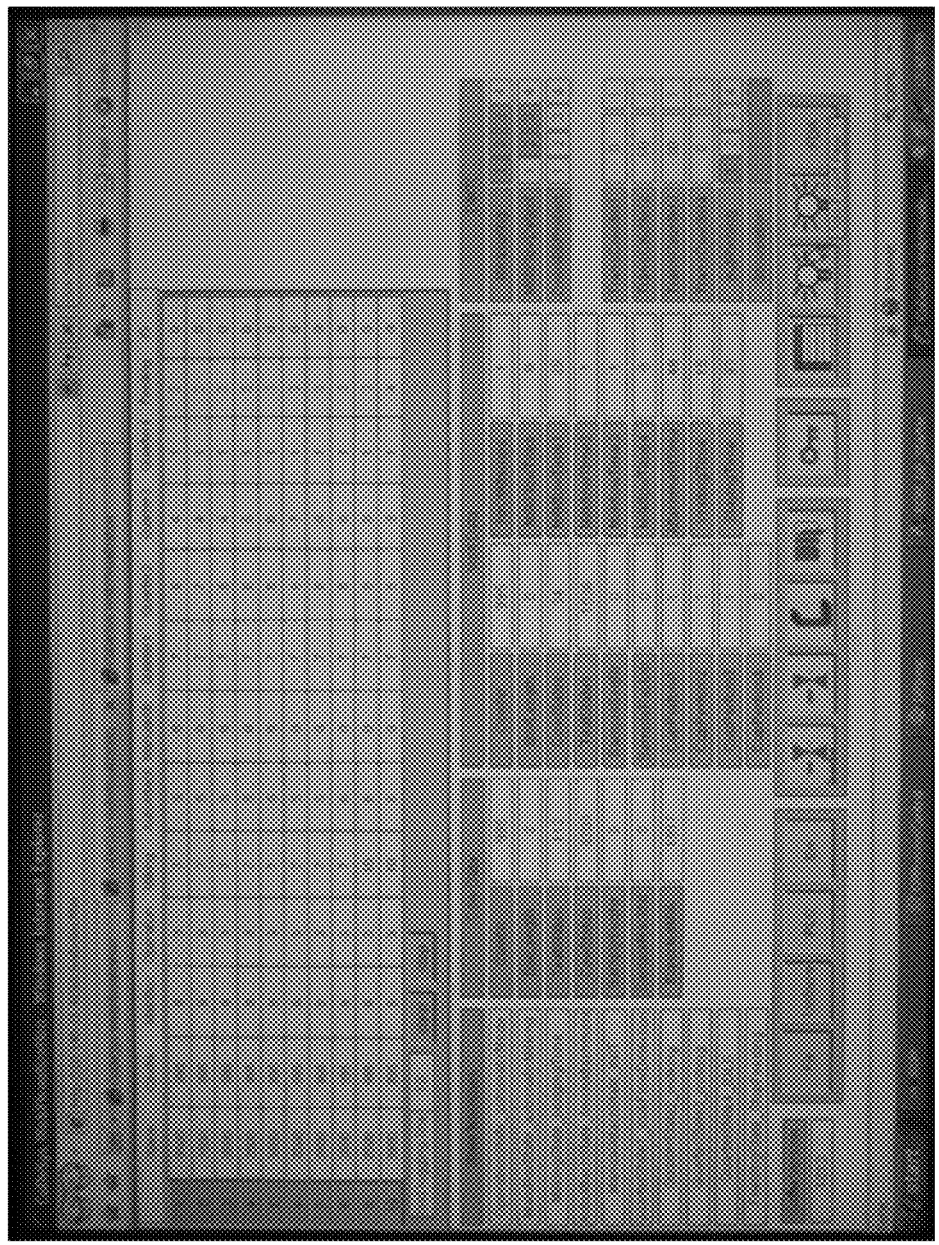
FIG. 25 is an alternate screen shot of a valve and sanitizing operation verification chart.

Teat sanitizer pressure is preferably monitored by checking a pressure gage located at a solution air pump next to a solution supply drum (not illustrated). A valve "on-time" value can be confirmed on the controller 40 automatically by accessing the expert parameters screen (FIG. 25). Teat sanitizer volume can be manually verified by plugging the teat cup 48 and removing the sanitizer delivery hose from the teat cup 48, pointing it into a graduated cylinder, initiating the prep cycle with a cow ID responder that is entered in the controller 40 to simulate an animal ready to be milked. With the sanitizer delivery hose still positioned over a graduated cylinder, sanitizer can be dispensed into the graduated cylinder and measured for volume. If out of a predetermined range, the sanitizer volume can be adjusted in the controller 40, through a dosing valve, or other suitable means.

Preferably, valve V3 provides 5 to 10 psi oil-free clean filtered air to push the sanitizer to the teat and distribute it around the teat as much as possible. Teat sanitizing is accomplished by flowing sanitizing fluids past the teat while the first pulsation is being applied by a pulsator 92, but other pulsation rates can be used. Preferably, air flows (pulled by a vacuum in the milk line) for 10 seconds for the sanitizer to the teat, distribute it around the teat, and force excess sanitizer to a waste line. The sanitizers preferably flow into the head of the liner 49 from valves V1 and V2 and can be directed all around the teat by geometry inside the liner head, as disclosed in U.S. application Ser. No. 12/215,706, for example. The first pulsation rate can continue throughout the entire preparation process to enhance movement of sanitizer onto all teat surfaces, to aid in loosening and removal of dirt from the teat, and to attempt stripping foremilk from the teat prior to other "good" milk being drawn from the teat. Valves V1 to V5 in the first sanitizer source valve 89 and/or in second sanitizer source valve 91 (also referred to herein as a "rinsing fluid valve") then return to a "safe" position, creating a double seal of the teat sanitizer delivery system from the good milk line. Between the double seal, there is preferably a vent so that the block-bleed-block function is performed in the "safe" position.

Figure 24:
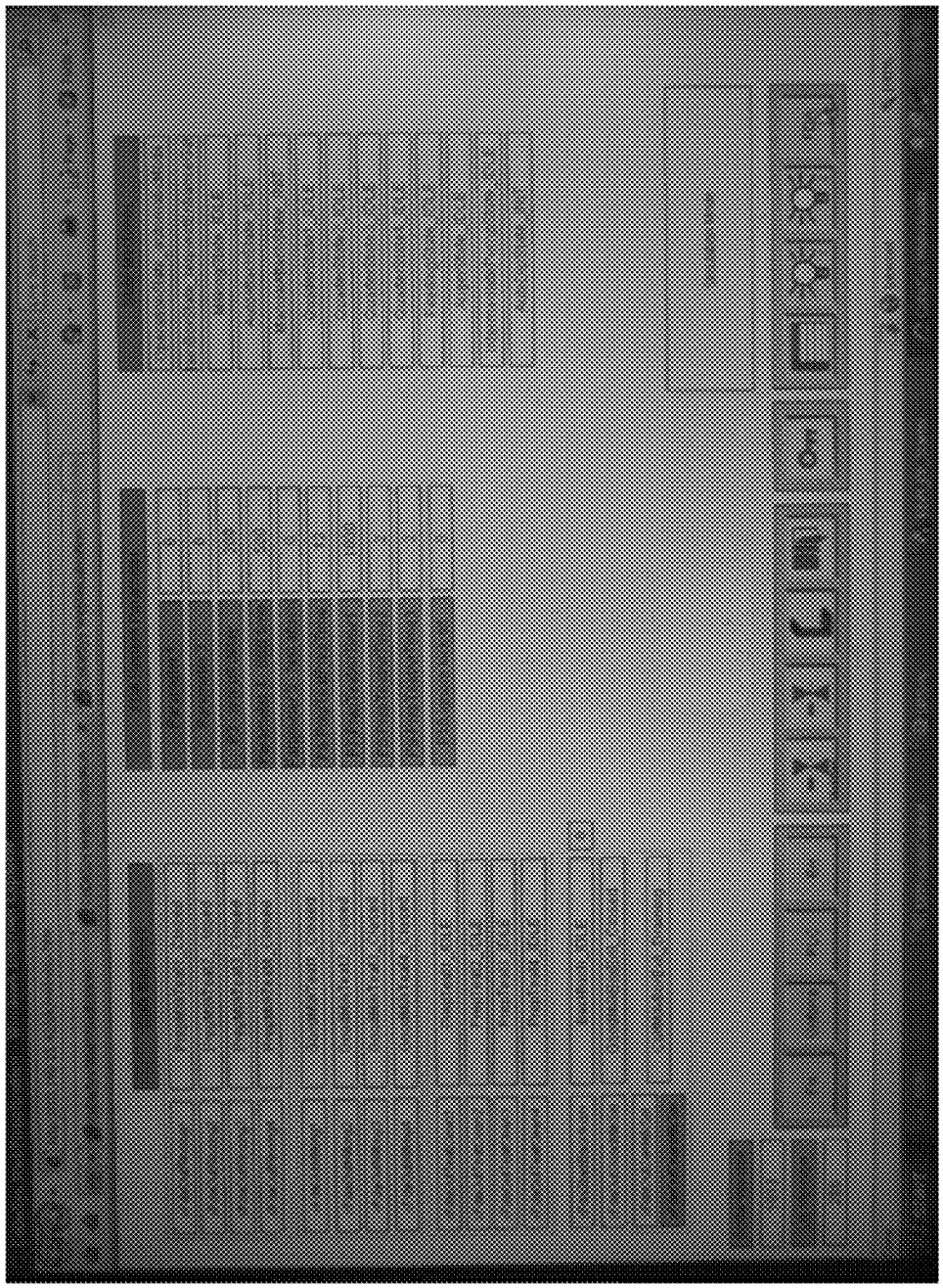
FIG. 24 is an alternate screen shot of a valve and sanitizing operation verification chart.

Verification of these events shows valve function and position monitored in the same manner as above. A set value for teat sanitizer delivery and air purge time can be verified as seen on the Milk Safety P6=12, which is 120 ms of time in FIG. 24. P7=1000 ms is the air chase or purge time which is calculated to 10 seconds or air valve on-time. Pressure of the air can be confirmed by looking at the pressure gage on the controller or other suitable location. Teat sanitizer delivery pressure can be checked by looking at the pressure gage located at the air operated pump next to the sanitizer supply drum or any other suitable location. The above described operating conditions are suitable for use with a sanitizer known as OxyCide AMS, a 1% hydrogen peroxide solution, available from GEA Farm Technologies, Inc., 1354 Enterprise Drive, Romeoville, Ill. 60446, which is a hydrogen peroxide sanitizer.

Teat drying and sanitizer contact duration ("kill-time") take place by allowing air to be drawn into the liner 49 from an air bleed located in the sanitizer delivery system. This air flow provides a constant drying process during the kill-time and can be used throughout the milking process. Based on laboratory tests, OxyCide has a 95%+kill of Staph. and Strep. organisms within five seconds, so the necessary kill-time elapses during the previous 10 second distribution and excess purging process. Teat drying takes place until good milk flow is directed to the good milk line.

The above-described parameters can be checked via an air bleed vent located on the bottom end of the prep safety valve of the illustrated embodiment. To verify a valve is admitting air, an operator can simply place a finger over the vent or "bleed" during milking or when applying vacuum with teat cup plugged.

The process preferably purges the milk hoses of prep solution and rinsing milk, a minimum of one "slug" of milk is used to purge remaining sanitizer and rinsing milk from the liner 49. The term "rinsing milk" refers to foremilk and/or good milk, and can include sanitizer, air, and debris from the sanitizing process, but other elements may be included as well. The rinsing milk slug is routed to waste milk line through valves V9, V10 and V11. (FIG. 3B.)

It is desirable to avoid using good milk to rinse sanitizer from the teat liner. One method for minimizing waste is to introduce rinsing fluid into the liner to rinse sanitizer and thereby avoid using good milk for this purpose. The rinsing fluid can also be introduced to the first milk tube 51 downstream from the teat so that only first milk tube 51 is exposed to this rinsing fluid.

The terms "rinsing milk" and "rinsing fluid" are used interchangeably herein and those terms can include combinations of the two.

Further, the first milk line 51 can be any desired length or it can be any type of flow directing device that leads to the waste milk line or good milk line. The first milk line 51 can include a rinsing fluid connection 111, when a second sanitizer source valve 91 is used.

Slugging of milk is enhanced through the use of pulsation and liner 49 manipulation/stimulation. When the teat cup 48 and liner 49 are attached to a teat, the liner pulsation rate (induced by the pulsator 92) is preferably increased to a first pulsation rate or frequency. This causes the liner 49 to stay mostly collapsed on the teat and helps to close the teat canal, while providing a stimulating message. Good stimulation is sometimes performed for up to 90 seconds to ensure fast and complete milking. Therefore, the first pulsation frequency can be used as a stimulation process for up to 90 seconds or even more if necessary. Then the first pulsation rate transitions to a second pulsation rate that is also induced by the pulsator 92 and is preferably a normal pulsation rate, but can be any other pulsation rate that enhances the transition from teat preparation and liner rinsing to milking. Sensors, such as flow or milk quality sensors, can be used to monitor rinsing milk or fluid flow and prevent switching from collecting rinsing fluid to good milk until a required level or time of flow or other rinsing fluid property is achieved.

The process of the invention is useful in cows that are slow to begin milking. These animals are sometimes called "Slow let-down cows." Some cows may be nervous or in general are slow initial flow milkers. Their initial milk flow rates should be enhanced to provide good efficient rinsing of sanitizer from the liner and efficient milking. The liner manipulation/stimulation helps to promote oxytocin release in the cow while helping to minimize milk flow at the early preparation stage.

Milk from slow let-down cows collects in the teat cistern while udder pressure builds. Preferably, after up to about 90 seconds of stimulation, there is a transition to the second pulsation rate, and milk flow typically is improved, resulting in more efficient rinsing of sanitizer from the liner 49. As rinsing fluid flow continues, sensors indicate when a minimum flow time, rate, volume, mass or other property, has been achieved that ensures that sanitizer is rinsed from the liner. Then the controller 40 causes the decision valves to switch the milk flow from the waste milk line to the good milk line.

On the other hand, some cows are ready to be milked shortly after the milk cup 48 and liner 49 are attached. These animals are known as "Easy let-down cows." Some cows come into the milking box with high udder pressure and a tendency of easy milk let-down. In this case, good slugging and purging of prep solution can happen without the typical 90 second stimulation time. If rinsing fluid flow is sufficient during the stimulation time, indicating good pressure and rinsing fluid flow for proper sanitizer purging, the decision valves switch from the waste milk line to the good milk line. In this case, good milk flow should not be held back for up to 90 seconds to prevent waste. Wasting additional good milk is avoided by monitoring sensors throughout the preparation process, and/or switching to the second pulsation rate when proper rinsing is achieved.

As stated above, it is also desirable to avoid using good milk to rinse sanitizer from the teat liner. One method for doing so, is to introduce rinsing fluid into the liner to rinse sanitizer and thereby avoid using good milk for this purpose. The rinsing fluid can also be introduced to the first milk line downstream from the teat using the second sanitizer source valve 91, as illustrated in FIGS. 3B and 3C, for example. This assumes the liner 49 is satisfactorily rinsed and only the first milk line 51 needs rinsing. Further, only water may be introduced by the second sanitizer source 51. Other locations of rinsing fluid introduction are possible.

Verification of this process is possible on a controller screen that shows valve function and position monitored in the same manner as described above, by visually watching valves and sensor LEDs on the valves, and/or accessing a monitoring screen 50, 52 in communication with the controller 40. The presence of the milk slug prior to switching from the first pulsation frequency to the second pulsation frequency can be visibly monitored through clear milk hoses and clear valve bodies, if desired.

The screen capture illustrated in FIG. 25 shows information like that discussed above for each teat, and it can include flow totals, if desired. In the depicted embodiment, clicking on an "Expert Page 1" in the lower right of the display, allows an operator to monitor milk flow sensors and transition to good milk information for each teat (or each "quarter").

The teat liner 49 is put into milking mode and milk is allowed to flow to the good milk line through the switching of various block-bleed-block valve arrangements on a teat-by-teat basis, if desired. This is achieved in the illustrated embodiment with valves 1, 2, 3, 5, 7, 9, 11 of the first sanitizer source valve 89 and/or second sanitizer source valve 91 closed, and valves 4, 6, 8, 10 opened to make this transition.

Figure 26:
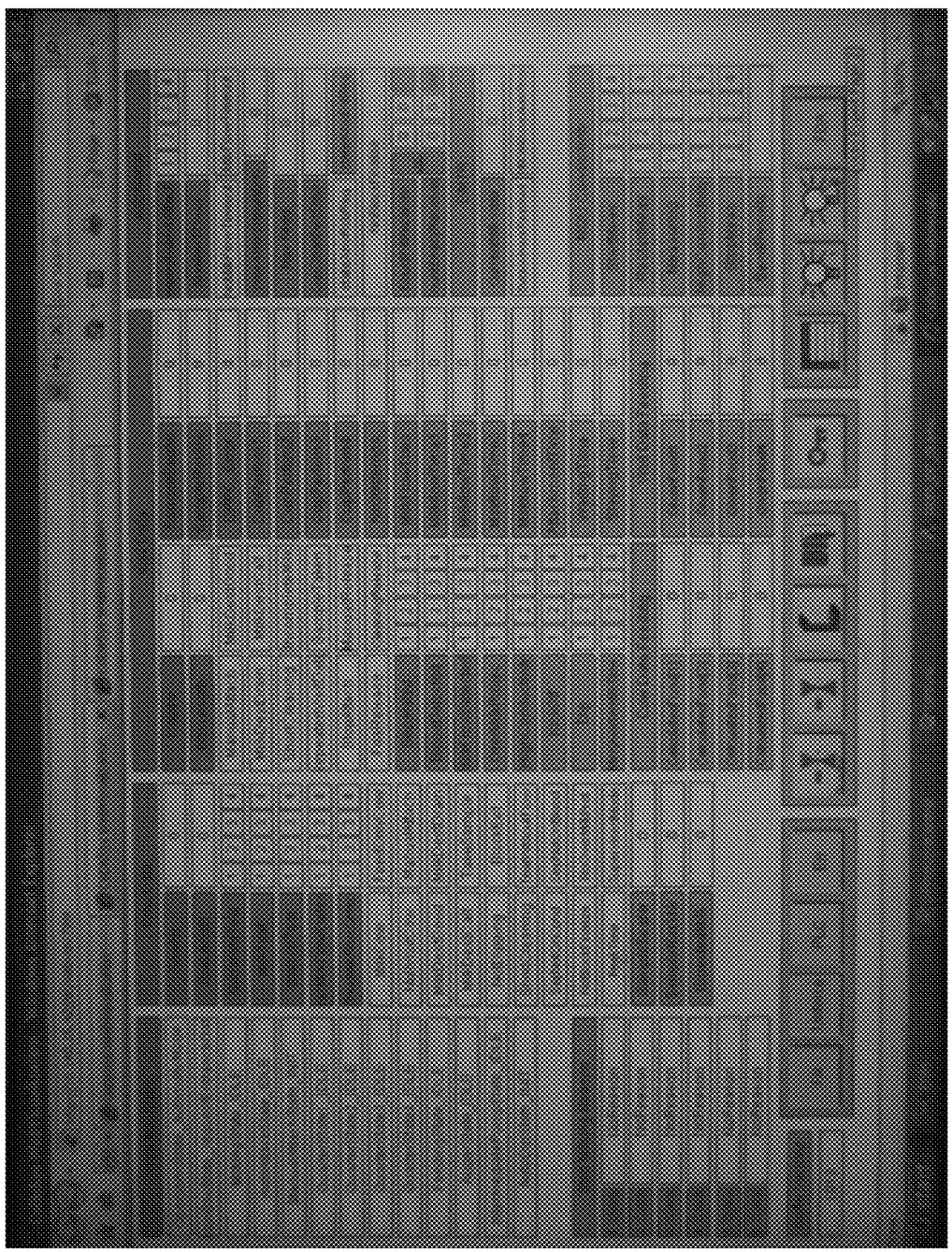
FIG. 26 is an alternate screen shot of a valve and sanitizing operation verification chart.

Another way to monitor the operation is to access the controller 40 box monitoring screen 50, 52 to observe valve status and position sensor status in real-time, as described above. The screen illustrated in FIG. 26 illustrates blood monitoring as well as other milking information.

After each teat is milked and the teat cups 48 have been removed, the teat cup assembly preferably returns to a jetter rack (docking station, 80) where all cups 48 are sanitized and backflushed into the prep fluid receiver 54. The prep fluid receiver 54 is drained to a waste line. This can be verified (as above) by visually monitoring the operation directly or on the controller screen 50, 52. Waste draining can be viewed by observing end of hose at bottom of prep fluid receiver 54, for example.

Controller Logic

Figure 27:
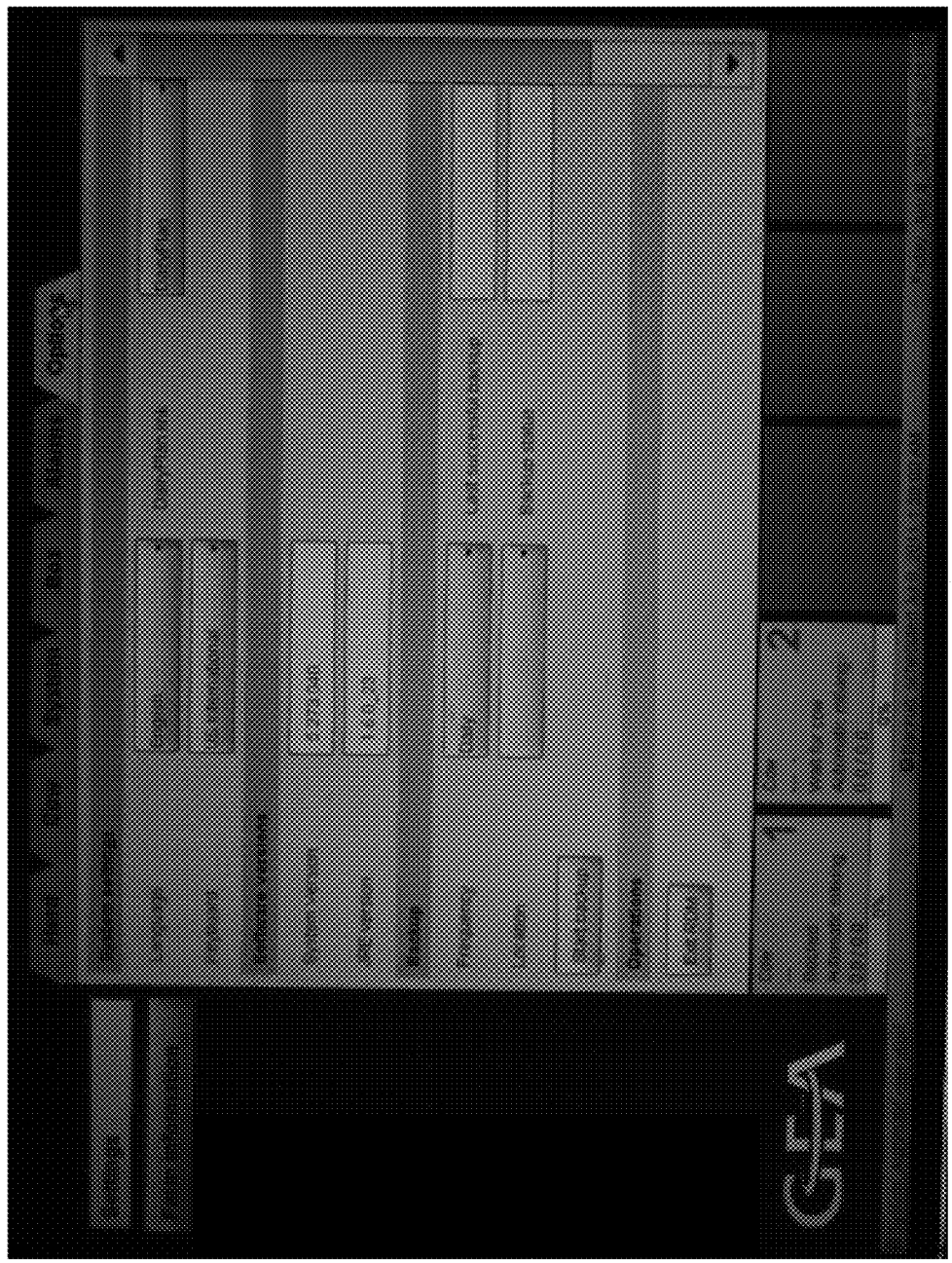
FIG. 27 is a screen shot used by the controller to verify that an appropriate version of the software and/or system is being used.

The screen in FIG. 27 illustrates where the software version can be verified. To transition from draining to the waste line to the good milk line, it is possible to monitor various rinse milk and/or rinsing fluid properties including, flow duration rate, volume, conductivity, mass, slug counts, and combinations of these, for example. It is preferred that no parameters can be easily accessed or changed that have anything to do with the preparation process due to the risk of contaminating good milk lines. All parameters that control the sanitizer delivery, valve switching from rinsing fluid to good milk, or the decision making parameters of the controller related to purging sanitizer can not be changed by the customer or technician without the assistance of a trained controller programmer.

Cleaning Individual Milk Stall Lines

After the milking operation is complete, the process repeats itself on the next dairy animal, unless the milk or milk lines are in need of a scheduled cleaning or were contaminated by cleaning fluids or contaminated milk (including milk with mastitis). In such a case, individual stall milk lines are cleaned, which is sometimes referred to as "box washing". Box washing is a term used to describe a washing of only the components of an individual milker unit 46 or a number of milking apparatus, as opposed to the dairy's larger milk collecting system 33.

The box washing phase can be initiated when the controller 40 receives data from the sensors 63, 67, 69, and 71, for example (FIG. 3A) that box washing is necessary, in response to predetermined wash intervals programmed into the controller 40, in response to operator intervention or the most recently milked animal is designated as being unhealthy or undergoing medical treatment, for example.

To initiate the box washing phase, the box wash valve assembly 66 is activated by the controller 40, and wash fluids are pumped from nozzles 82 in the docking station 80, into the teat cups 48, and then through the milker unit 46, and to the preparation fluid receiver 54. Cleaning fluids are circulated through the good milk receiver 56 and then discharged through a calf milk drain. Preferably, the milker unit 46 is positioned by the robotic arm 38 at the docking station 80 (FIG. 4C).

As seen in FIG. 4C, the docking station 80 is mounted to the robot housing 32 and adjacent to the milking stall 34. The docking station 80 includes nozzles 82 that are inserted into the teat cups 48 so that cleaning can take place. The docking station 80 also includes a flexible flange 84 that mates with the top of a corresponding teat cup 48 to form a seal. Milk line vacuum secures the teat cups 48 to the flanges 84.

Controller Functions

The controller 40 preferably controls operation of the above-described components, as well as those described below in response to its programming, timers, and data received from various sensors, for example. The controller 40 is preferably programmable with at least initial process steps for teat preparation, milking, and washing, using predetermined sequences and timing for these operations. The controller 40 can be a central processing unit ("CPU"), printed circuit board or any other suitable device.

The preparation and milking sequences can be set and maintained for all dairy animals to be milked or programmed to perform the steps in a unique fashion for specific cows. Individualized programming can be based on each animal's lactation cycle, milking characteristics, health or other unique characteristic. A dairy animal identification system can send data to the controller 40. The controller 40 can also use "fuzzy logic" to adjust teat preparation, milking, and washing based on any desired dairy or dairy animal feature and thereby continually adjust to whatever conditions are present.

Further, the controller 40 includes an operator interface, such as the display screen 52 to display any relevant information, such as, historical data, dairy animal information, current process data, and so on. Audible alarms and/or speakers can also be used. The controller 40 can be programmed, activated, and deactivated by an operator for operation. Preferably, the controller 40 initiates automatically when a dairy animal enters the milking stall 34. The display screen 52 can also display various features of the milking operation, warnings or any other information relating to the robotic milking machine 30, the animal being milked, udder quarters being milked, animal health, and animal control gates. Displays can take on any appropriate format and may be unique to suit the needs of any particular dairy.

The controller 40 also preferably receives data from sensors corresponding to a cow identification, gate position, animal position, system operability, animal health, valve positions, milk times, milk quantities, preparation time and sequence, wash chemical supply quantities, as well as any other desired feature. The controller 40 compares these data to predetermined criteria and can then continue without change, adjust a process, deactivate one process, initiate another, or make determinations about where to route milk from the dairy animal, for example.

Fluid Flow Paths

In the present invention, dairy animal teat preparation is performed automatically before milking begins. As stated above, the milker unit 46 is used for the preparation process and for milking. Flow paths for cleansing fluids, contaminated milk, calf milk, and milk for human consumption are described below.

Figure 6:
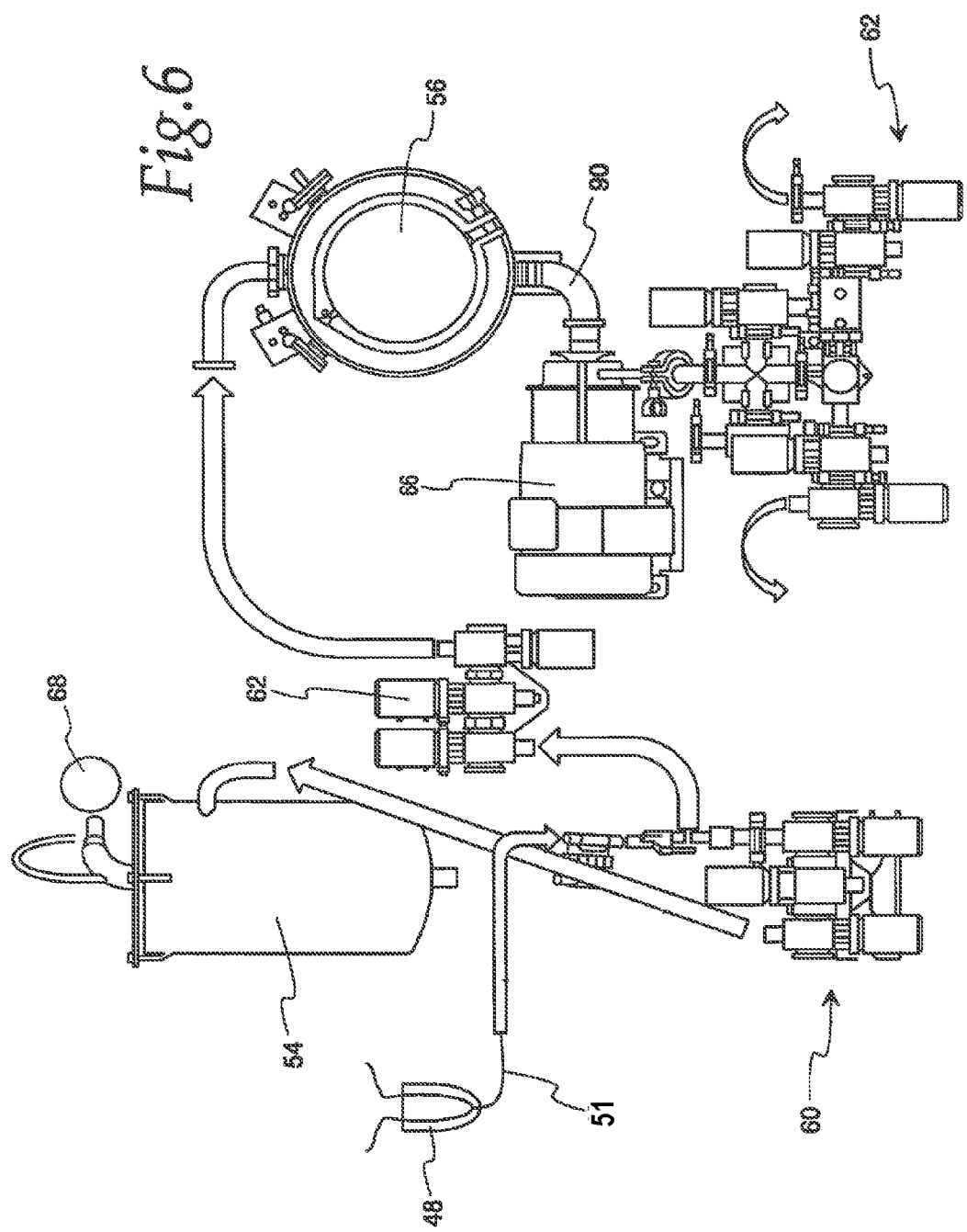
FIG. 6 is a partial front view of the milking apparatus with some fluid flow paths illustrated.

As seen in FIG. 6, the teat cups 48 are at the "upstream" end of the milker unit 46. Downstream from the teat cups 48 are the milk tubes 51 and the manifold 51A. The milk tube 51 is in fluid communication with both the bad milk valve assembly 60 and the good milk valve assembly 62 so that "good" milk and "bad milk" can be handled appropriately.

Further, for the teat preparation process, the milker unit 46 is in communication with the teat preparation valve 68. The teat preparation valve 68 is activated to deliver teat wash chemicals, solutions, and air ("teat preparation fluids") upstream through a suitable teat preparation conduit through which the teat preparation fluids flow to an outlet that is either positioned on the teat cup or through the teat cup liner. The teat preparation fluids are preferably delivered near the top of each teat so that they flow downward with any dirt or debris into the liner 49, and milk tube 51 from where they are disposed of or retained, as described below.

Next, the milking operation begins, but for hygiene reasons, it is not assumed that all of the teat preparation fluids are rinsed out of the milker unit 46. To ensure a sanitary milk flow path, some milk from the first portion of the milking cycle is used to "rinse" the milker unit 46 and through the bad milk valve assembly 60. The amount of milk used for this "milk rinsing" operation can be determined in a number of ways, including empirically. Milking for a predetermined period of time from the start of milking can be replaced or augmented with milk quality testing using milk quality sensors 63, 67. The milk quality sensors 63, 67 gather data indicating whether the milk satisfies a predetermined quality standard. The data is transmitted to the controller 40, which directs the milk to an appropriate receptacle by opening or closing the bad milk valve assembly 60 and good milk valve assembly 62.

When milking time and/or quality data meet predetermined standards as determined in the controller 40, then the controller 40 opens or closes appropriate valve assemblies to direct the milk to the good milk receiver 56. This directing of milk is performed by the controller 40 to open and close appropriate valve assemblies, as described in more detail below. Calf milk can be directed through a calf milk conduit and/or stored in an appropriate receptacle. This decision can be made by the controller 40 or by an operator.

From the good milk receiver 56, milk passes through a conduit 90 (FIG. 6) to the dairy milk collecting system 33. Milk can be retained in the good milk receiver 56 until it is determined that it meets quality standards, such as cleaning downstream from the milking apparatus 42, are performed. This is particularly advantageous in robotic systems because milking can continue despite there being incompatible processes occurring elsewhere in the dairy.

Valves

The present invention includes a number of components in each milking apparatus to ensure that sanitary conditions are met. Some of the primary components include three subsystems: teat preparation valve 68, a bad milk valve assembly 60, a good milk valve assembly 62, and a box wash valve assembly 66. Preferably, each valve assembly is positioned in piping, tubing, or other type of conduit that is connected directly or indirectly with the milker unit 46 and satisfies 3-A Sanitary Standards.

The valve assemblies of the present invention can have various configurations, but valve assemblies through which milk flows preferably have three valves in series and each valve moves between opened and closed positions (or sometimes referred to below as milking or washing apparatus). The position of each valve in a valve assembly at any given time is determined and controlled by the controller 40. Position sensors 116 verify that a valve is in its desired position so that valve malfunctions and/or normal wear do not cause milk or cleaning fluids to be misdirected. The valve assemblies for milk handling can be used for all of the milk from an animal, from individual quarters or pairs of quarters. The robotic milker illustrated in FIGS. 2A and 2B have valve arrangements for individual quarters. Thus, for a single animal, there will be four assemblies of three valves each, for a total of twelve valves. Valve assemblies for teat preparation fluids and washing systems do not necessarily require the three valve assembly and are also described in detail below.

Teat Preparation Valve

As illustrated in FIGS. 7 to 9B, the teat preparation valve 68 incorporates a block-bleed-block arrangement to ensure safety from valve failure.

Figure 9B:
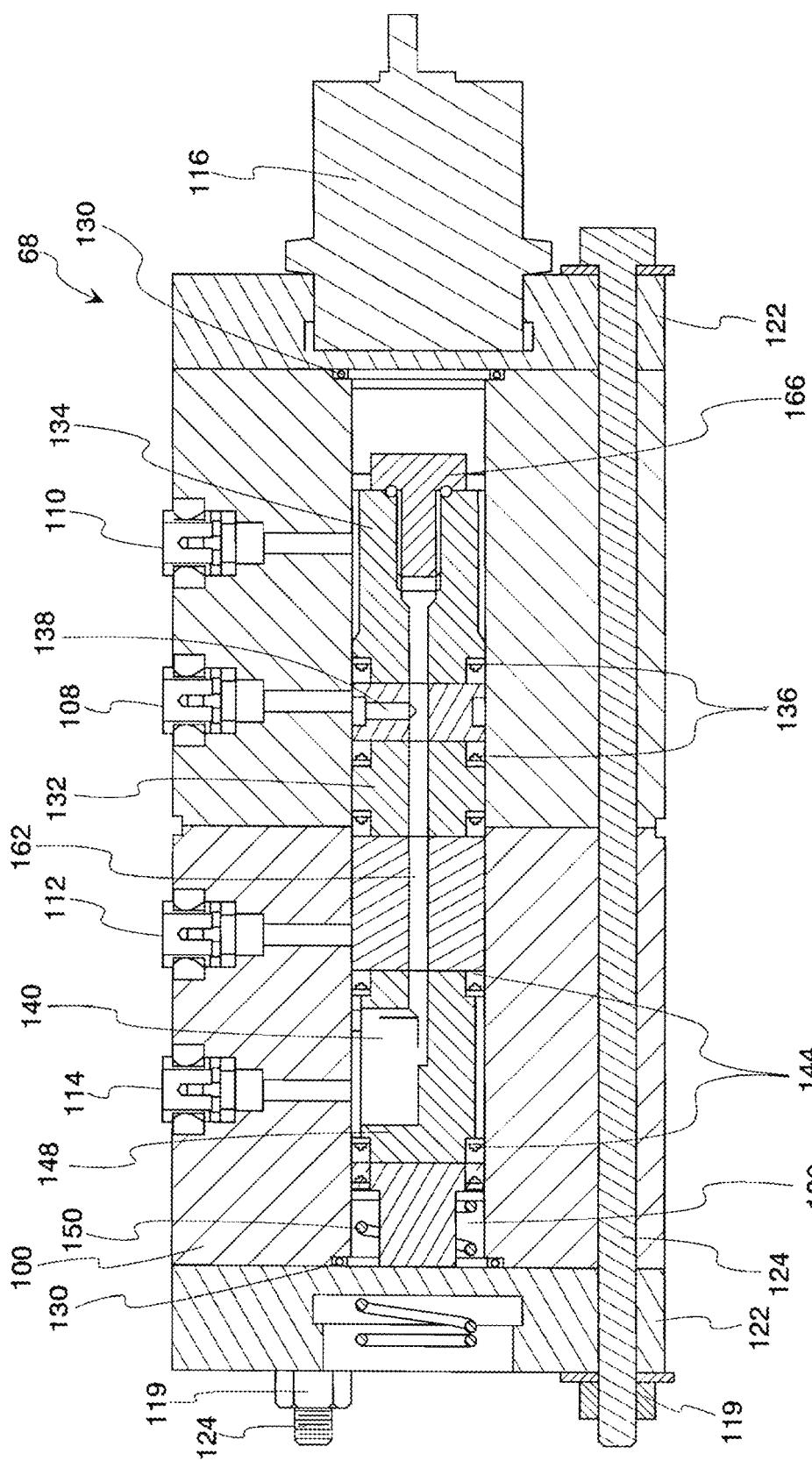
FIG. 9B is a cross-sectional view of the teat preparation valve assembly in a cleaning position taken along line 9-9 in FIG. 8.
Figure 10:
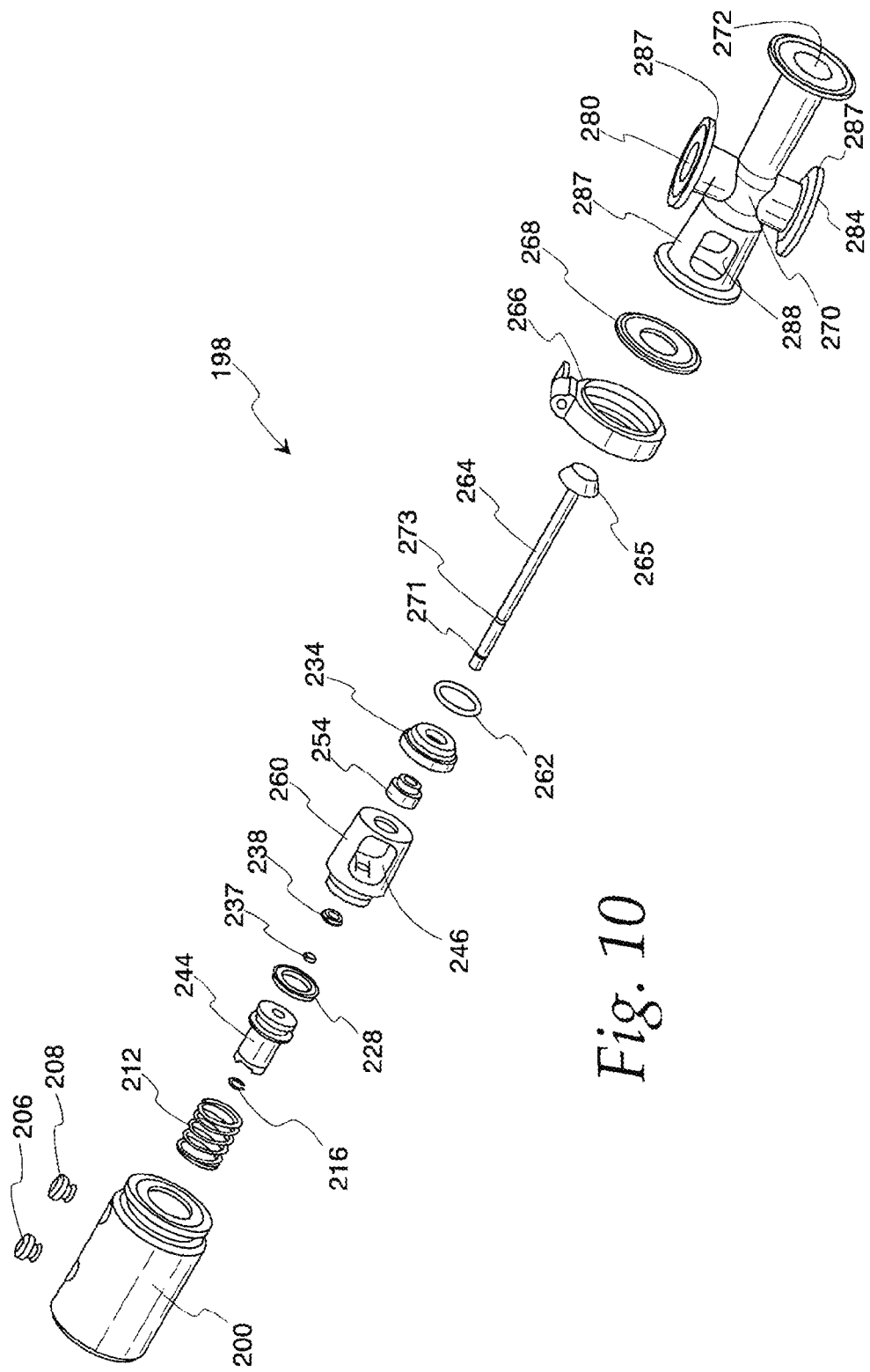
FIG. 10 is an exploded perspective view of a valve for use in a valve assembly in accordance with the present invention.
Figure 11:
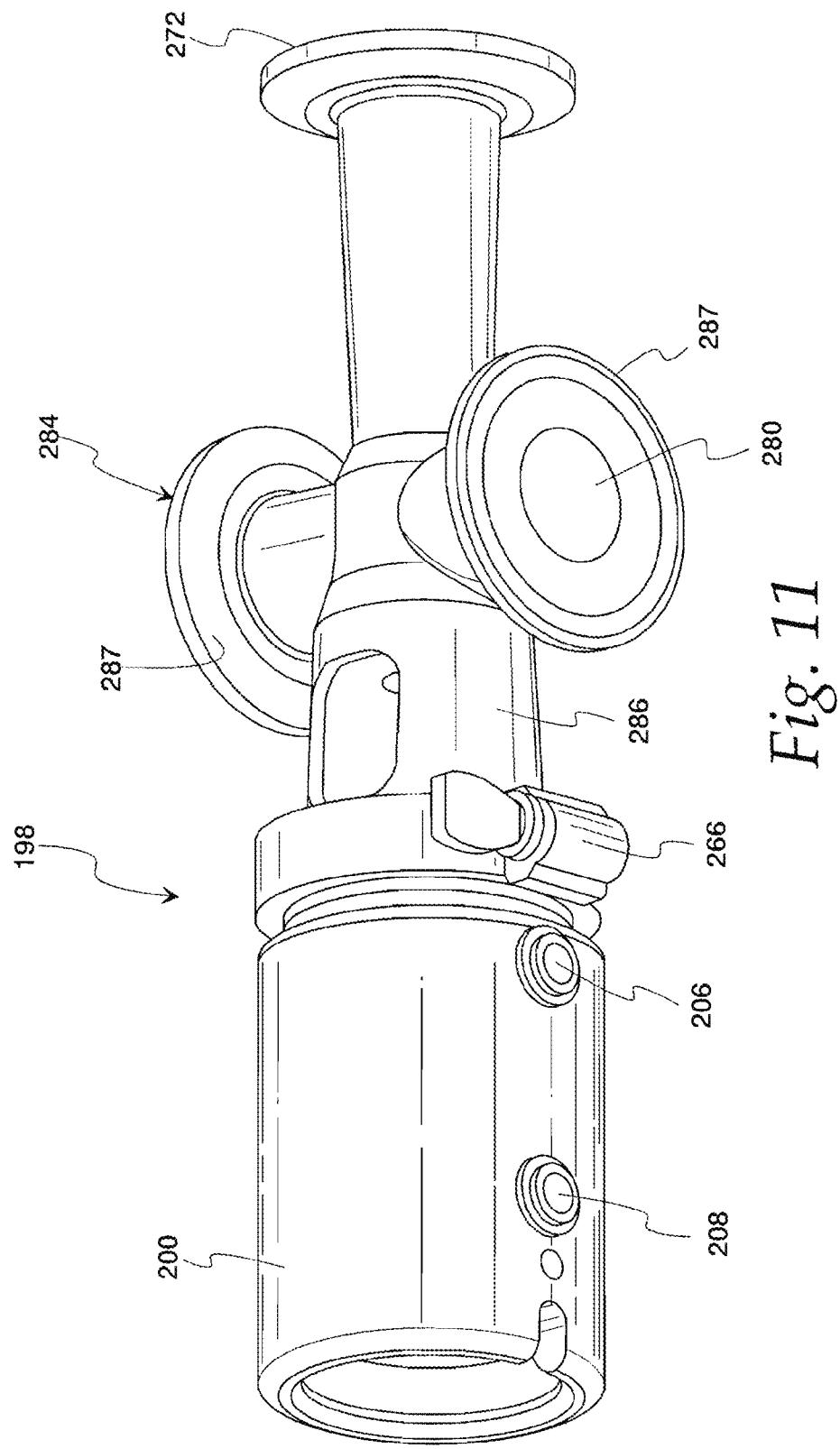
FIG. 11 is a perspective view of the valve of FIG. 10 in an assembled state.

Preferably the first sanitizer source valve 89 and the second sanitizer source valve 91 have the configuration of the teat preparation valve 68, described below. The teat preparation valve 68 is mounted using a bracket 99, and preferably is contained within a housing 100. As seen in FIGS. 9A and 9B, the housing 100 has a bore 102, a spool 104 disposed for axial movement in the bore 102, a fluid inlet 108, an air inlet 110, a bleed vent 112, an outlet 114, and a proximity switch 116. FIG. 9A illustrates the teat preparation valve 68 in a closed position and FIG. 9B illustrates the teat preparation valve 68 in an open position.

Generally, when in the open position (FIG. 9B) preparation fluid, such as water and/or cleaning fluids, are pumped through the fluid inlet 108 and out of the outlet 114, during a cleaning operation. If desired, an air slug or purge can then be pumped through the air inlet 108 and out through the outlet 114 to push cleaning fluids to their destination.

The housing 100 preferably includes a body 120 formed or machined in a single piece or multiple pieces disposed between two ends 122, and these parts are secured with appropriate connectors, such as hex bolts 124 and nuts 119. Appropriate seals 130, such as o-ring seals, are disposed between the body 120 and each end 122. The housing 100 is preferably shaped and constructed as illustrated, but other shapes and arrangements are possible. Nonetheless, the illustrated embodiment is sized to fit into the robotic milking machine 30.

Whether the inlets 108, 110, vent 112 or outlet 114 are opened (FIG. 9B, cleaning operation) or closed (FIG. 9A, milking operation) depends on the position of the spool 104 within the bore 102 because the spool 104 includes lands and recesses that are spaced apart and positioned in their desired locations as the spool 104 moves. Not all of the inlets need to be used. For example, the second sanitizer source valve 91 might only use a water inlet because it may not be necessary to add a sanitizer to the first milk tube 51. As depicted in FIG. 9A, the inlets 108 and 110 are closed by lands 132 and 134, respectively. Each land 132, 134 is separated from the other by a pair of spaced apart seals 136 with a vent opening 138 disposed in between the seals 136 to form a block-bleed-block arrangement. The seals 136 are preferably u-cup seals, but other types of seals can be used.

In the milking position, a slot 140 is positioned adjacent to the bleed vent 112, which itself has a pair of seals 144 disposed on each side to form the block-bleed-block arrangement. In FIG. 9A, the outlet 114 is blocked by a land 132. The slot 140 is sized to provide a desired sequence and timing of operation as the spool 104 moves back and forth. Other arrangements could be used to meet these operation criteria.

The spool 104 is biased toward the closed or milking position as depicted in FIG. 9A by a spring 150. To close the teat preparation valve 68, pressurized air is allowed into the bore 102 to urge the switch 116 to move the spool 104 against the bias of the spring 150 (to the left, as viewed) to allow preparation fluid to flow through the fluid inlet 108, the vent opening 138, and a central bore 162 in the spool 104. When in the open or cleaning position (FIG. 9B), the slot 140 is aligned with the outlet 114. Minor calibration adjustments of the spool 104 are made possible by an adjustment screw 166 that sets the limit of spool movement that can be caused by the spring 150.

Single Seat Valves

A valve arrangement of the present invention is used along milk flow paths and preferably includes an assembly of three "single seat valves." These assemblies are used in the bad milk valve assembly 60, the good milk valve assembly 62, and the box wash valve assembly 66, for example, but they are also used in other locations described below.

As illustrated in FIGS. 10 to 13B, single-seat valve 198 is preferably the same size and construction as the others to reduce manufacturing and maintenance costs. Referring to the exploded view of FIG. 10, the valve 198 includes from left to right: a cylinder 200, an air fitting 206, a vent fitting 208, a spring 212, a first e-ring 216, a lower guide 244, a first u-cup seal 228, a second e-ring 236, a second seal 238, an upper guide 260, a third seal 254, a molded lip seal 234, a third o-ring seal 262, a plunger 264 with a head 265, a clamp 266, a fourth seal 268, and a body 270. The body includes three openings arranged in a T-shape. The openings are labeled 272, 280, and 284 in FIG. 10 and they may be inlets, outlets or permanently blocked in any given valve assembly, examples of which are described below.

The single seat valve 198 is assembled by inserting the plunger 264 through the various internal parts and securing them together with the first and second e-rings 216 and 236 to recesses 271 and 273 in the plunger 264. The cylinder 200 is secured to the body 270 by the clamp 266. Other arrangements and connections for the internal and external parts of the single seat valve 198 are within the scope of the present invention.

Figure 12:
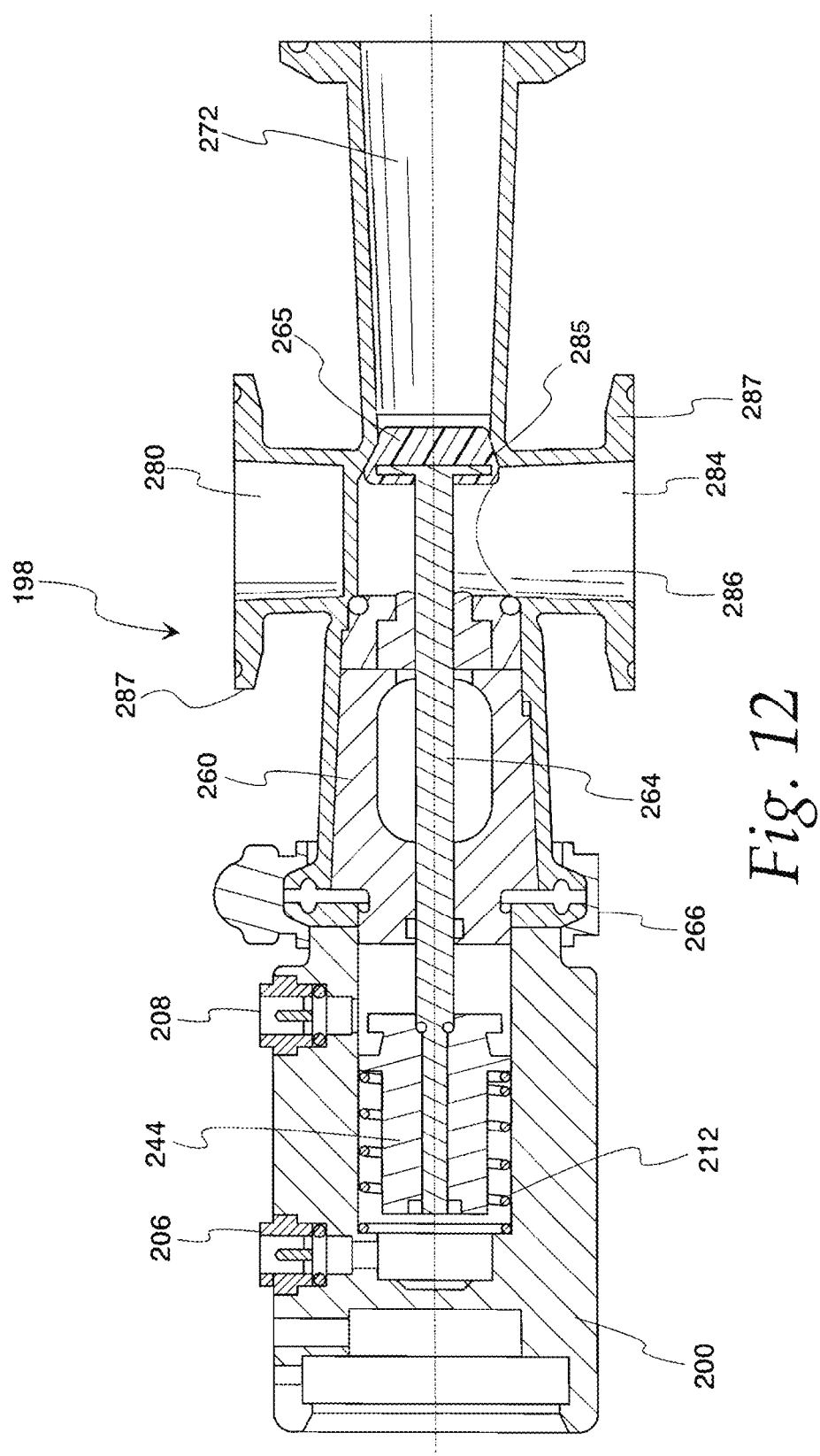
FIG. 12 is a side view of the valve of FIG. 11.
Figure 13A:
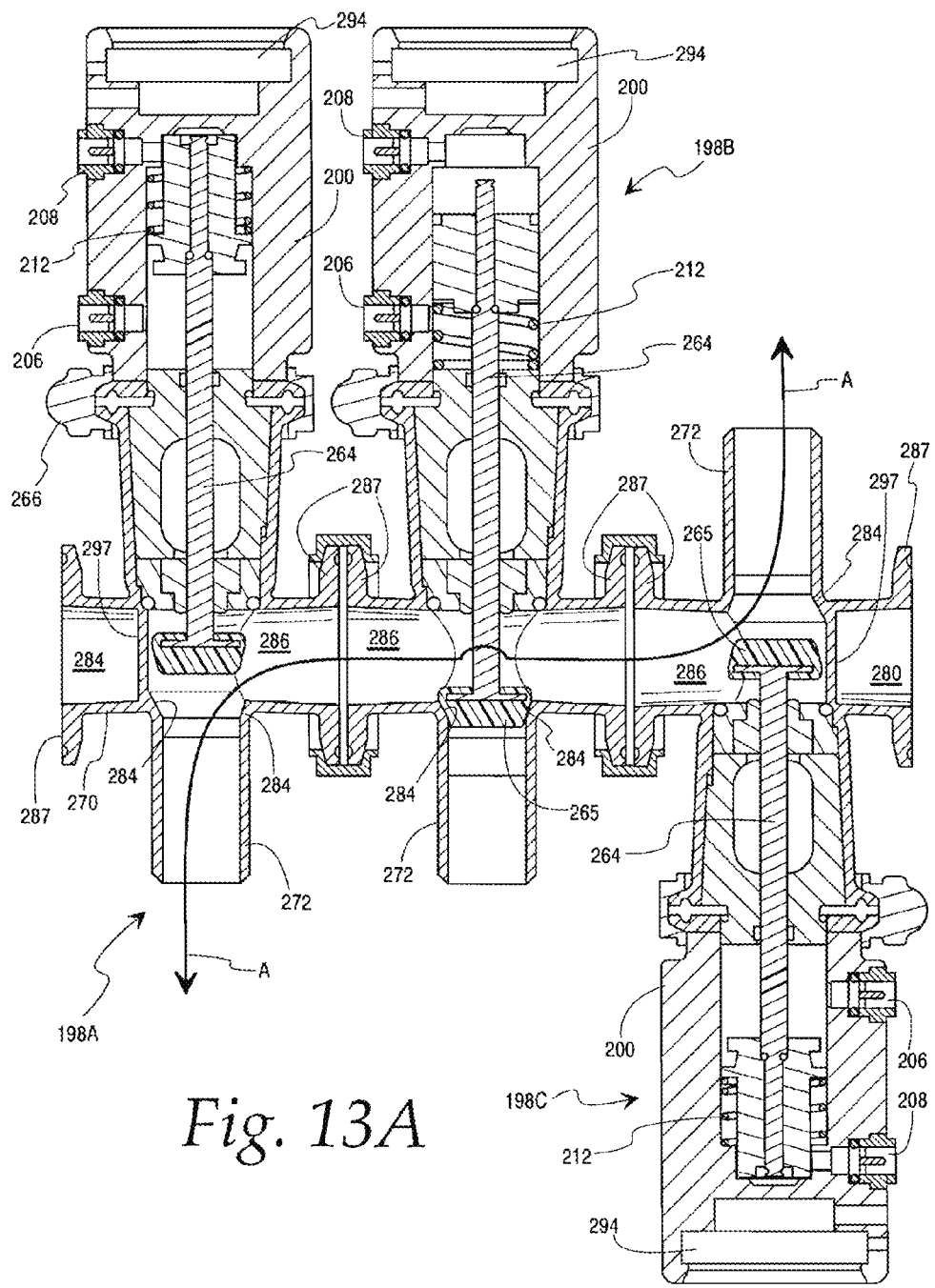
FIG. 13A is a cross-sectional view of the valve of FIG. 10 in a closed position.
Figure 13B:
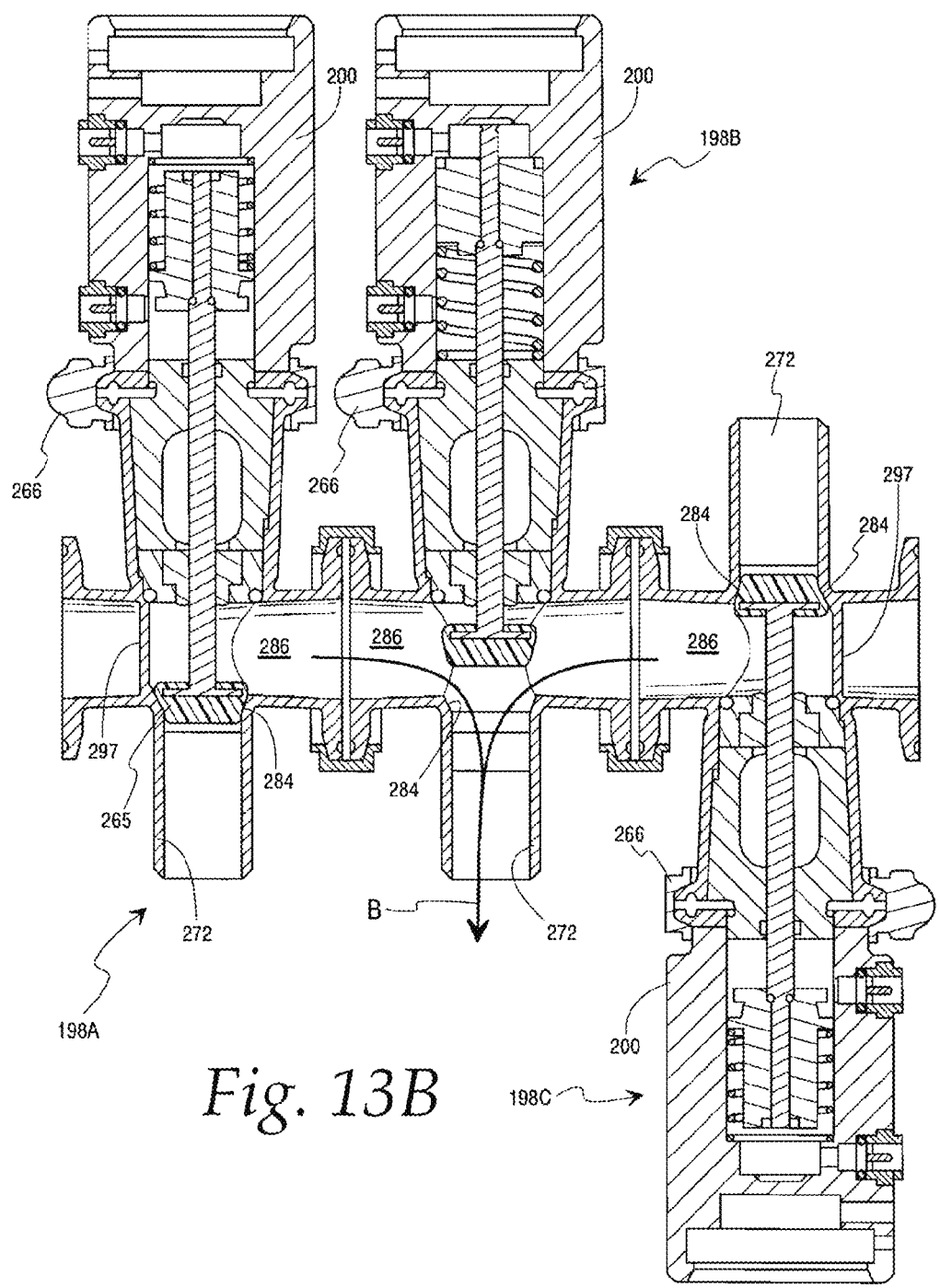
FIG. 13B is a cross-sectional view of the valve of FIG. 10 in an open position.

In FIGS. 12, 13A and 13B, the valve 198 is shown with the cylinder 200 secured to the body 270 with the clamp 266. Generally, each opening 272, 280, and 284 can be an inlet or an outlet. A pass through bore 286 can be opened at only one end or at both ends, depending upon its position in the valve assembly. The valves 198 can be joined at appropriate flanges 287. To open or close the valve 198, the plunger 264 is moved in a longitudinal axial direction so that the plunger head 265 engages a seat 285 in the body 270 or the plunger head 265 is spaced apart from the body seat 285.

The plunger 264 is kept in alignment by the upper guide 260 and the lower guide 244. The spring 212 acts on the lower guide 244, to bias the plunger 264 toward the closed position, as seen in FIG. 12. The upper guide 260 is mated into an extension 287. The extension 287 defines a number of openings 288.

When the valve 198 is opened, the plunger 264 is moved against the bias of the spring 212 with air pressure exerted through the air fitting 208 onto the lower guide 244. As a result, the plunger head 265 is moved out of engagement with the seat 284, and fluid can flow in or out of opening 272. When the valve 198 is closed, the plunger head 265 is engaged with the valve seat 284, so that fluid cannot flow out of the opening 272, but can flow past the plunger 264 in the pass through bore 286.

The valves 198 are used in sets of three and preferably are arranged to provide a block-bleed-block function at each valve assembly as seen in FIGS. 13A-C, for example. In this embodiment, the outlet 284 in valve 198A is permanently blocked by a wall 297, and the opening 280 in valve 198A is permanently blocked by a wall 297. In a three valve assembly, the two "outer" valves 198A and 198C are open (FIG. 13A) and the valve 198B is closed to provide a pass through between valves 198A and 198C. In FIG. 13B, the valve 198B in the middle is open to provide a vent or "bleed" through the outlet 272 of the middle valve 198B, and the valves 198A and 198C are closed to provide "blocks" on opposite sides of the "bleed" created by valve 198B. Thus, the three valves subassemblies 198A-C cooperate to form a block-bleed-block safety feature. Alternately, the three valves 198A-C can be disposed in a single housing, but as depicted, they provide a relatively inexpensive option.

Proximity sensor 294 is preferably used to indicate to the controller 40 that the plungers 264 are in the desired position. (See FIGS. 13A and 13B.)

The chart below illustrates each valve 198A-C position related to the valve assembly position as a whole.

| Valve Assembly Position | Valve 198A | Valve 198B | Valve 198C |
|---|---|---|---|
| Closed | Closed to Block Nipple | Open to Open Vent | Closed to Block Nipple |
| Open | Open | Closed to Block Nipple Vent | Open |

The example of valve assembly operation illustrated in FIGS. 13A and 13B includes flow lines A and B representing the direction fluid flows. More particularly, examples of operation for assemblies of valves 198 include the bad milk assembly 60 and the good milk assembly 62.

Referring to FIG. 6, milk from the milker unit 46 flows through the milk tube-51 to a branch that permits milk flow in two directions, but depending on whether the bad milk valve assembly 60 and the good milk valve assembly 62 are opened or closed the milk will flow in only one direction. Only one of these valve assemblies will be open during milking, and the other will be closed.

If the controller 40 determines that the fluid flowing is teat preparation fluids or contaminated "rinse" milk, the good milk valve assembly 62 will be closed and the bad milk valve assembly 60 will be open.

Bad Milk Valve Assembly

In the bad milk assembly 60 illustrated in FIGS. 14A-14C, fluid enters the inlet on valve 198A through the opening 272 and out through the pass through bore 286, which is joined to the pass through on valve 198B. Fluid flows through the valve 198B bore 286, into the valve 198C bore 286, and out of the opening 272. The valves 198A-C are illustrated as being joined directly to one another, but suitable conduits can be used in between them.

From the valve 198C opening 272, the fluids flow through bore 286, and into the wash fluid receiver 54. From there, the wash fluids and/or contaminated milk can be directed to a drain 296 or other suitable disposal apparatus.

If the controller 40 determines that the milk flowing through the milk tube 51 is good (meets predetermined quality standards), the bad milk valve assembly 60 will be closed and the good milk valve assembly 62 will be opened.

In the closed position, bad milk valve assembly 60 has valve 198A in a closed (block) position, valve 198B in a vent position, and valve 198C in a closed (block) position to provide the block-bleed-block arrangement described above.

Good Milk Valve Assembly

Referring to FIGS. 15A-15C, the good milk valve assembly 62 is in an open position when its: valve 198A is open; valve 198B is sealed from atmosphere; and valve 198C is open. In the good milk valve assembly 62 closed positions, valve 198A is closed, valve 198B is in a vent position, and valve 198C is closed, for block-bleed-block.

When the good milk valve assembly 62 is in the open position, good milk flows into the opening 272 of valve 198A, out of the valve 198A pass through bore 286, through the bore 286 of valve 198B, and through the bore 286 and opening 272 of valve 198C. From there, the good milk flows through a good milk conduit 300 and into the good milk receiver 56 via its inlet 308.

Good Milk Flow Path

Good milk can remain in the good milk receiver 56 for a period of time for quality testing or to serve as a "buffer" tank when the dairy milk collecting system 33 is off-line, as described above. When desired, good milk flows from the good milk receptacle outlet 314, through the conduit 316, and through a pass through conduit 320 in the box wash valve assembly 66, which is explained in more detail below.

From the box wash valve assembly 66, the good milk flows to a conduit junction 330 where it flows to the dairy milk collecting system conduit 332 or to a bad milk conduit 334, depending upon which of the good milk valve assembly 62 or the bad milk valve assembly 60 is open. When one of these valve assemblies is open, the other valve assembly will be closed.

From the good milk line 300, the milk can go either to the dairy milk collecting system or to a calf milk line 340. Suitable block-bleed-block valve assemblies, like those described above and illustrated in FIG. 16, are preferably used to segregate good milk and calf milk.

Figure 16:
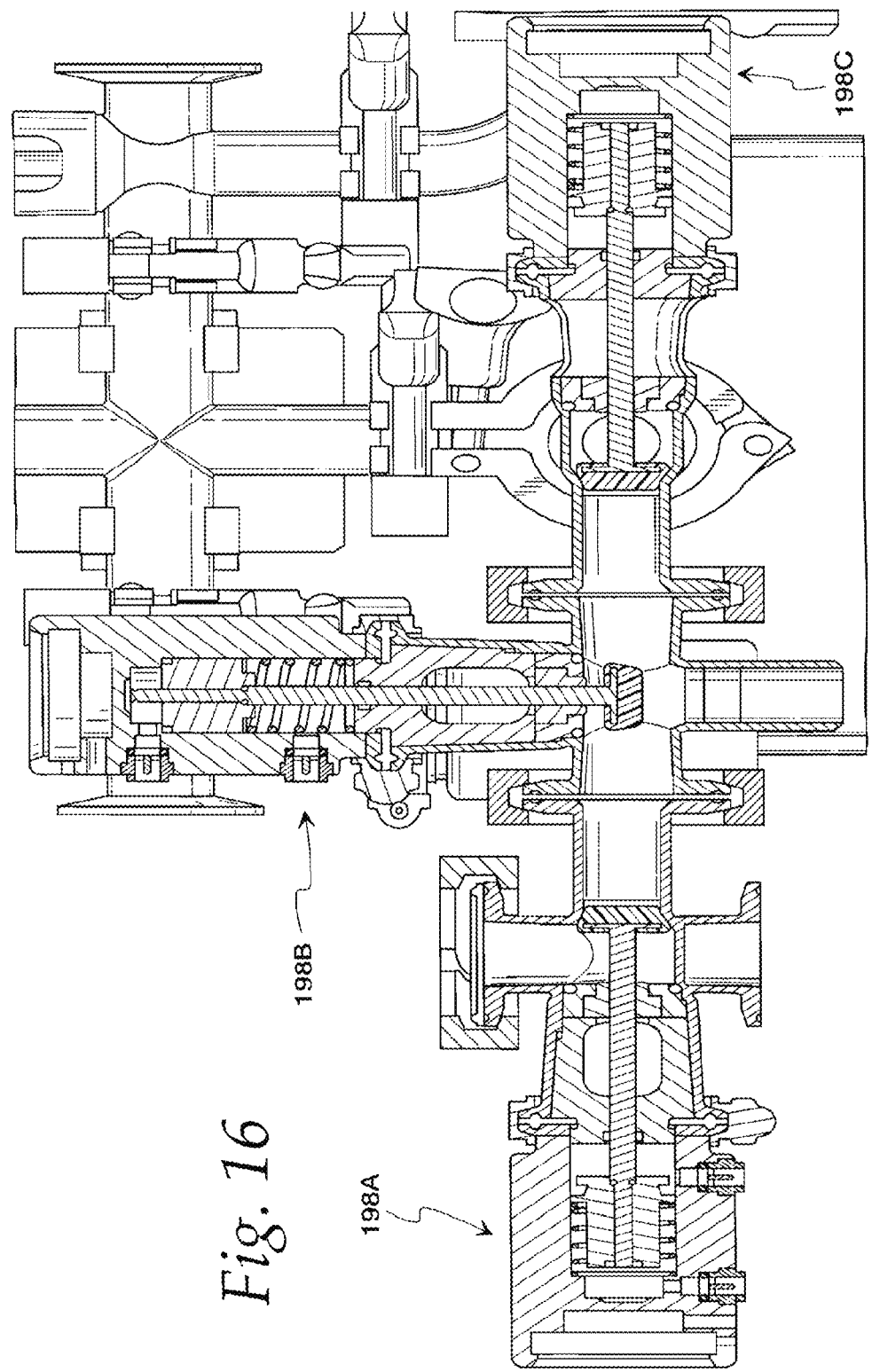
FIG. 16 is a partial cross-sectional view of a calf milk valve assembly.

FIG. 16 illustrates a valve assembly for a calf milk flow path. A kick-off sensor senses the existence or absence of vacuum and will signal the controller to initiate an appropriate action.

Dairy Milk Collecting System

Figure 17:
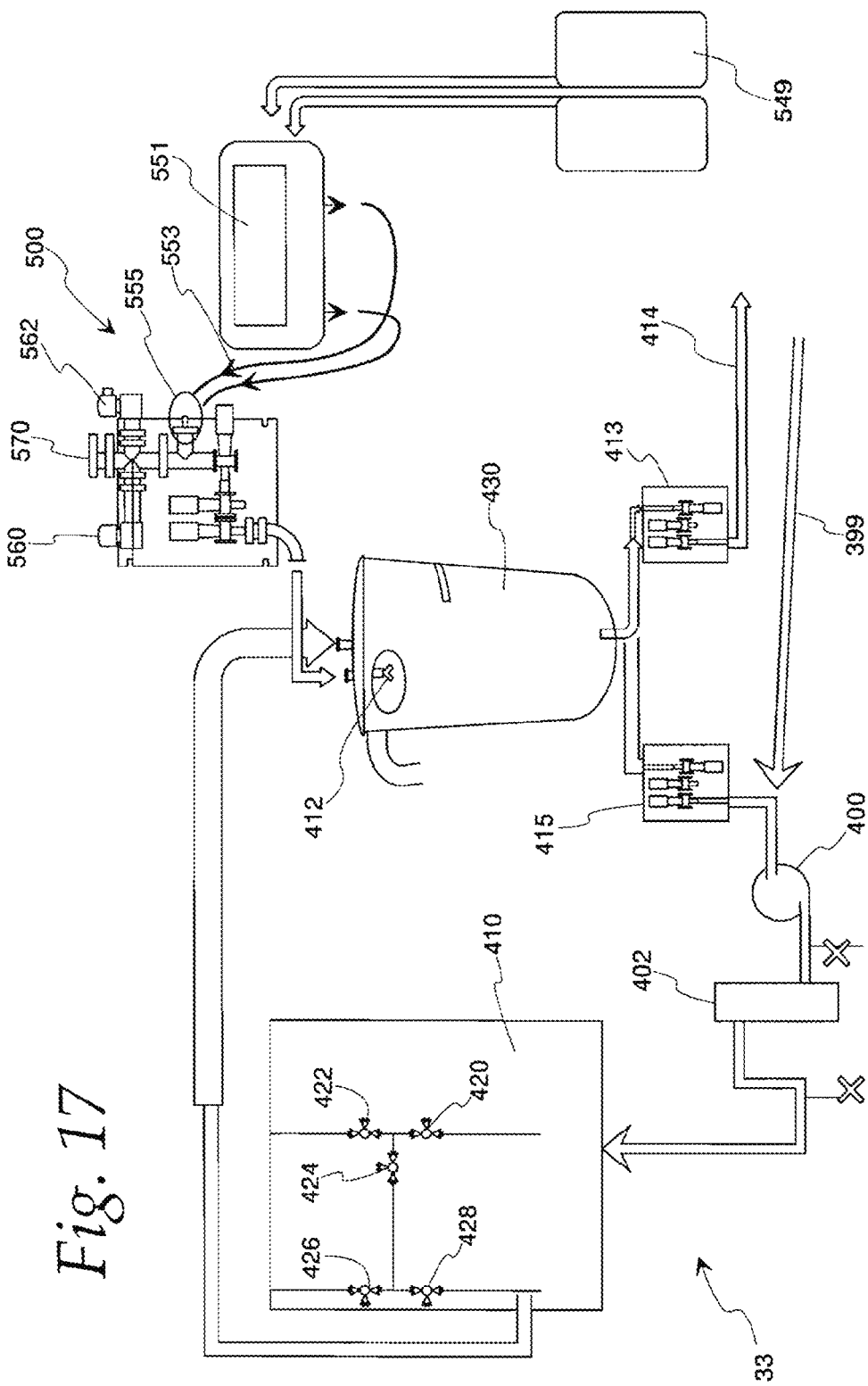
FIG. 17 is a schematic view of a milk collection system and a clean-in-place dispenser assembly with representative flow lines in accordance with the present invention.

The schematic view of a milk collection system 33 as depicted in FIG. 17, illustrates additional general components of a dairy milk collecting system 33, which is downstream from the good milk receiver 56 and received via conduit 399. As seen in FIGS. 17-18, the milk collecting system 33 includes a milk pump 400, a milk pre-cooler 402, a cooling tank valve assembly 410, a clean-in-place spray ball 412 (or other suitable water inlet deflector), a clean-in-place line 414 with a valve assembly 413 returning to the robotic milking machine 30, a cooling tank 430, and a second valve assembly 415 and appropriate conduits and drains.

The cooling tank valve assembly 410 (FIGS. 19A-19C) preferably includes five valves 420, 422, 424, 426, and 428. The following chart indicates valve assembly positions in the milking position, clean-in-place position, and cooling tank wash position that allows the good milk receiver 56 to act as a buffer tank while the cooling tank 430 is being washed, so milking operations can continue during cooling tank 430 washing.

| Valve | Milk Position | CIP Position | Cooling Tank Wash |
|---|---|---|---|
| 420 | Open | Open | Closed |
| 422 | Open | Closed | Open |
| 424 | Closed | Open | Open |
| 426 | Closed | Closed | Open |
| 428 | Closed | Open | Closed |

Preferably each valve 420-428 is a block-bleed-block valve assembly, as described above, and includes a pair of spaced apart valves 198A and 198C with a bleed valve 198B in between. Block-bleed-block valve assemblies are preferred because they prevent wash fluids and bad milk from flowing past valve seals and into other dairy lines, as described above.

Clean-In-Place Dispenser Assembly

As illustrated in FIGS. 17 and 18, clean-in-place dispenser assembly 500 in accordance with the present invention preferably includes: chemical tanks 549, chemical dispenser 551, check valves 553, a sensor 555, a mounting plate 558 on which are mounted a hot water valve 560, a cold water supply 562, a three-valve assembly 568, an air purge 570 for purging the clean-in-place dispenser assembly 500 and to push water into a flow diverter 576 in a cooling tank 430 to remove milk film from the tank's interior surfaces.

FIGS. 18, 19A, 19B and 19C illustrates flow paths of fluids through the clean-in-place dispenser assembly 500. Water of a desired temperature and pressure, proceeds along a flow path 501. Wash chemicals proceed along flow path 502 and air proceeds along flow path 503. As is apparent from FIG. 18, the flow paths 501, 502, and 503 begin at different inlets 510, 511, 512, and 514, respectively, and all are dispensed through outlet 516. The water, chemicals, and air are provided to the clean-in-place dispenser assembly 500 at appropriate sequences, volumes, pressures, temperatures, and durations. These factors vary for each system due to size, conduit lengths, ambient temperatures, cleaning chemical selection, and other considerations.

A clean-in-place dispenser valve assembly 500 is arranged similarly to those described above, and each valve 198A, B, C serves substantially the same function as described above. In this particular clean-in-place dispenser valve assembly 500, the valves 198A and 198C are closed during milking and when milk is stored in the cooling tank 430. The valve 198B is opened to provide a vent in a block-bleed-block relationship.

During cleaning, the valves 198A and 198C are opened, and valve 198B is closed. Due to the pass through bore 286, fluid flows through valve 198B when it is closed. Chemical flow sensor 564 is also used.

Milk Flow Sensor

Figure 20:
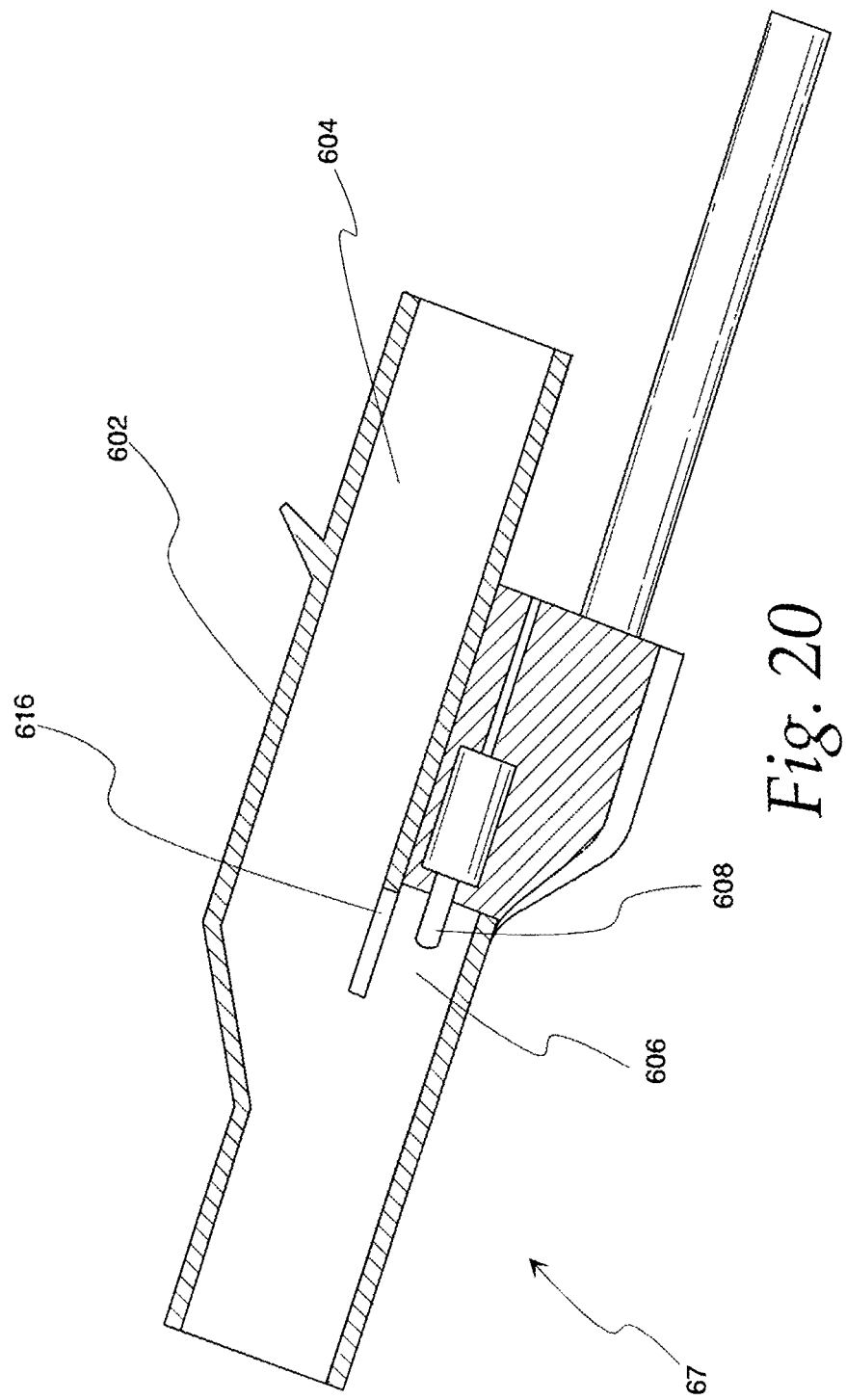
FIG. 20 is a cross-sectional view of a conductivity sensor for use with the present invention.

Suitable sensors for use in the present invention include conductivity sensors that detect and/or measure flow quantity and/or rate, as well as sensing milk quality as milk flows from or through the milking machine. A preferred suitable conductivity sensor 600 is illustrated in FIG. 20 and includes a housing 602, a bore 604, a reservoir 606 in which a conductivity probe 608 is positioned, and a slot 616 that is sized so milk can drain from the reservoir 606, but is small enough to slow flow to a rate at which a conductivity measurement is possible. The slot 616 is also preferably sized large enough so that sand, dirt or grit in the reservoir 606 can be carried out by the milk. This arrangement prevents clogging and malfunction of the conductivity sensor 600, and yet is able to slow milk flow long enough for conductivity data to be received.

Hoses used in the present invention are preferably vulcanized with stainless steel fittings and with hoses from STI Components, Inc. of Morrisville, N.C., for example. Other hose connections and manifolds are preferably continuously welded and finished to 3-A Sanitary Standards.

Figure 21A:
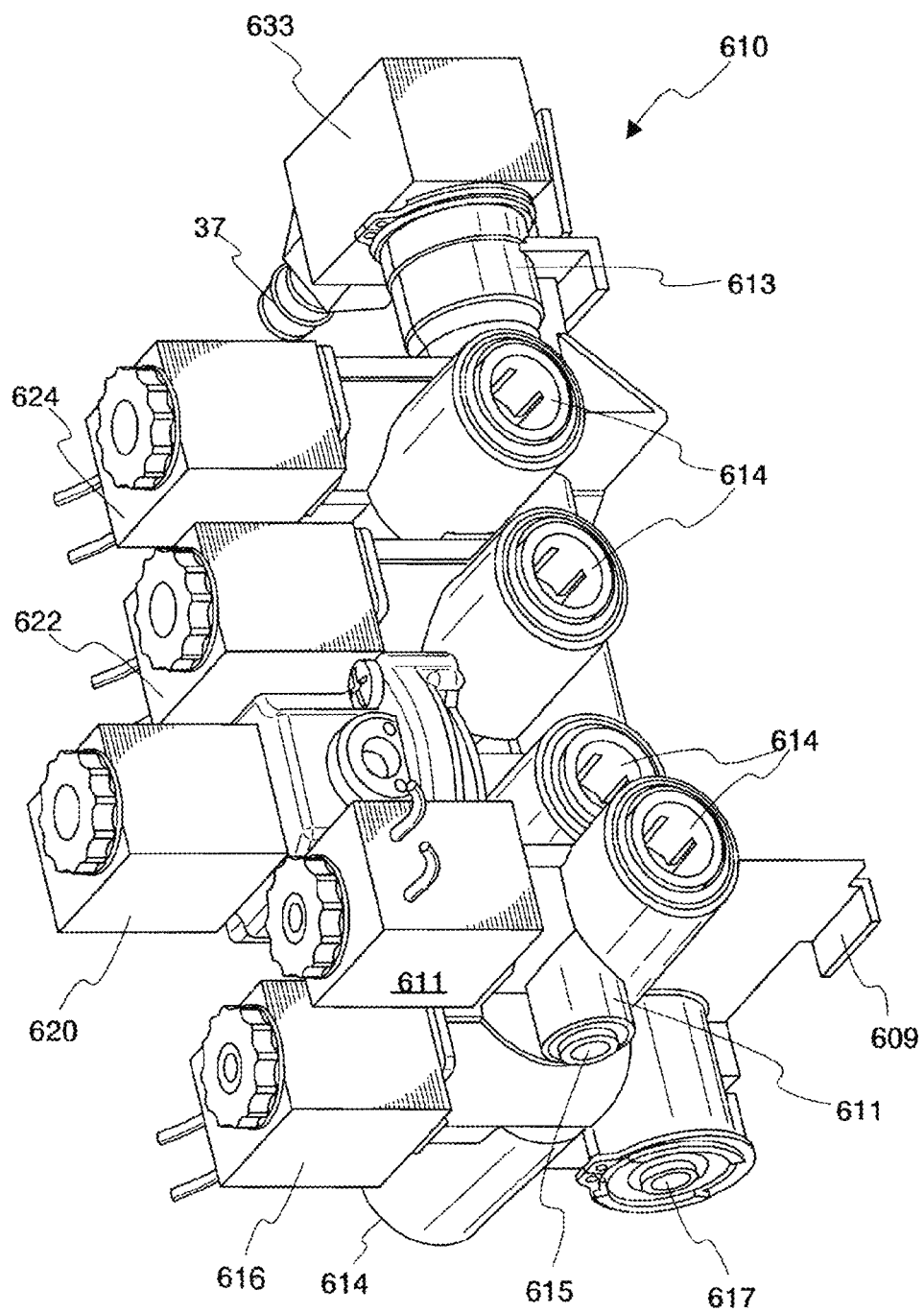
FIG. 21A is a perspective view of a valve block in accordance with the present invention.
Figure 21B:
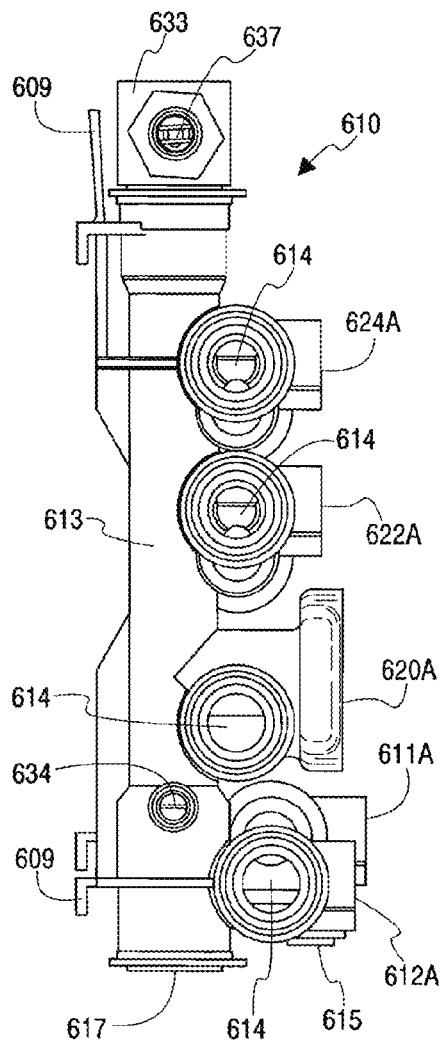
FIG. 21B is a left side view of the valve block of FIG. 21A with solenoid valves removed.
Figure 21C:
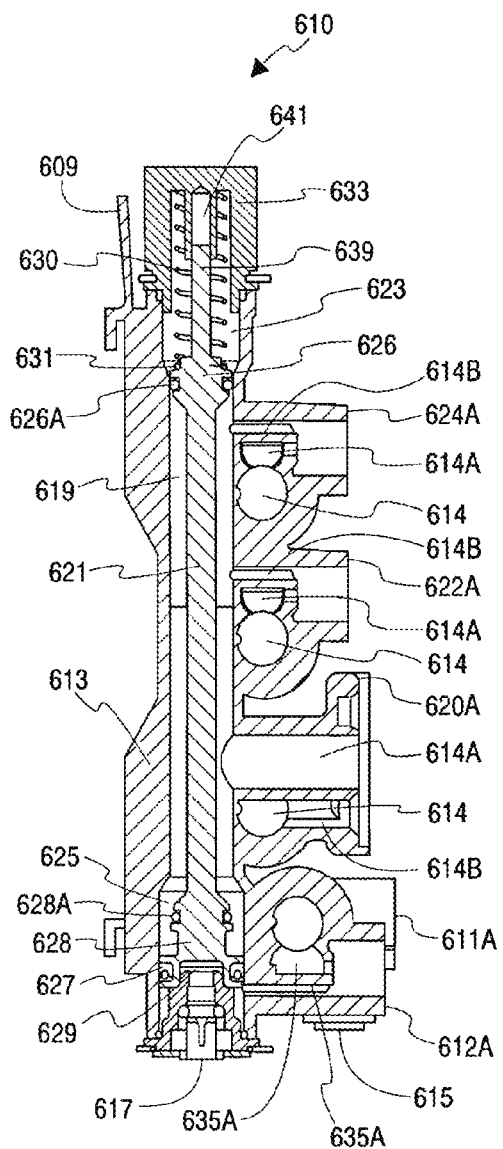
FIG. 21C is a side cross sectional left side view of the valve block of FIG. 21A with solenoid valves removed.
Figure 21D:
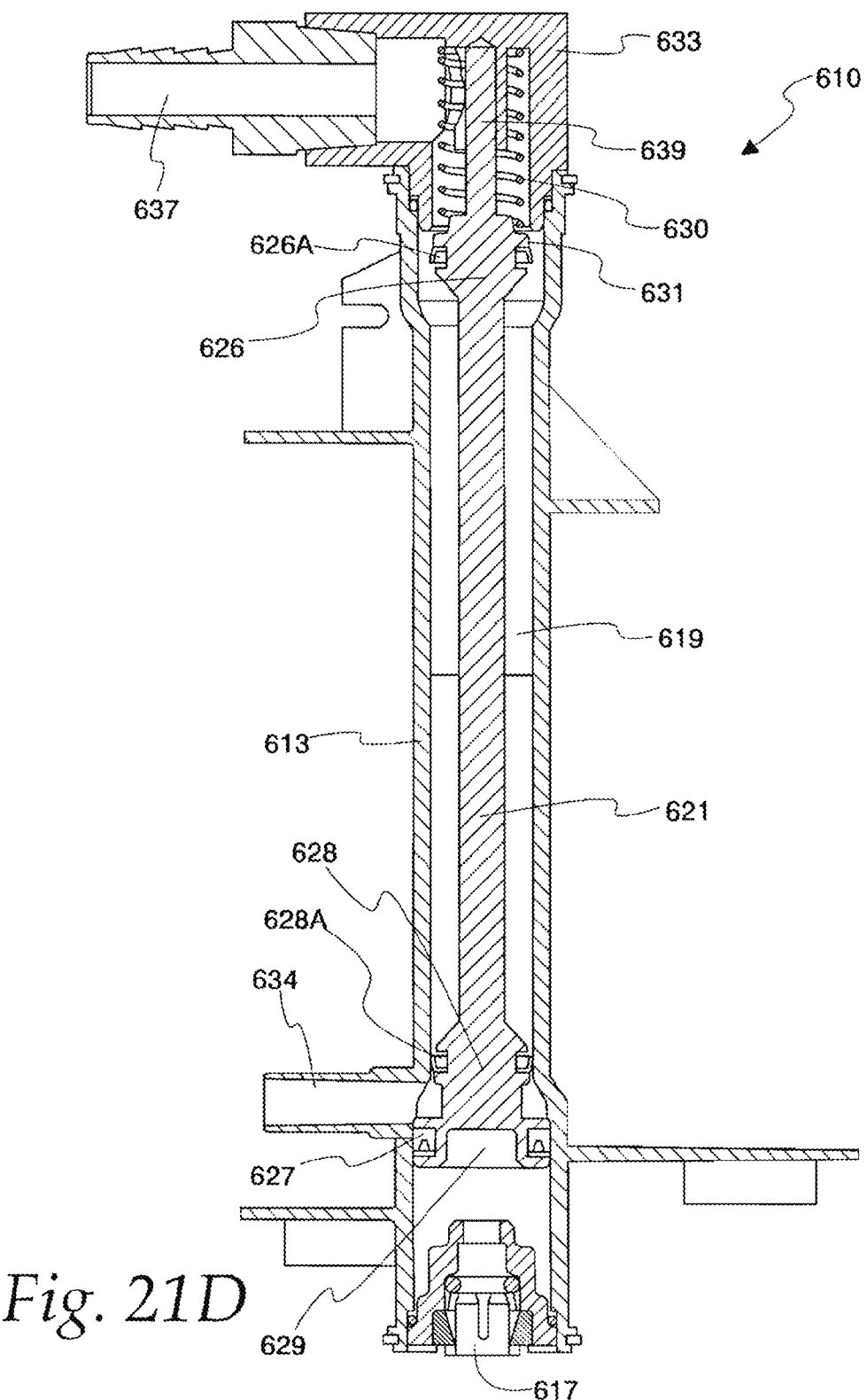
FIG. 21D is a side cross sectional front view of the valve block of FIG. 21A with solenoid valves removed.

Another suitable valve block 610 for use in dispensing sanitizer fluids is depicted in FIGS. 21A to 21D. FIGS. 21A through 21D illustrate a valve block 610 in which a number of valves are provided for supplying multiple sanitizer fluids (air, water, and sanitizers) through a common outlet 637 to the sanitizer line 128. The valve block 610 includes a housing 613 that defines an axial chamber 619 in which a spool 621 is disposed to slide between a milking position (FIG. 21C) and a sanitizing position (FIG. 21D). The axial chamber 619 includes an upper bell portion 623 and a lower bell portion 625.

The housing 613 is preferably oriented vertically, as depicted, to provide drainage of fluids through a drain 634 (FIG. 21B), but other orientations can be used. Preferably, the valve block 610 housing 613 is made of Radel R5000 from Piedmont Plastics, Inc. of Charlotte, N.C. and available from distributors throughout the United States, or other translucent plastic or glass material to provide superior chemical resistance and clarity for operation and maintenance inspections. The valve block 610 housing 613 is preferably arranged and molded as an integral piece as depicted. Other materials can be used for the valve block 610 and related components, and the valve block 610 can be formed from one or more parts. Flanges 609 or other connectors can be joined to or molded integrally with the valve housing 613 to permit convenient mounting with snap-in features, screws, or other suitable fasteners.

The valve block housing 613 includes several pass-through inlets 614 though which sanitizing fluids flow. Pass though inlets 614 are used so that a number of valve blocks can be arranged in series and supplied with sanitizing fluids from a common source, if desired. Other arrangements can be used, but arranging valve blocks in series requires fewer hoses for sanitizing fluids and less demand on pumps and other supply components. Flow through the pass through inlets 614 can be in either direction to accommodate a variety of dairy layouts.

Most of the pass through inlets 614 communicate with a corresponding and dedicated block inlet 614a that is controlled by its respective valve to permit entry of a predetermined fluid into a chamber 619 through conduits 614b. One exception is the pass through inlet 614 for the second air valve 612, which communicates with the lower bell portion 625 of the axial chamber 619 at a position under the spool 621 via passages 635a and 635b so that pressurized air can force the spool 621 into the sanitizing position (FIG. 21D), when desired.

The valve block 610 can include any number of valves corresponding to the number of sanitizing fluids used. In the illustrated embodiment there are five valves, depicted in FIG. 22A including: a first air valve 611 that provides air to push liquids from the liner 49 and somewhat dry the teat; a second air valve 612 that moves a valve block safety spool 621 into place and can provide air pressure to push sanitizing liquids such as sanitizers and water toward the liner 49 onto a teat; a third air valve 620 provides air for slugging sanitizing fluids and for complete surface rinsing and vigorous scrubbing of the dairy animal teat; a water valve 622 that provides water to be used to rinse the liner 49 and teat; and a sanitizer solution valve 624 that provides one or more chemical solutions for sanitizing teats.

All valves are preferably solenoid valves, including the third air valve 620, which is preferably a pilot operated valve that ensures air flow for backflush slugging. Also preferably, the sanitizer solution valve 624 is made of stainless steel or other material that resists corrosion from the sanitizer fluids. For ease of reference, each valve is joined to the valve block 610 at a seat and each seat is designated in FIGS. 21B and 21C with a numeral matching its respective valve and including the suffix "a", so that valve 620 is mounted on seat 620a, for example.

The first air valve 611 is reserved for only operating the safety valve 60 to help ensure complete, independent, and safe operation of the safety valve 610. Independent operation of some valves may be desirable to avoid pressure fluctuations that could result in from sharing air supply pressure with other system components. The air from air valve 611 exits the safety valve block 610 through a separate outlet 615 for this reason. The first air valve 611 could be separate from the safety valve block 610 and mounted elsewhere in the system because it does not use the common outlet 637. Nonetheless, the safety valve block 610 provides a convenient mounting location and helps keep all of the hoses for the pass through inlets 614 organized. The second air valve 612 supplies air to the teat cup 48 and liner 49.

The spool 621 (FIGS. 21C and 21D) includes an upper valve head 626 and a lower valve head 628. The upper valve head 626 and the lower valve head 628 each define an annular groove in which seals 626a and 628a are disposed, respectively. The seals 626a and 628a are preferably u-cup seals oriented as depicted to provide a sealing function in one direction each. U-cup seals provide satisfactory sealing properties and reduce friction between the seals and the central housing 613 so that the spool 621 moves relatively easily with a relatively low air pressure. The seals 626a and 628a oppose each other to seal the axial chamber 619 at their respective ends. This seal orientation can permit fluid to pass into the axial chamber 619. The spool 621 can be made of any suitable material such as stainless steel, stable plastic, or other material. The seals 626a and 628a can be made of Viton (FKM) or any rubber, silicone or other suitable material or the seals can be formed integrally with the spool 621.

A valve block spring 630 biases the spool 621 toward the milking position (FIG. 21C). The valve block spring 630 engages a seat 631 on the upper valve head 626 and is contained within cap 633. An alignment rod 639 extending from the upper valve head 626 of the spool 621 fits in socket 641 (FIG. 21C) formed in a cap 633 to maintain proper alignment of the spool 621 when moving between the milking position (FIG. 21C) and the backflushing position (FIG. 21D).

In the milking position (FIG. 21C), the spool 621 is forced by the valve block spring 630 to engage the upper valve head seal 626a with the walls of the axial chamber 619 to seal the common outlet 637 from the chamber 619 with an end seal 627. The lower valve head 628 is forced down into the lower bell portion 625 and does not engage the walls of the axial chamber 619, but the lower valve head 628 includes a recess 629 that fits around and seals the air outlet 617 while permitting drainage of residual fluids through drain 634. In the milking position, there is a space between the spool 621 and the walls of the axial chamber 619 that extends between most of the length of the axial chamber 619. The drain (or vent) 634 is in communication with the axial chamber 619 to "bleed" any differential pressure between the valves and the milk line thereby minimizing migration of dips and backflush fluids into the milk lines. The drain 634 is preferably located near the bottom of the axial chamber 619 to provide a drain for any fluids in the axial chamber 619 when the spool 621 is in the milking position.

The valve block 610 can be controlled by a stall control or other controllers to move to the sanitizing position for dairy animal preparation. In the sanitizing position (FIG. 21D), the spool 621 is forced (upward as illustrated) against the bias of the valve block spring 630 by pressurized air entering the inlet 635 to move the lower valve head 628 into sealing engagement with the walls of the axial chamber 619 to seal the vent 634 and open the air outlet 617. In the sanitizing position, the upper valve head 628 does not seal anything because it is disposed in the upper bell portion 623, and opens the axial chamber 619 to the common outlet 637.

The inlets for the air valve 620, the water valve 622, and the sanitizing fluid valve 624 all communicate with the axial chamber 619 through inlets 614a, so that all of these fluids can flow through the axial chamber 619 and out of common outlet 637 when their respective valves are opened and the spool 621 is in the sanitizing position. The fluids do not typically flow together, instead the various valves fire in a predetermined sequence to supply sanitizing fluids at the specific time needed by the safety valve 610, as described below. All hose connections to the valve block 610 can be made with any suitable connection, including a John Guest fitting, as depicted in outlet 617.

In the present invention there are various process options. Several examples are in Chart B below.

Chart B

| Process option | Cycle 1 | Cycle 2 | Cycle 3 |
| --- | --- | --- | --- |
| 1 | Sanitizer (2 liters) | none | Air |
| 2 | Water (2 liters) | Sanitizer (1 liter) | Air |
| 3 | Water + surfactant (2 liters) | Sanitizer (.5 liters) | Air |

Sanitizer options are available from GEA Farm Technologies, Inc., of 1880 Country Farm Drive, Naperville, Ill. 60563 and include:

BiSept—0.35% (2.9% lactic acid, 0.7% sodium chlorite)
Oxycide—1% hydrogen peroxide
Dermasept—1% Capric-caprylic acid
Theraderm—0.25% available iodine
Theratec—0.5% iodine Fifteen seconds is a preferred minimum contact time for any sanitizer, but other contact times are possible depending on a particular dairy animal, ambient conditions or the type of sanitizer used.

Generally, once sanitizer and/or water is applied, filtered oil-free air is admitted into the liner through the same inlet using valve 118. This air flow continues until the teat is dry and residue is removed from the milk tube.

When milking is completed and the teat cups have been removed, the teat cup assembly returns to a cleaning station where all cups are backflushed into the waste line.

All fluids entering the waste line are carried away from the milking box and discarded to drain. This circuit is washed during the clean-in-place process in a similar fashion as the good milk circuit is washed two to three times per day. Additional washings will be performed following extended idle periods.

The present invention ensures that sanitizer fluids and dirt cannot flow into the milk line system, despite differential pressures in the milk lines and preparation system. As stated above, to prevent seepage past valves and seals, the present invention includes a type of valve arrangement described above as "block-bleed-block." Standard valves and seals can fail or allow seepage due to differential pressure on opposite sides of seals used in milk, teat dip, and backflushing lines. The block-bleed-block function of the invention prevents migration of sanitizer through valves and seals into the milk lines by supplying a pair of spaced apart valves and a vent or "bleed" to atmosphere, with the vent being disposed between two seals. Multiple block-bleed-block arrangements are used in the invention to provide redundancy and safety both upstream and downstream from the teat cup 48 and liner 49.

In the present invention, there is preferably the valve block 610 joins air, water, and sanitizer supply lines and channels them to a common valve block outlet for efficiency. The valve block 610 also provides a pressure bleeding vent between a pair of seals to further protect milk lines from contamination.

In the milking position (FIG. 21C), the spool 621 is forced by the valve block spring 630 to engage the upper valve head seal 626*a* with the walls of the axial chamber 619 to seal the common outlet 637 from the chamber 619 with an end seal 627. The lower valve head 628 is forced down into the lower bell portion 625 and does not engage the walls of the axial chamber 619, but the lower valve head 628 includes a recess 629 that fits around and seals the air outlet 617 while permitting drainage of residual fluids through drain 634. In the milking position, there is a space between the spool 621 and the walls of the axial chamber 619 that extends between most of the length of the axial chamber 619. The drain (or vent) 634 is in communication with the axial chamber 619 to "bleed" any differential pressure between the valves and the milk line thereby minimizing migration of sanitizing fluids into the milk lines. The drain 634 is preferably located near the bottom of the axial chamber 619 to provide a drain for any fluids in the axial chamber 619 when the spool 621 is in the milking position.

Effectiveness of an automated preparation system is recorded in the charts depicted in FIGS. 22A-B, respectively.

The foregoing detailed description of the invention is for clearness of understanding the present invention, and no unnecessary limitations therefrom should be read into the following claims.

The invention claimed is:

1. A method for preparing for and initiating a milking process on a dairy animal teat that is disposed in a teat cup and liner, the method in sequence comprising:
   prior to milking a dairy animal, providing a teat cup and a liner disposed at least partially within the teat cup;
   placing a teat of the dairy animal within the liner;
   closing the liner off from a good milk line;
   applying a teat sanitizer to the teat;
   directing air into the liner to force at least some of the teat sanitizer toward the teat and a first milk line connected to the liner;
   pulsating the liner at a first pulsation rate to distribute the teat sanitizer about the teat;
   directing a rinsing fluid into the first milk line;
   directing the teat sanitizer, the air, and the rinsing fluid through the first milk line to a waste milk line;
   pulsating the liner at a second pulsation rate to draw good milk from the teat;
   closing the liner off from the waste milk line;
   opening the liner to the good milk line; and
   directing the good milk to the good milk line.

2. The method of claim 1, wherein the step of pulsating the liner at a first pulsation rate, comprises the step of:
   stimulating the teat to begin drawing milk into the teat from the dairy animal's udder.

3. The method of claim 1, wherein the first pulsation rate is at a higher frequency than the second pulsation rate.

4. The method of claim 1, and further comprising the step of:
   pulsating the liner at a first pulsation rate until the rinsing fluid is determined to meet a predetermined characteristic.

5. The method of claim 1, wherein the step of pulsating the liner at a second pulsation rate begins when the rinsing fluid meets a predetermined characteristic.

6. The method of claim 1, wherein the step of pulsating the liner at a second pulsation rate begins after the teat cup and liner have been attached to the teat for a predetermined period of time.

7. The method of claim 1, wherein the step of pulsating the liner at a second pulsation rate begins after the teat cup and liner have been attached to a second teat of the dairy animal for a predetermined period of time.

8. The method of claim 1, wherein the step of pulsating the liner at a second pulsation rate begins after the teat cup and liner have been attached for a predetermined period of time and the rinsing fluid has reached a predetermined characteristic.

9. The method of claim 1, wherein the step of pulsating the liner at a first pulsation rate comprises the step of:
   pulsating the liner at a teat stimulation rate.

10. The method of claim 1, wherein the step of directing a rinsing fluid into the first milk line includes the step of:
    drawing a rinsing milk from the teat.

11. The method of claim 1, wherein the step of directing a rinsing fluid into the first milk line includes the step of:
    directing a rinsing fluid into a rinsing fluid connection in the first milk line.

12. The method of claim 1, wherein the rinsing fluid includes milk drawn from the teat.

13. The method of claim 1, wherein the rinsing fluid includes teat sanitizer and air.

14. The method of claim 1, wherein the rinsing fluid includes good milk.

15. The method of claim 1, wherein the rinsing fluid includes foremilk.

16. The method of claim 1, wherein the rinsing fluid includes foremilk and good milk.

17. The method of claim 1, wherein the rinsing fluid includes:
    teat sanitizer, foremilk, and good milk.

18. The method of claim 1, wherein the rinsing fluid includes a first milk line rinsing fluid.

19. The method of claim 1, wherein the rinsing fluid includes water.

20. The method of claim 1, wherein the rinsing fluid is selected from a group of fluids consisting essentially of:
    milk; foremilk; good milk; water; air; sanitizer; and a first milk line rinsing fluid; and combinations thereof.

21. The method of claim 1, wherein the step of pulsating the liner at a second pulsation rate begins after the step of:
    calculating in a controller, a pulsation rate change variable selected from the list comprising:
       the rinsing fluid quantity;
       a time period beginning when the teat cup and liner are attached to the teat;
       a time period beginning when a second teat cup and liner are attached to a second teat of the dairy animal;
       a predetermined quality of the rinsing fluid;
       a predetermined health characteristic of the dairy animal;
       a milking characteristic unique to the dairy animal;
       ambient conditions;
       an unsuccessful attempt to attach a teat cup and liner to a second teat of the dairy animal; and
       combinations thereof.

22. The method of claim 1, wherein the step of pulsating at a second pulsation rate begins after a predetermined time is reached.

23. The method of claim 1, wherein the step of pulsating at a second pulsation rate begins when activated by an operator.

* * * * *